(12) United States Patent
Marmar et al.

(10) Patent No.: US 11,258,744 B2
(45) Date of Patent: Feb. 22, 2022

(54) DIGITAL CONVERSATION MANAGEMENT

(71) Applicant: Sizung Inc., New York, NY (US)

(72) Inventors: Daniel Marmar, Englewood Cliffs, NJ (US); Sverre Wendelbo, London (GB); Adam Lobel, Tokyo (JP); Xue Rui, New York, NY (US); Ming Zhou, New York, NY (US); Alexander Marmar, Brooklyn, NY (US)

(73) Assignee: Sizung Inc., New York, NY (US)

( * ) Notice: Subject to any disclaimer, the term of this patent is extended or adjusted under 35 U.S.C. 154(b) by 0 days.

(21) Appl. No.: 17/045,391

(22) PCT Filed: Apr. 5, 2019

(86) PCT No.: PCT/US2019/026031
§ 371 (c)(1),
(2) Date: Oct. 5, 2020

(87) PCT Pub. No.: WO2019/195706
PCT Pub. Date: Oct. 10, 2019

(65) Prior Publication Data
US 2021/0168110 A1    Jun. 3, 2021

Related U.S. Application Data

(60) Provisional application No. 62/653,211, filed on Apr. 5, 2018.

(51) Int. Cl.
*G06F 15/16* (2006.01)
*H04L 51/42* (2022.01)
(Continued)

(52) U.S. Cl.
CPC .............. *H04L 51/22* (2013.01); *G06F 40/30* (2020.01); *G06Q 10/103* (2013.01);
(Continued)

(58) Field of Classification Search
CPC ......... H04L 51/16; H04L 51/26; H04L 67/22; H04L 51/22; G06F 40/30; G06Q 10/103; G06Q 10/107; G06Q 10/00
(Continued)

(56) References Cited

U.S. PATENT DOCUMENTS 6,330,589 B1 * 12/2001 Kennedy .............. G06Q 10/107
707/999.104
2005/0114781 A1 * 5/2005 Brownholtz .......... G06F 3/0482
715/733
(Continued)

OTHER PUBLICATIONS

International Search Report dated Aug. 7, 2019 in connection with International Patent Application No. PCT/US2019/026031 filed Apr. 5, 2019.
(Continued)

*Primary Examiner* — Johnny B Aguiar

(57) ABSTRACT

A method for workflow organization can be provided to manage digital conversations. Provisions for such method may be implemented in a system configured for contextually organizing digital conversations and viewing associated content. For each user, a tree of conversations which is specific to the user is constructed, while preserving context shared between users. The workflow management preferably includes provisions for appointments and attachments.

23 Claims, 44 Drawing Sheets

(51) Int. Cl.
  *G06F 40/30* (2020.01)
  *G06Q 10/10* (2012.01)
  *H04L 51/00* (2022.01)
  *H04L 51/226* (2022.01)

(52) U.S. Cl.
  CPC ........... *G06Q 10/107* (2013.01); *H04L 51/16* (2013.01); *H04L 51/26* (2013.01)

(58) Field of Classification Search
  USPC ................................................. 709/206, 207
  See application file for complete search history.

(56) References Cited

U.S. PATENT DOCUMENTS

| | | | |
|---|---|---|---|
| 2012/0096389 A1 | 4/2012 | Flam et al. | |
| 2013/0159879 A1* | 6/2013 | Affronti | G06Q 10/107 715/752 |
| 2014/0236953 A1* | 8/2014 | Rapaport | G06Q 10/10 707/740 |
| 2016/0065520 A1* | 3/2016 | Puranik | H04L 51/16 715/752 |
| 2016/0301651 A1 | 10/2016 | Abou Mahmoud et al. | |
| 2018/0018376 A1* | 1/2018 | Buchheit | G06F 16/248 |

OTHER PUBLICATIONS

Written Opinion dated Aug. 7, 2019 for counterpart International Patent Application No. PCT/US2019/026031 filed Apr. 5, 2019.
International Preliminary Report on Patentability dated Oct. 15, 2020 in connection with International Patent Application No. PCT/US2019/026031 filed Apr. 5, 2019.

\* cited by examiner

| User | User ID | E-Mail Address | Title of Conversations of which User is a Member |
|---|---|---|---|
| Jim Smith | Jim_Smith | jsmith@yahoo.com | Project 1<br>Project 1 Meeting<br>Project 1 Results<br>Project 2<br>Project 2 Meeting<br>Project 3<br>Project 3 Meeting<br>Project 3 Results |
| Dave Jones | Dave_Jones | djones@gmail.com | Project 1<br>Project 1 Meeting<br>Project 1 Results<br>Project 2<br>Project 2 Meeting<br>Project 3<br>Project 3 Results |
| Mike Carter | Mike_Carter | mcarter@aol.com | Project 1<br>Project 1 Results<br>Project 2<br>Project 3 Meeting |
| Bob Williams | Bob_Williams | bwilliams@aol.com | Project 2<br>Project 3<br>Project 3 Results |

Fig. 4

| Conversation Title | Conversation ID | Members |
|---|---|---|
| Project 1 | 100 | Jim_Smith, Dave_Jones, Mike_Carter |
| Project 1 Meeting | 110 | Jim_Smith, Dave_Jones |
| Project 1 Results | 120 | Jim_Smith, Dave_Jones, Mike_Carter |
| Project 2 | 200 | Jim_Smith, Dave_Jones, Mike_Carter, Bob_Williams |
| Project 2 Meeting | 210 | Jim_Smith, Dave_Jones |
| Project 3 | 300 | Jim_Smith, Dave_Jones, Bob_Williams |
| Project 3 Meeting | 310 | Jim_Smith, Mike_Carter |
| Project 3 Results | 320 | Jim_Smith, Dave_Jones, Bob_Williams |

Fig. 5

User ID: Jim_Smith

| Conversation Title | Conversation ID | Members (User ID) | Parent ID | Creator | Progeny | Ancestor | Description | #Tag | Override parent ID | Virtual Parent ID | Resolved/Unresolved | Visibility |
|---|---|---|---|---|---|---|---|---|---|---|---|---|
| Project 1 | 100 | Jim_Smith Dave_Jones Mike_Carter | Null | JS | Project 1 Meeting; Project 1 Results | N/A | Project 1 | #Project1 | N/A | N/A | U | Private |
| Project 1 Meeting | 110 | Jim_Smith Dave_Jones | 100 | JS | Project 1 Results | Project 1 | Project 1, first meeting | #Project1Meeting | N/A | N/A | U | Private |
| Project 1 Results | 120 | Jim_Smith Dave_Jones Mike_Carter | 110 | Imported (DJ) | N/A | Project 1; Project 1 Meeting | Project 1, first meeting results | #Project1MeetingResults | N/A | N/A | U | Private |
| Project 2 | 200 | Jim_Smith Dave_Jones Mike_Carter Bob_Williams | Null | JS | Project 2 Meeting | N/A | Project 2 | #Project2 | N/A | N/A | U | Private |
| Project 2 Meeting | 210 | Jim_Smith Dave_Jones | 200 | JS | N/A | Project 2 | Project 2, first meeting | #Project2Meeting | N/A | N/A | U | Private |
| Project 3 | 300 | Jim_Smith Dave_Jones Bob_Williams | Null | DJ | Project 3 Meeting; Project 3 Results | N/A | Project 3 | #Project3 | N/A | N/A | U | Private |
| Project 3 Meeting | 310 | Jim_Smith Mike_Carter | 300 | JS | Project 3 Results | Project 3 | Project 3, first meeting | #Project3Meeting | N/A | N/A | U | Public |
| Project 3 Results | 320 | Jim_Smith Dave_Jones Bob_Williams | 310 | BW | N/A | Project 3; Project 3 Results | Project 3, first meeting results | #Project3MeetingResults | 210 | N/A | U | Private |

Fig. 6A

User ID: Mike_Carter

| Conver-sation Title | Conver-sation ID | Members (User ID) | Parent ID | Creator | Progeny | Ancestor | Description | #Tag | Over-Ride parent ID | Virtual Parent ID | Resolved/Unresolved | Visib-ility |
|---|---|---|---|---|---|---|---|---|---|---|---|---|
| Project 1 | 100 | Jim_Smith Dave_Jones Mike_Carter | Null | JS | Project 1 Meeting Project 1 Results | N/A | Project 1 | #Project1 | N/A | N/A | U | Private |
| Project 1 Results | 120 | Jim_Smith Dave_Jones Mike_Carter | 100 | Imported (DF) | N/A | Project 1; Project 1 Meeting | Project 1, first meeting results | #Project1MeetingResults | N/A | 100 | U | Private |
| Project 2 | 200 | Jim_Smith Dave_Jones Mike_Carter | Null | JS | Project 2 Meeting | N/A | Project 2 | #Project2 | N/A | N/A | U | Private |
| Project 3 Meeting | 310 | Jim_Smith Dave_Jones Mike_Carter Bob_Williams Jim_Smith Mike_Carter | 100 | JS | Project 3 Results | Project 3 | Project 3, first meeting | #Project3Meeting | N/A | 100 | U | Public |

Fig. 6B

User ID: Bob_Williams

| Conversation Title | Conversation ID | Members (User ID) | Parent ID | Creator | Progeny | Ancestor | Description | #Tag | Over-Ride parent ID | Virtual Parent ID | Resolved/Unresolved | Visibility |
|---|---|---|---|---|---|---|---|---|---|---|---|---|
| Project 2 | 200 | Jim_Smith Dave_Jones Mike_Carter Bob_Williams | Null | JS | Project 2 Meeting | N/A | Project 2 | #Project2 | N/A | N/A | U | Private |
| Project 3 | 300 | Jim_Smith Dave_Jones Bob_Williams | Null | DJ | Project 3 Meeting; Project 3 Results | N/A | Project 3 | #Project3 | N/A | N/A | U | Private |
| Project 3 Results | 320 | Jim_Smith Dave_Jones Bob_Williams | 200 | BW | N/A | Project 3; Project 3 Results | Project 3, first meeting results | #Project3MeetingResults | 210 | 200 | U | Private |

Fig. 6C

Create or Import Conversation

User ID: Jim_Smith

● Create  ○ Import

Visibility Setting:
● Private  ○ Public

Title: Project_1_Meeting
Description: Project 1 first meeting
Hashtags: #ProjectMeeting
Resolved/Unresolved: Unresolved
Resolve by date: N/A
Invite Registered Users: Dave_Jones
Invite Non-registered Users:
Deadline: September 5, 2018

Fig. 9A

User ID: User_1

| Conversation Title | Members (User ID) | User-specific behavioral score for members | Time in conversation | Messages posted by User_1 in conversation | Responsiveness to conversation | Responsiveness to other members of conversation | User-specific behavioral score for conversation |
|---|---|---|---|---|---|---|---|
| Conversation 1 | User_1<br>User_2 | User_2 (0.1) | 2 minutes | 1 | 2 days | User_2 (2 days) | 0.2 |
| Conversation 2 | User_1<br>User_3 | User_3 (0.6) | 15 minutes | 5 | 3 minutes | User_3 (3 minutes) | 0.9 |
| Conversation 3 | User_1<br>User_2<br>User_4 | User_2 (0.1)<br>User_4 (0.3) | 10 minutes | 2 | 2 days | User_2 (3 days)<br>User_4 (1 day) | 0.3 |
| Conversation 4 | User_1<br>User_3 | User_3 (0.6) | 12 minutes | 4 | 15 minutes | User_3 (15 minutes) | 0.6 |
| Conversation 5 | User_1<br>User_2<br>User_4 | User_2 (0.1)<br>User_4 (0.3) | 10 minutes | 2 | 45 minutes | User_2 (30 minutes)<br>User_4 (1 hour) | 0.4 |

Fig. 15

DIGITAL CONVERSATION MANAGEMENT

TECHNICAL FIELD

This disclosure relates to tools (such as systems, apparatuses, methodologies, computer program products, etc.) to manage digital conversations.

BACKGROUND

Given recent improvements in communication and information technology, many people have become accustomed to constant access to information and data services by using mobile devices (such as smartphones, tablets, notebook computer, etc.). Such mobile devices allow users to access information via any of various media such as e-mail and messaging when an oral conversation is not possible, convenient, suitable, etc., as well as in other circumstances. Further, the web provides a whole world of available content and information. In addition, software applications running on the mobile devices may allow the user to access content or information through the Internet and/or another data network.

However, in conventional software applications and web sites which facilitate communication between users, it is very difficult for a user to quickly and effectively organize electronic messages received from other users into an easily comprehensible format. For example, although many software applications may present electronic messages in chronological order according to date/time that the message was received (and thus the messages received on a particular day would be presented together), it is difficult for a user to organize the electronic messages received that day in a meaningful way (e.g. to group related content together).

Many users are becoming dissatisfied with such approaches which merely lump unrelated electronic messages together, since a user is then required to locate each message related to a topic (e.g., a project the user is working on with co-workers), which can be time-consuming and burdensome.

BRIEF SUMMARY

Various tools (for example, system, apparatus, application software, methodology, etc.) can be configured to enable users to effectively manage digital conversations.

In an aspect of this disclosure, a method may be performed by, in or with a workflow organizing application (or a system including a workflow organization application) to enable conversations of which a user is member to be arranged in a hierarchical tree structure which is specific to the user and displayed on a mobile device or another terminal. A digital conversation processed and presented in such manner may be more readily managed.

For example, such system may be configured to provide the ability to search and display specific types of data associated with any selected conversation in the tree structure and progeny (e.g., children, grandchildren, great-grandchildren, and so on) and/or ancestor conversations (e.g., parent, grandparent, great-grandparent, etc.). In such managed conversation, messages may constitute a content of the managed conversation (although the content in the system may include posts, attachments, appointments, etc.) and the user is permitted to select any conversation within the tree structure specific to the user and to post a new message to such selected conversation. This approach can treat conversations as communication environments, and simultaneously also as folders to organize other conversations. Each conversation, depending on its relative positioning within the tree, can be processed according to an associated workflow.

In another aspect of this disclosure, the system may maintain additional information, such as a parent ID associated with a managed conversation, member information indicating, for example, a conversation creator, a lead member, and other conversation members of the managed conversation, as well as other information related to the conversation to facilitate its management and access, as well as organization of conversations at large. Thus, users can conveniently access digital conversations in a tree structure, and easily add members to such managed conversations and post messages in such managed conversations.

The tools can generate a managed conversation structure based on a conversation created by a conversation creator or a conversation imported from another application or conversation source. For example, if an imported conversation has common members or similar subject matter to a managed conversation in the tree structure specific to the user, messages in the imported conversation may be merged into the similar managed conversation, or a conversation ID of the similar managed conversation as the parent ID of the imported conversation. Such aspects allow an imported conversation (e.g., from e-mail, social network, etc.) to be integrated into an appropriate conversation, which allows a user to have all relevant communications in a single location, regardless of the origin of the conversation.

In addition, a managed conversation may be as a child to a parent conversation which, along with its parent and other ancestors (e.g., grandparent, great-grandparent, etc.) constitute ancestor conversations to the managed conversation. If a user is a member of a parent conversation and selects a conversation in the tree structure specific to the member and connects the selected conversation to such parent conversation, such selected conversation in the tree structure specific to the member may inherit the ID of the parent conversation as a parent ID associated with the selected conversation in such tree structure.

The parent ID of the managed conversation relative to the user may be different than the parent ID of the managed conversation in the tree structure specific to another conversation member of the managed conversation. For example, the user may be assigned, as a virtual parent ID of a managed conversation relative to the user, a conversation ID of a nearest ancestor conversation, such as when the user is not a conversation member of a conversation identified by an original parent ID of the managed conversation relative to the conversation creator member. If a user selects a conversation in the tree structure and places such selected conversation as a progeny to a new parent conversation, but another member of the selected conversation is not a member of such new parent conversation, a conversation ID of a nearest ancestor conversation (that such another member is a member of and from which the managed conversation branches) may be used as a virtual parent ID. A conversation member is permitted to assign an override parent conversation to a managed conversation, which can substitute (in the tree structure specific to the conversation member or in the tree structure specific to another member of the managed conversation) an override parent ID for the existing parent ID associated with the managed conversation.

In another aspect of this disclosure, the system may be configured to proactively predict, as the user starts to enter a message, the conversation to which the message is likely to be associated. For example, the system may, upon receiving entry by the user of a message to be posted, such as in a homescreen, apply natural language processing and/or other adaptively intelligent processing to the draft message and match (e.g., by semantic similarity of) the message to one or more conversations and suggest such matched conversations as candidates to which the message may be posted upon completion of entry. The search may exclude common greetings and other words, such as "hey", "what's up", "top", "the", "and", etc. As another matching technique, when the search identifies a single non-excluded word which matches the first word OR last name of a contact (e.g., someone with whom the user has had one or more conversations, or who resides in any contact list or database which the user has decided to associate with the system), or if the search identifies two consecutive words which match the first and last names of a contact, the system can suggest such contact as a candidate addressee of the message. If the user selects such a suggested addressee, the system may additionally suggest specific conversations of which the addressee is a member, to which the message might be posted. As another search option, words of a message may be matched to the names of conversations to identify candidate conversations. If the user selects a conversation, the user may be redirected to the selected conversation while the message remains in draft form in the message composition box and available to be posted. The system may be configured to display a list of the managed conversations in descending order of relevancy, and the user may be permitted to post a message to a conversation selected from the list of matched conversations. Such tools may allow a user to allow the system to suggest for the user which conversation is most appropriate for the message to be posted, during user entry of the message. The system may also be configured to track one or more usage attributes of each managed conversation and select, by an adaptive intelligence model of the workflow organization system, such usage attributes of each managed conversation and determine importance of each managed conversation relative to the user and importance of the members of each managed conversation relative to the user based on the selected usage attributes. Such managed conversations may be displayed in descending order of importance of the conversation.

BRIEF DESCRIPTION OF THE DRAWINGS

The aforementioned and other aspects, features and advantages can be more readily understood from the following detailed description with reference to the accompanying drawings wherein:

FIG. 4 shows an example of a user table, such as maintained in the system of FIGS. 2A and 2B (or an equivalent);

FIG. 5 shows an example of a conversation data table, such as maintained in the system of FIGS. 2A and 2B (or an equivalent);

FIGS. 6A-6C show examples of user conversation tables, such as maintained, for respective users, in the system of FIGS. 2A and 2B (or equivalent);

FIGS. 9A-9L show examples of user interface screens that can be provided by the workflow organizing application or system, according to the exemplary embodiments shown in FIGS. 2A and 2B (or equivalent);

FIG. 15 show an example of a user relationship table, such as maintained, for respective users, in the system of FIGS. 2A and 2B (or equivalent).

DETAILED DESCRIPTION

Figure 1:
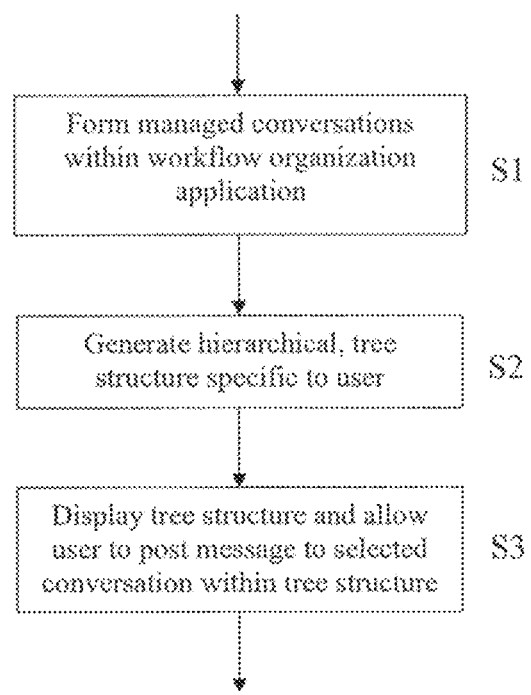
FIG. 1 is a flow chart showing a method that can be performed by workflow organizing application or system, according to the exemplary embodiment shown in FIGS. 2A and 2B (or an equivalent)

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations is omitted when it may obscure inventive aspects of the present disclosure. Referring now to the drawings, wherein like reference numerals designate identical or corresponding parts throughout the several views, there are described tools (e.g., systems, apparatuses, methodologies, computer program products, etc.) including various inventive aspects (each of which can stand apart from or can be combined with the other aspects) for enabling a user to manage digital conversations.

Various aspects of managing and/or organizing digital conversations are discussed herein, with reference to a workflow organizing application. It should be appreciated by those skilled in the art that any one or more of such aspects or features may be embedded in another application or system and/or in any of various other ways, and thus while various examples are discussed herein, the inventive aspects of this disclosure are not limited to such examples described herein. As should be appreciated by the skilled artisan, the aspects and features disclosed herein may be provided via a platform, application, or as a service (otherwise), via a network.

Figure 2A:
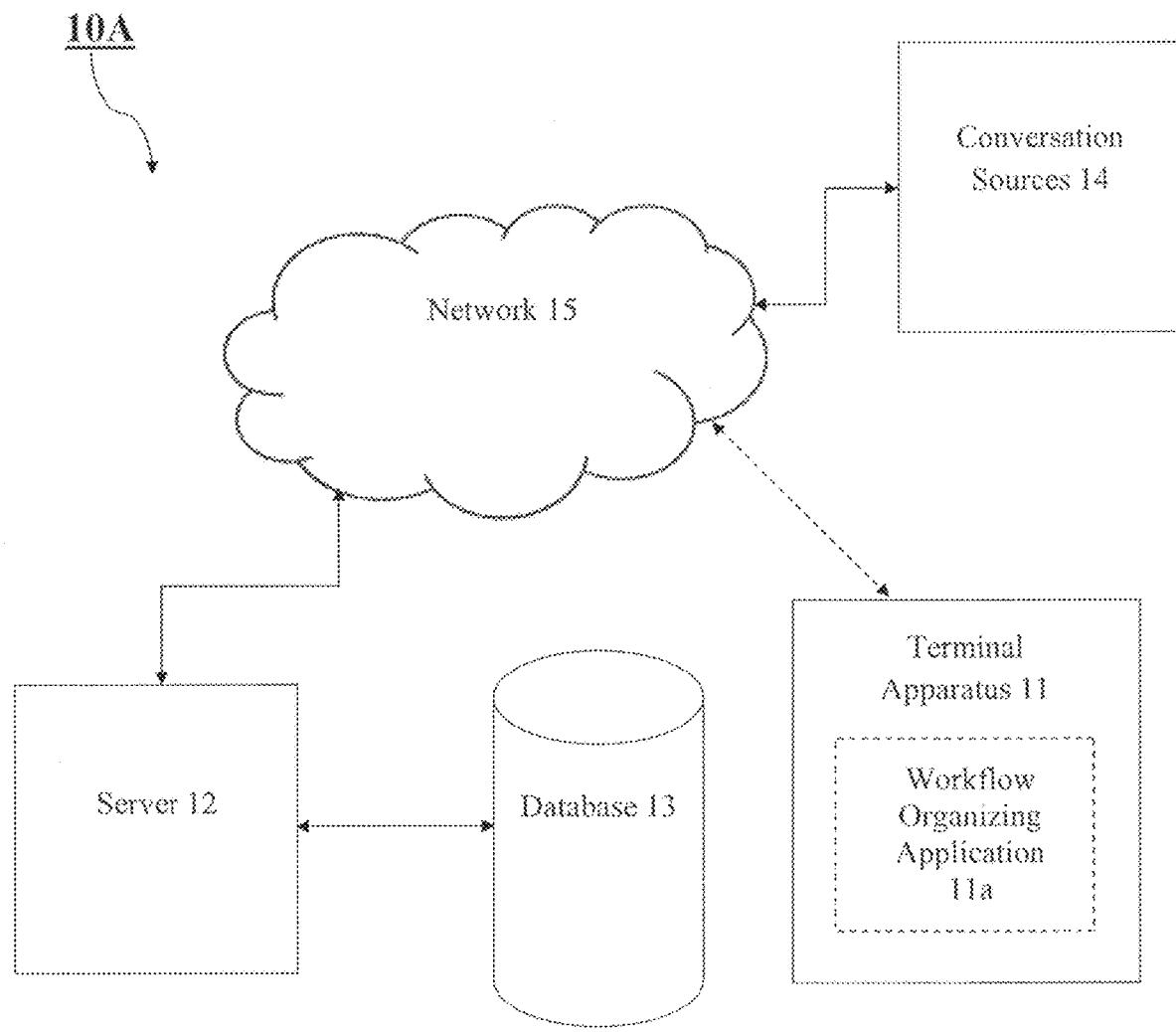
FIG. 2A is a block diagram showing a system for managing digital conversations, according to an exemplary embodiment.
Figure 2B:
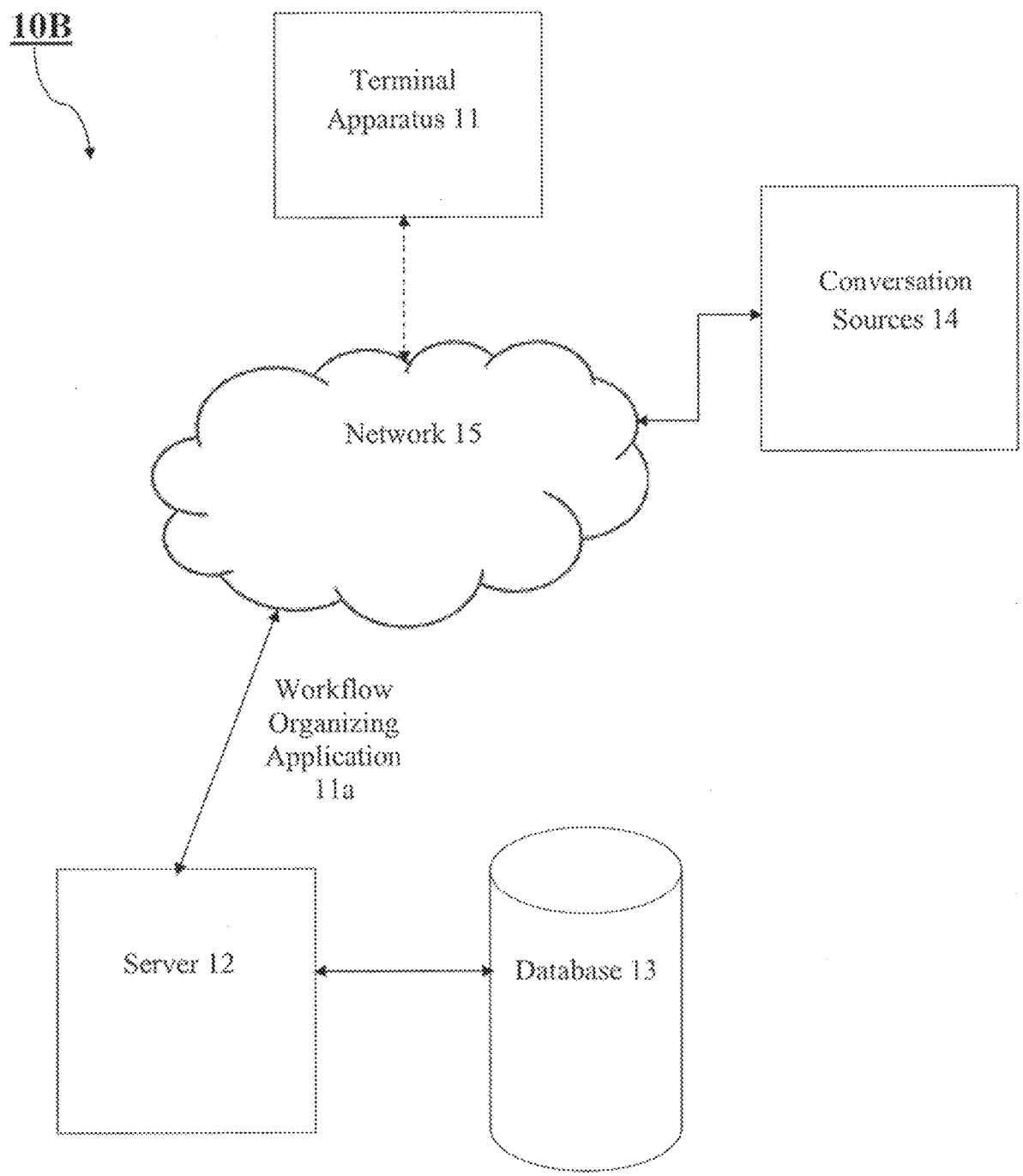
FIG. 2B is a block diagram showing a system for managing digital conversations, according to another exemplary embodiment.

FIG. 1 shows a method to facilitate organizing workflows which can be performed by workflow organizing systems 10A or 10B of FIGS. 2A and 2B. Within workflow organization application 11a, conversation data structures can be formed (step S1; FIG. 1) which include messages constituting content of each managed conversation. Member information indicating a conversation creator member, and other conversation members of the managed conversation, as well as additional information for the managed conversation including a parent ID associated with the managed conversation, may be maintained. For each user of the workflow organization application 11a, a hierarchical tree structure specific to the user is generated (step S2; FIG. 1). The tree structure specific to the user includes conversations of which the user is a member, and is generated according to, each conversation in the tree structure, the parent ID of the managed conversation relative to the user. The tree structure can be displayed, which permits the user to select any conversation within the tree structure specific to the user and permits the user to post a new message to such selected conversation (step S3; FIG. 1).

FIGS. 2A and 2B show respective workflow organizing systems 10A and 10B, each including a terminal apparatus 11, a server 12, a database 13, and one or more conversation sources 14, all of which are interconnected by network 15.

Workflow organizing application 11a may be provided natively on the terminal apparatus 11, such as in the embodiment shown in FIG. 2A, or may be provided by the server 12 on demand from the terminal apparatus 11, such as in the embodiment shown in FIG. 2B. For example, the user may specify via an icon, or via another visual or speech cue, that the user would like to access the application, and upon such request of the user, the server 12 provides the application through the network 15 to the terminal apparatus 11. As another example, the application is provided on demand via the web and the user uses a browser on the native terminal apparatus 11 to request the application.

In each such example, the application provided on the terminal apparatus 11 enables the user to manage digital conversations and the digital conversations available to be managed are arranged in a hierarchical, tree structure. The application generates, for each user, a hierarchical, tree structure specific to the user, including the conversations of which the user is a member. As discussed, infra, the tree structure is generated based on, for each conversation, a parent ID maintained for the managed conversation relative to the user.

In a preferred embodiment, the workflow organizing application 11a may be a mobile application (commonly known as "app"), and the user may operate a user interface on the terminal apparatus 11 to access the workflow organizing application 11a. In another embodiment, the workflow organizing application 11a may also be implemented as a web portal, which a user of the terminal apparatus 11 may access via a request to the server 12. For example, the user may activate a browser on the terminal apparatus 11 and enter a uniform resource locator (URL) to the workflow organizing application 11a, access the workflow organizing application 11a via a shortcut or bookmark or via search results provided by a search engine, or from another web page providing a link to the workflow organizing application 11a.

The workflow organizing application 11a may provide a graphical user interface through which the user can input, when creating a profile for the workflow organizing application 11a, personal information (e.g., first name, last name, etc.), contact information (such as e-mail addresses, telephone numbers, etc.), authentication information (e.g., user name, password, etc.) for accessing the workflow organizing application 11a, and an icon, which may be automatically generated (such as, for example, by uploading a .jpeg or .png file), and optionally cropping the uploaded file into a circular icon space. The workflow organizing application 11a is configured to register the account for the user, after the user has finished entering his or her personal information.

The user interface may include, or be integrated with, components for speech processing, voice recognition, fingerprint scanning, facial recognition, retina scanning, other forms of biometric data collection, etc. Such components, like the user interface, can include a combination of software and hardware components. Since provisions are generally known in the art, and do not form an inventive aspect of this disclosure, details thereof are not provided herein in order to avoid obscuring inventive aspects of this disclosure.

Each of the managed conversations in the workflow organizing application 11a includes messages which constitute a content of the managed conversation, and may be created by a user of the workflow organizing application 11a that is a conversation creator member (and in such instance, the conversation is a native conversation) or may be imported (also referred to herein as an imported conversation) by a user of the workflow organizing application 11a from another application or conversation source 14 (e.g., a database storing e-mails of the user). The conversation creator and one or more other conversation members (e.g., preferably application users) is included in member information maintained by the workflow organizing application 11a. The workflow organizing application 11a also maintains additional information, including a parent ID associated with the managed conversation relative to the user, according to which each conversation in the tree structure is generated. A unique conversation ID may be associated with the conversation, in addition to the parent ID, and such unique conversation ID and the parent ID may be registered in the database 13 and/or in local storage on a front end (e.g., the workflow organizing application 11a). An original parent conversation may be the direct parent conversation assigned by the conversation creator to the created conversation.

When the conversation is imported into the workflow organizing application from another application or conversation source 14, it is determined whether a similar managed conversation having similar subject matter or common members with those of the imported conversation exists, and messages in the imported conversation may be merged into the similar managed conversation or assigned a conversation ID of the similar managed conversation as the parent ID of the imported conversation. The determination of similarity may apply natural language processing (NLP) or other adaptively intelligent processing, as discussed infra. Further, when the user starts to compose a new message, such processing may be applied to suggest one or more relevant conversations to which the message can belong.

For each user of the workflow organizing application 11a, the tree structure specific to the user is displayed, and the user is permitted to select any conversation within the tree structure specific to the user and the user is permitted to post a new message (constituting the content of the managed conversation) to the selected conversation. When the user selects any conversation within the tree structure specific to the user, a timeline including each message that has been posted to the selected conversation since the user became associated with the conversation may be presented to the user in chronological order. For example, the user may be redirected to such presented timeline, while the content of any message being drafted remains in a message composition box provided in field 75 and can be further edited and then posted to the conversation timeline. Such timeline may be configured to be a communication environment specific to the user or otherwise and including attachments (e.g., files), appointments, other types of data, etc., generated in connection with the conversation.

Each managed conversation may be associated with progeny conversations (that is, child, grandchild, great-grandchild, and so on) and such progeny conversations, as well as their content (e.g., messages, attachments, appointments) can be viewed, sorted and searched by the user. Each managed conversation may also include ancestor conversations, which may include the entire set of ancestor conversations relative to the user including a direct parent (if one exists), a direct parent of the direct parent (if one exists), a direct parent of the direct parent of the direct parent (if one exists), etc. A root conversation may be considered a conversation in which the parent ID is set to "Null" (for example, conversation entitled "Project 1" in FIG. 6A), and may be considered a conversation which does not have a direct parent conversation relative to the user, which may indicate that the conversation was either created by the user or another user without an original parent conversation, or the user is not a member of the original parent conversation or is not a member of an override parent ID which is assigned for the user by another conversation member.

The server 12 may provide processing for the workflow organizing application 11a and can also access, or provide access to, database 13 which can store the registration data obtained from the user (e.g., the user's name, contact information, password, user icon, etc.) and stores one or more items received from the server 12, such as the member information including conversation creator and one or more other conversation members is included in the managed conversation, and the additional information, including the parent ID associated with the managed conversation relative to the user, according to which each conversation in the tree structure is generated, and a unique conversation ID. Although the server 12 is illustrated in FIG. 2A and in FIG. 2B as a single logical server, it should be appreciated that the logical server may be implemented on n cluster of servers or if necessary, on a server farm.

The server 12 may be configured to provide the workflow organizing application 11 on demand (FIG. 2B). Although not shown explicitly in FIGS. 2A and 2B, middleware may be provided server-side to bridge the program logic between the terminal apparatus 11 and the server, and in such instance, the server 12 should be construed as encompassing the middleware as well as the back-end server. Such middleware may alleviate the interactive load from workflow organizing application 11a executing on the terminal apparatus 11 (particularly when the application 11a is present as a thin-client on the terminal, and much of the processing is performed server-side).

The user may operate a user interface on the terminal apparatus 11 to access the workflow organizing application 11a from the server 12. When the user desires to access the workflow organizing application 11a, the terminal apparatus 11 may send a request to the server 12, and in response the server 15 may provide the workflow organizing application 11a to the terminal apparatus 11. In this case, the workflow organizing application processing may be largely performed on the server-side. On the other hand, in the workflow organizing system 10A shown in FIG. 2A, processing may be performed at least in part on the terminal apparatus 11 side. The configuration of the server 13 may be similar to that of the terminal apparatus 11, as discussed infra, although the server 13 may have more processing power and be capable of handling a larger processing load, such as multiple client sessions simultaneously, may include greater storage capabilities, and may or may not include a display.

The database 13 may store therein a simple collection of data using a format (e.g., CSV format) or without a format, and may utilize a database software application.

The network 15 can be a local area network, a wide area network or any type of network such as an intranet, an extranet (for example, to provide controlled access to external users, for example through the Internet), a private or public cloud network, the Internet, etc., or a combination thereof. Further, other communications links (such as a virtual private network, a wireless link, etc.) may be used as well for the network 13. In addition, the network 13 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

While the components of workflow organizing systems 10A and 10B is shown in FIGS. 2A and 2B, respectively, to be connected to the network 15, this may not always be the case. For example, the terminal apparatus 11 may connect directly with any of the database 13 directly and not through the server 12, such as when the address (e.g., IP Address, Mac Address, URL, etc.) of the database 13 is known, and in some instances, may connect directly to it in a peer-to-peer fashion.

Figure 2C:
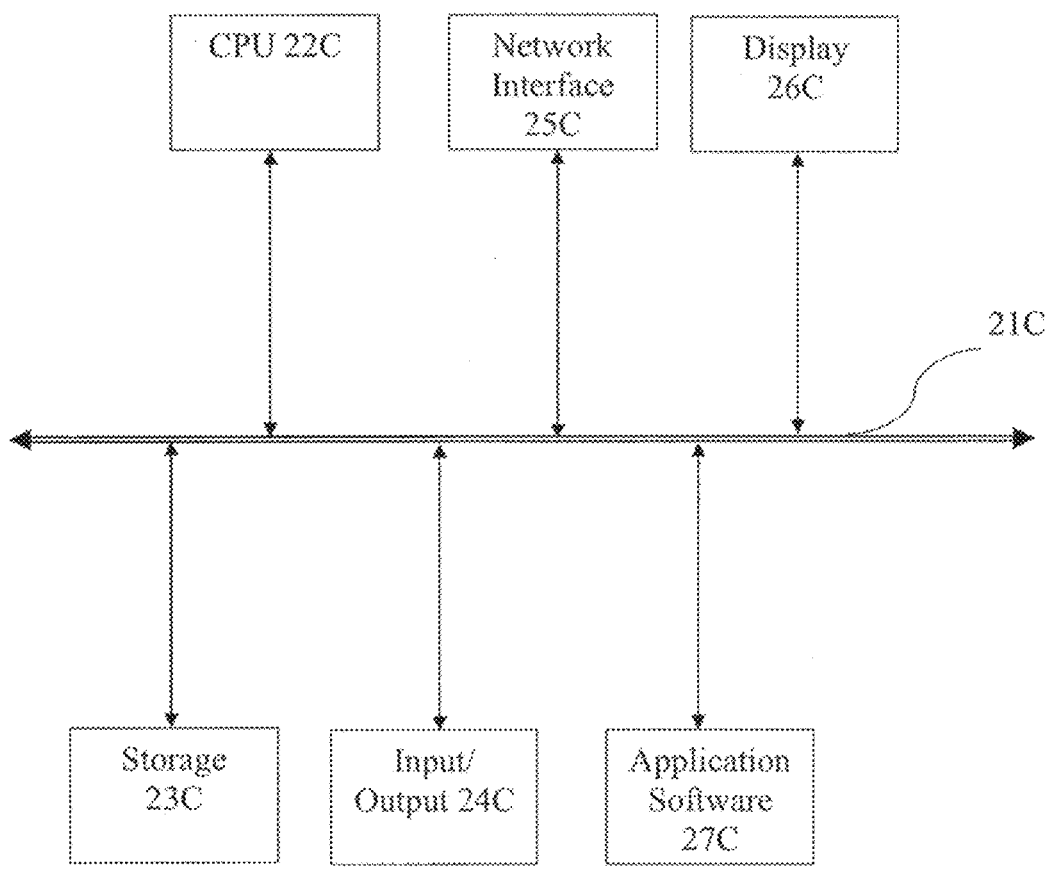
FIG. 2C is a block diagram showing an example of a configuration of the terminal apparatus in the system of FIGS. 2A and 2B (or an equivalent)

The terminal apparatus 11 can be any information terminal, including but not limited to a notebook computer, a tablet computer, a mobile phone or handset, a PDA (personal digital assistant), a desktop computing device or workstations, another computing device, an information kiosk, a head-mounted display device with or without microphone and speech input provisions, another digital communication access device, etc., that can, and is configured to, communicate with other devices through the network 15. An example of configuration of a terminal that may be employed for the terminal apparatus 11 is shown schematically in FIG. 2C. The terminal device 20C may be configured by application software 27C to permit a user to manage digital conversations including one or more members communicating via the network 15. A terminal device 20C includes a CPU 22C in communication via bus 21C with storage 23C, other input/output (such as mouse, touchpad, stylus, keyboard/keypad, microphone and/or speaker with voice/speech interface and/or recognition software, image recognition device etc.) 24C, a network interface 25C, a display 26C, and application software 27C.

The storage 23C can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 25C provides a connection (for example, by way of an Ethernet connection or other network connection which supports any desired network protocol such as, but not limited to TCP/IP, IPX, IPX/SPX, or NetBEUI) to a network (e.g. network 15 shown in FIGS. 2A-2B). The network interface is configured to communicate with any particular device amongst plural heterogeneous devices that may be included in a system in a communication format native to the particular device. The network interface may determine an appropriate communication format native to the particular device by any of various known approaches. For example, the network interface may refer to a database or table, maintained internally or by an outside source, to determine an appropriate communication format native to the device. As another example, the network interface may access an Application Program Interface (API) of the particular device, in order to determine an appropriate communication format native to the device.

Additional aspects or components of the terminal device 200 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

The server 12 and/or the database 13 may have a similar configuration to the terminal apparatus 12, although the server 12 may not include a display or input/output device, and instead may be configured remotely.

Figure 2D:
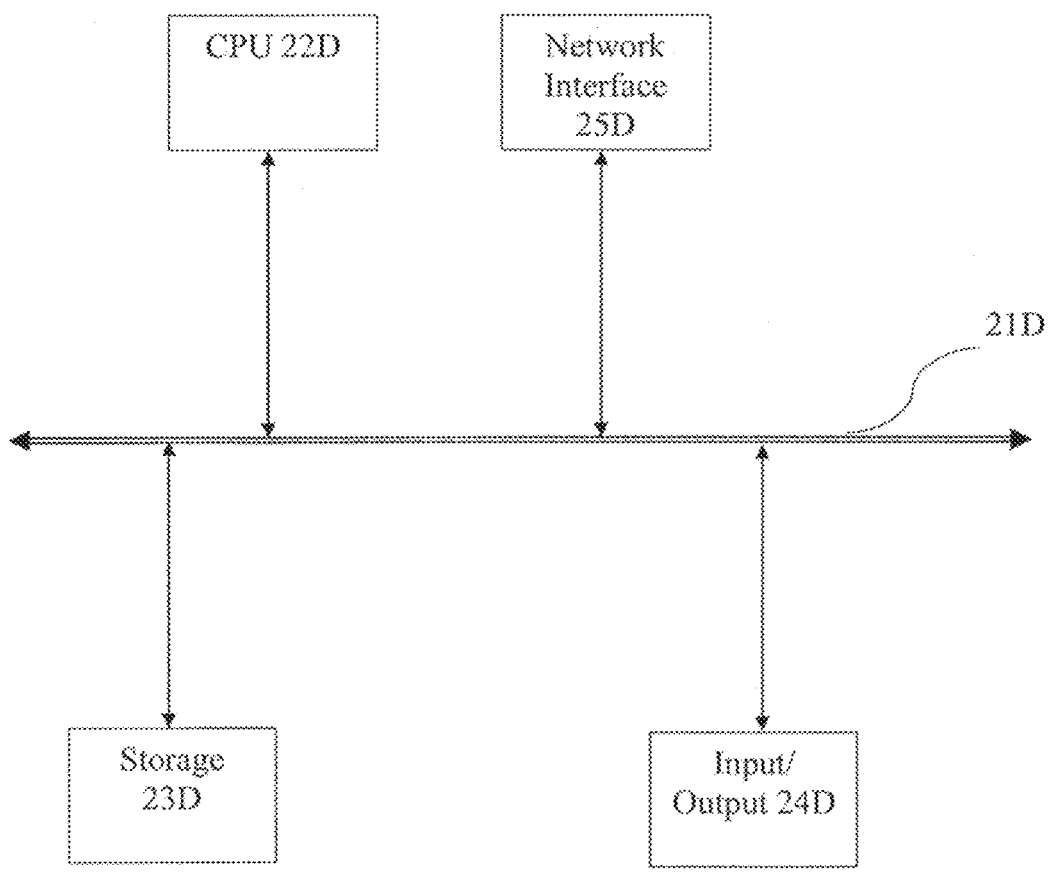
FIG. 2D is a block diagram showing an example of a configuration of the server and/or database of FIGS. 2A and 2B (or an equivalent)

FIG. 2D shows an exemplary constitution of a computer 20D that can be configured (for example, through software) to operate (at least in part) as the server 12 and/or the database 13 of FIG. 2A or FIG. 2B. As shown in FIG. 2D, the computer 20D includes a CPU 22D that communicates with a number of other components, including input/output 24D, memory or storage part 23D and network interface 25D, by way of a system bus 21D. The computing device 20D may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as may be appreciated to those skilled in the relevant arts.

Additional aspects or components of the computing device 20D are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

FIGS. 3A-3G shows a method or process performed by a workflow organizing system to manage digital conversations, according to an exemplary embodiment.

In an example of a process discussed below with reference to FIGS. 4, 5, 6A-6C and 7A-7F, a user may utilize a user interface of the workflow organization application 11a which may include a graphical user interface to facilitate managing digital conversations in the workflow organization application 11a of the workflow organization system 10A or 10B. Such system enables each of the managed conversations of which the user is a member to be arranged in a hierarchical, tree structure to allow the user to conveniently organize, view and interact with the digital conversations, and such conversations are managed in an approach that employs both group-centric and user-centric aspects.

FIG. 4 shows an example of a user table for users of the workflow organizing application 11a. Such user table may contain, for example, data associating each user with a user ID to identify the user in the workflow organizing application 11a and data identifying conversations of which each user is a member.

FIG. 5 shows a master user table which may include information regarding all conversations on the workflow organizing application 11a (e.g., a title of each conversation, members of the managed conversations and conversation IDs of the managed conversations). Such user table is preferably stored on the server 12 and/or database 13. However, in some embodiments, such master table may be stored locally on the terminal apparatus 11.

FIG. 6A shows an example of a user conversation table for, for example, the user "Jim Smith" (corresponding to user ID "Jim_Smith"), which may be referenced in forming the one or more managed conversations for a tree structures specific to a user, which includes all conversations of which the user is a member. The conversation data table may be stored in the server 12 and/or the database 13, and/or the terminal apparatus 11. In one embodiment, the conversation data table may be created upon user log-in. In another embodiment, the conversation data table may be maintained even when the user is not logged in and may be presented to the user upon user log-in.

The conversation data table may include information about each conversation which the user is a member (e.g., a title each of the conversations of which the user is a member, a unique conversation ID for each conversation, a parent ID of each of the conversations relative to the user, the members of each conversation, a creator of each conversation, progeny conversation(s) of each conversation, ancestor conversation(s) of each conversation, an override parent ID associated with a conversation, a virtual parent ID of each conversation, a Description of the conversation, hashtags associated with the conversation, an indication of whether the conversation has a resolved or unresolved status, a visibility setting of the conversation, etc.).

FIG. 6B shows a user conversation table for, for example, the user "Mike Carter" (corresponding to user ID "Mike_Carter"). The conversation data table for the user "Mike Carter" may show only the conversations of which he is a member ("Project 1", "Project 1 Results", "Project 2", "Project 3 Meeting"), while omitting conversations of which he is not a member.

FIG. 6C shows a user conversation table for, for example, the user "Bob Williams" (corresponding to user ID "Bob_Williams"). The conversation data table for the user "Bob Williams" may show only the conversations of which he is a member ("Project 2", "Project 3", "Project 3 Results"), while omitting conversations of which he is not a member.

Figure 3A:
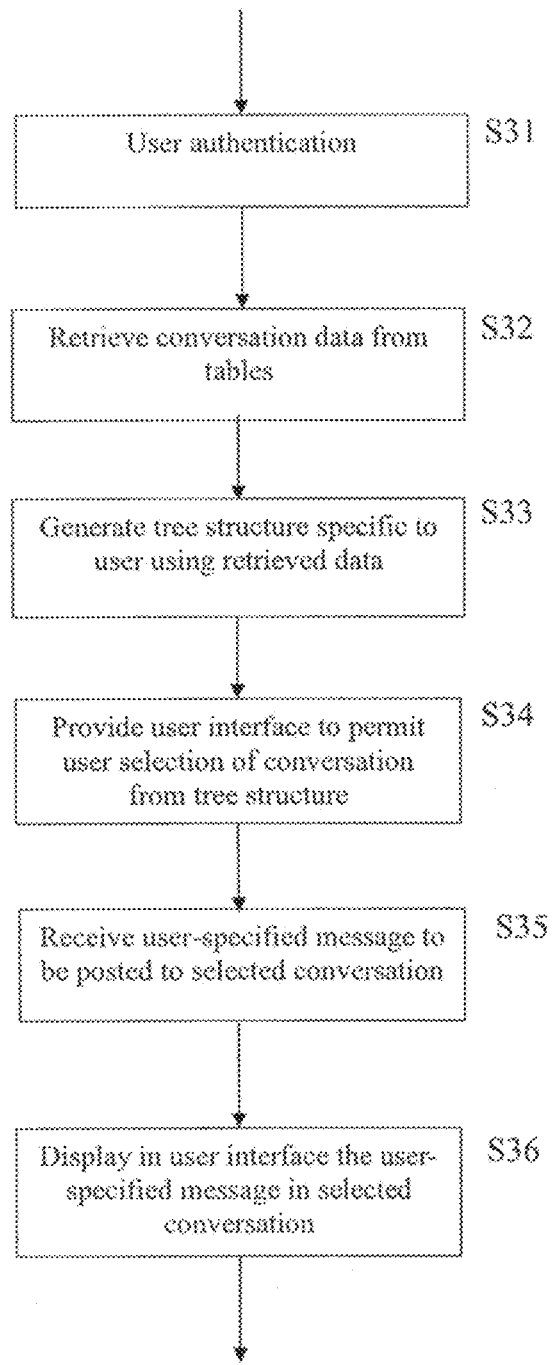
FIGS. 3A-3G are flow charts showing a method that can be performed by workflow organizing application or system, according to the exemplary embodiment shown in FIGS. 2A and 2B (or an equivalent)
Figure 7A:
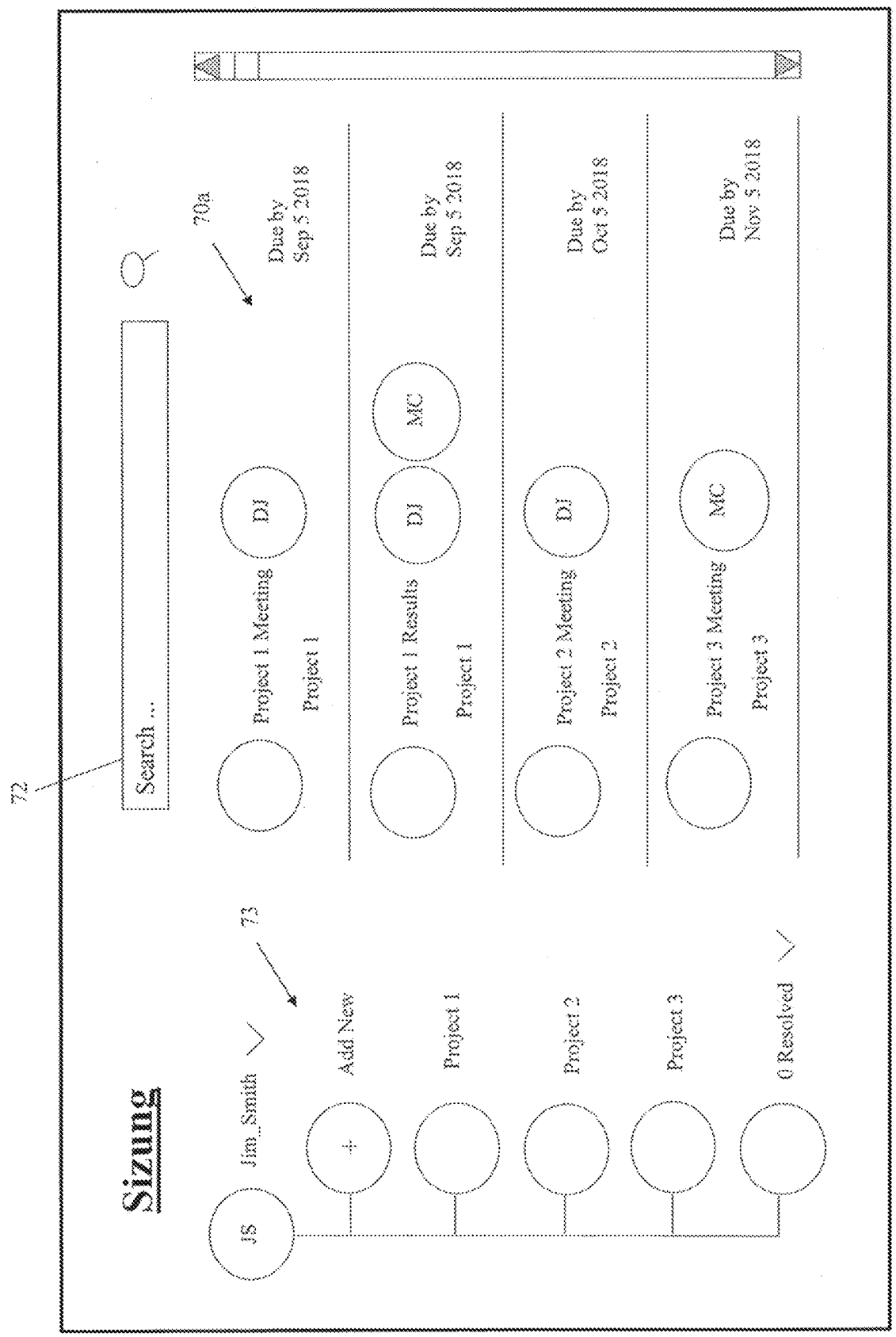
FIGS. 7A-7F show examples of user interface screens that can be provided by the workflow organizing application or system, according to the exemplary embodiment shown in FIGS. 2A and 2B (or equivalent)

If a user ("Jim Smith") is already registered on the workflow organizing application 11a, the user may access the workflow organizing application 11a (e.g., "Sizung") by, for example, providing log-in information via the graphical user interface of the terminal apparatus 11 (step S31; FIG. 3A). After the user's log-in information is authenticated, the conversation data contained in the user conversation table for "Jim Smith" (FIG. 4) may be retrieved, cross-referenced with the information in the master user table (FIG. 5) and used to retrieve information in the conversation data table (FIG. 6A) for the user "Jim Smith" (step S32; FIG. 3A) from the database 13 and/or the server 12, for example. The table may alternatively be retrieved locally from the terminal apparatus 11. Next, using the data retrieved from the conversation table, a hierarchical, tree structure provided in field 73, specific to the user, of managed conversations of which the user is a member, may be generated according to, for each conversation in the tree structure, the parent ID of the managed conversation relative to the user (step S33; FIG. 3A). The workflow organizing application 11a may provide a user interface to permit user selection of a conversation from the tree structure provided in field 73 specific to the user, such as shown in FIG. 7A (step S34; FIG. 3A). In this case, an icon with the initials "JS" may be provided for the user (e.g., "Jim Smith" having user ID "Jim_Smith"), and a prioritized list of conversations 70a may be provided to the user, as discussed infra, with reference to the adaptive intelligence module 130 of FIG. 13. The prioritized list of conversations, as shown in FIG. 7A, may be ordered based on a sorted order of importance.

Figure 7B:
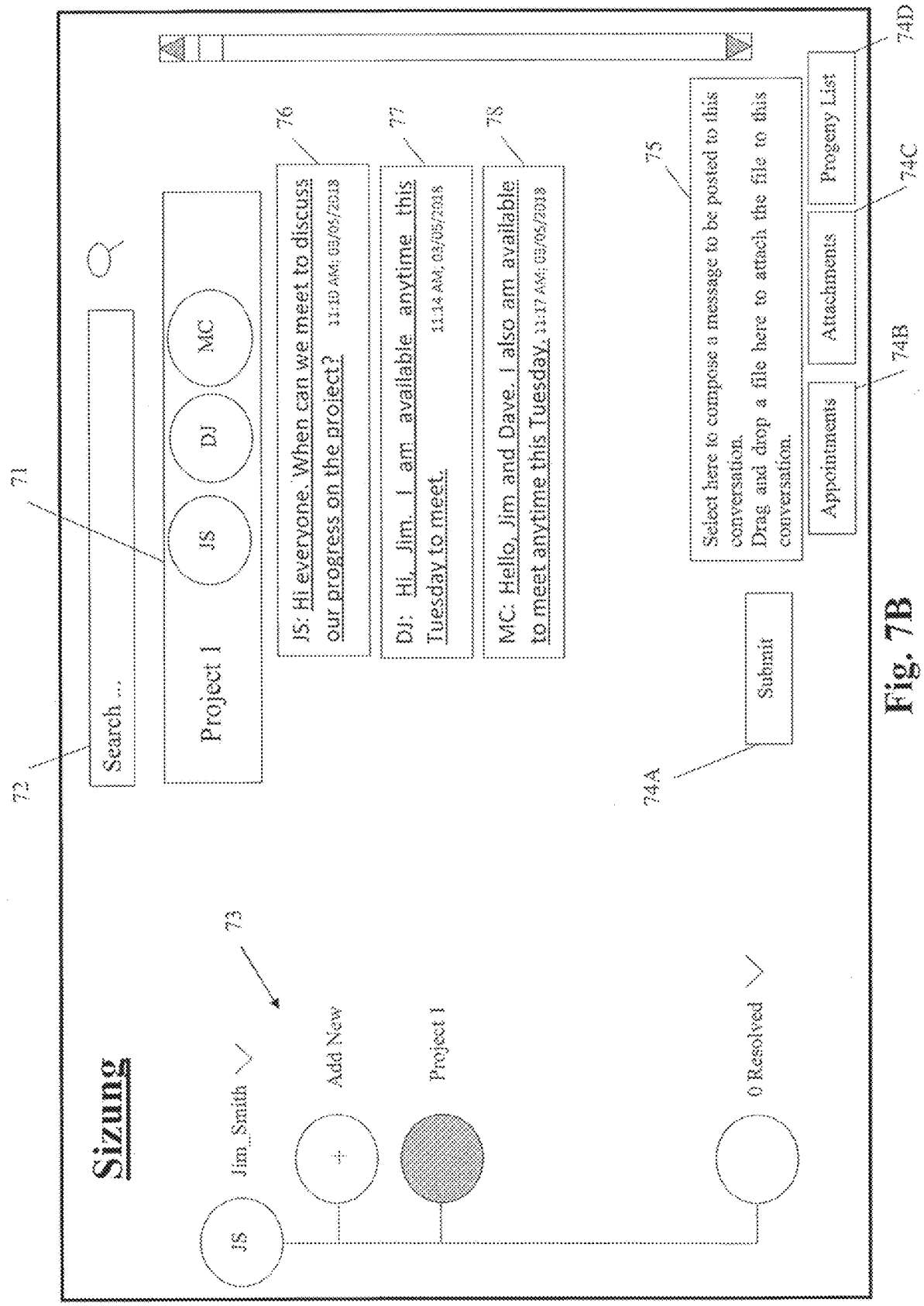

Upon the user selecting a conversation having a title "Project 1", the user interface may provide information (e.g., in field 71) indicating the selected conversation and members of the selected conversation. As shown in FIG. 7B, messages provided in message fields 76, 77 and 78 have been previously posted in the selected conversation "Project 1", by each of the users "Jim Smith" (Jim_Smith; JS), "Dave Jones" (Dave_Jones; DJ) and "Mike Carter" (Mike_Carter; MC), respectively.

Figure 7C:
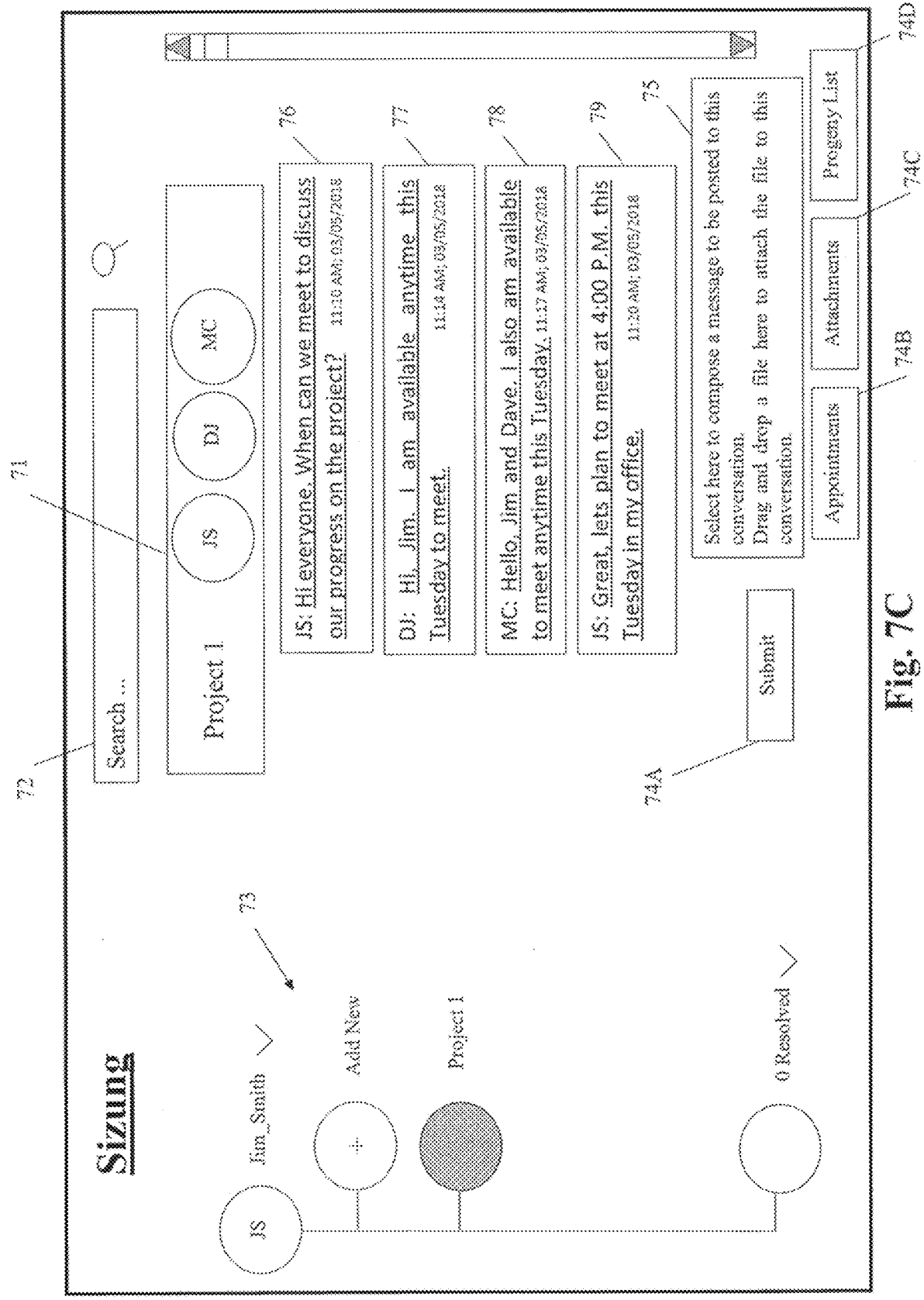

The workflow organizing application 11a then may receive a user-specified message to be posted to the selected conversation "Project 1", provided in message field 79 (step S35; FIG. 3A). As shown in FIG. 7C, the received user-specified message provided in message field 79 may be posted to conversation "Project 1" and displayed in the user interface (step S36; FIG. 3A), when, for example, the user selects the "Submit" field 74A provided by the user interface after composing a message. The message may include a series of characters entered by the user and a unique timestamp associated with a single conversation and its present members at the time the message is created (e.g., "JS: Great, lets plan to meet at 4:00 P.M. this Tuesday in my office." may have a timestamp of "11:20 AM; Mar. 5, 2018"). A message composition box may be provided in field 75 to allow a user to draft and modify content of the message prior to posting the message. Such messages may be posted in a timeline including each message that has been posted to the selected conversation since the user became associated with the conversation presented to the user in chronological order. For example, upon a user entering a timeline for a managed conversation, in a case that there are no messages the user has not seen in the timeline, the user may be taken to a point in the timeline where the newest message is located at the bottom of the timeline. On the other hand, the user may be taken to a point in the timeline of the managed conversation where a message posted before any messages not yet seen by the user is at the top of the timeline, when there are messages that have not been seen by the user in the timeline.

A user may also add appointments associated with the selected conversation and its progeny conversations via field 74B, for example. Such calendar appointments may automatically be updated with content of messages posted in each conversation in the tree structure specific to the user, and a user may be presented with only appointments pertinent to a particular conversation or group of conversations, such as a conversations and all progeny conversations of a that conversation, and other schedule blocks of unrelated appointments may be grayed out to allow the user to focus on appointments pertinent to a particular conversation and at the same time be aware of other appointment times related to other conversations. A new message to be posted may also include an attached file (e.g., stored on the local storage of the terminal apparatus 11 through which the user is accessing the workflow organizing application 11a), which may be posted via "Attachments" field 74C, and a preview of the attached file may be attached to the message which may be clicked and downloaded by the user that posted the message and any other members of the conversation. Files may be attached via a file browser and/or by dragging the file into the workflow organizing application 11a. The user may also be permitted to include in the new message in the selected conversation a hyperlink to another conversation in the tree structure, which allows a user that is a member of both the selected conversation and the other conversation to select the hyperlink to be redirected to the other conversation. Such hyperlink may not be clickable (e.g., grayed out) for members of the selected conversation that are not also members of such other conversation associated with the hyperlink. In addition, a user can select any member(s) of a conversation to which to send a push notification (Ping), which may include a unique conference call number and pin. The push notification may appear on a web interface of the user as a popup, and if not responded to in a predetermined amount of time (e.g., 30 seconds) it is removed from the web interface, and pushed to the user's telephone number (e.g., via SMS) or registered email address. The message indicates, in a case that "Jim Smith" pings "Dave Jones", for example, "Jim Smith pinged you to Conversation Project 1", including a URL link to conversation "Project 1", and followed by the "Content of Post" followed by "Call unique conference number and PIN to join conference call, in a case that a call was attached to the Ping.

Figure 9B:
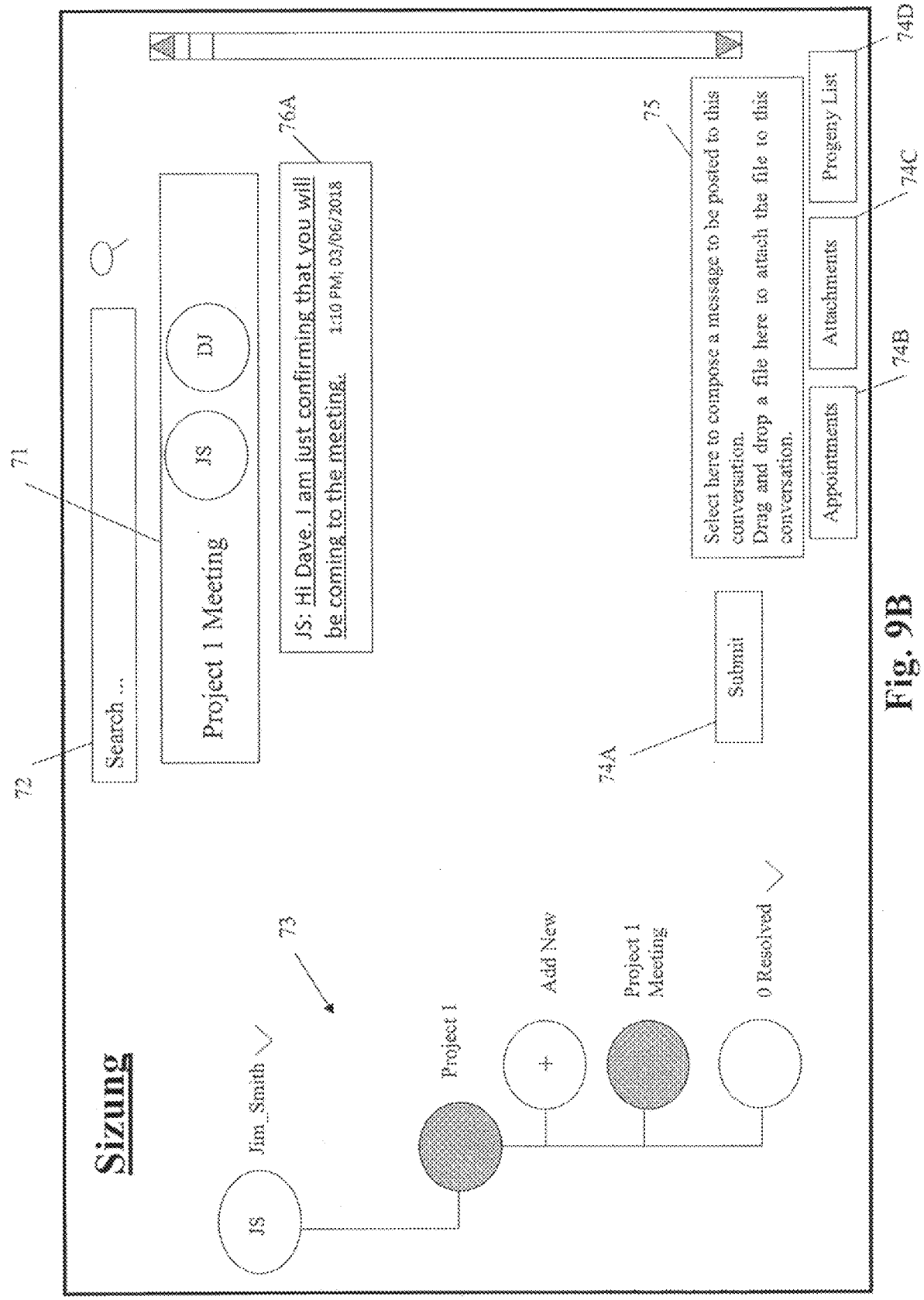
Figure 9C:
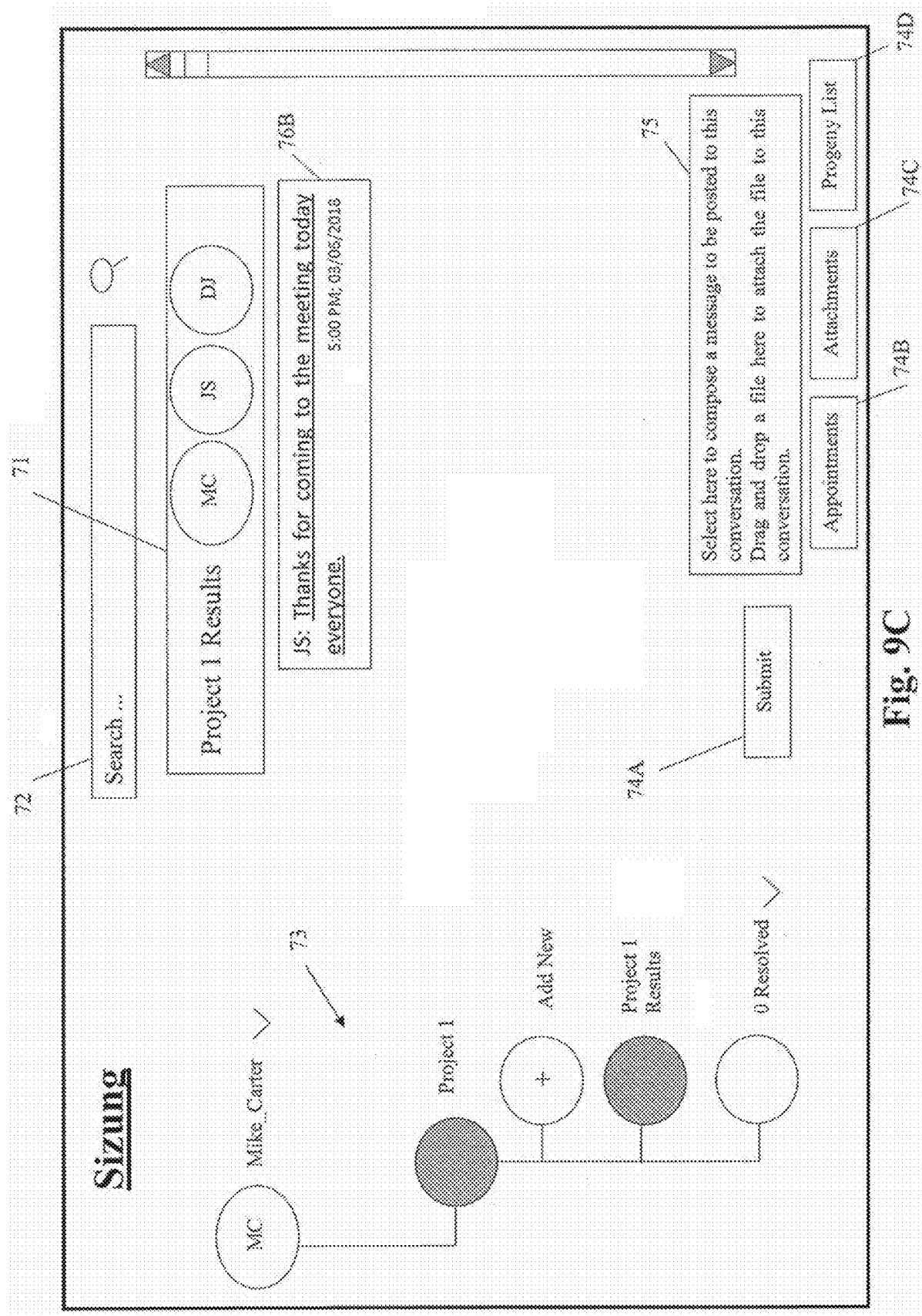
Figures 1, 9D:
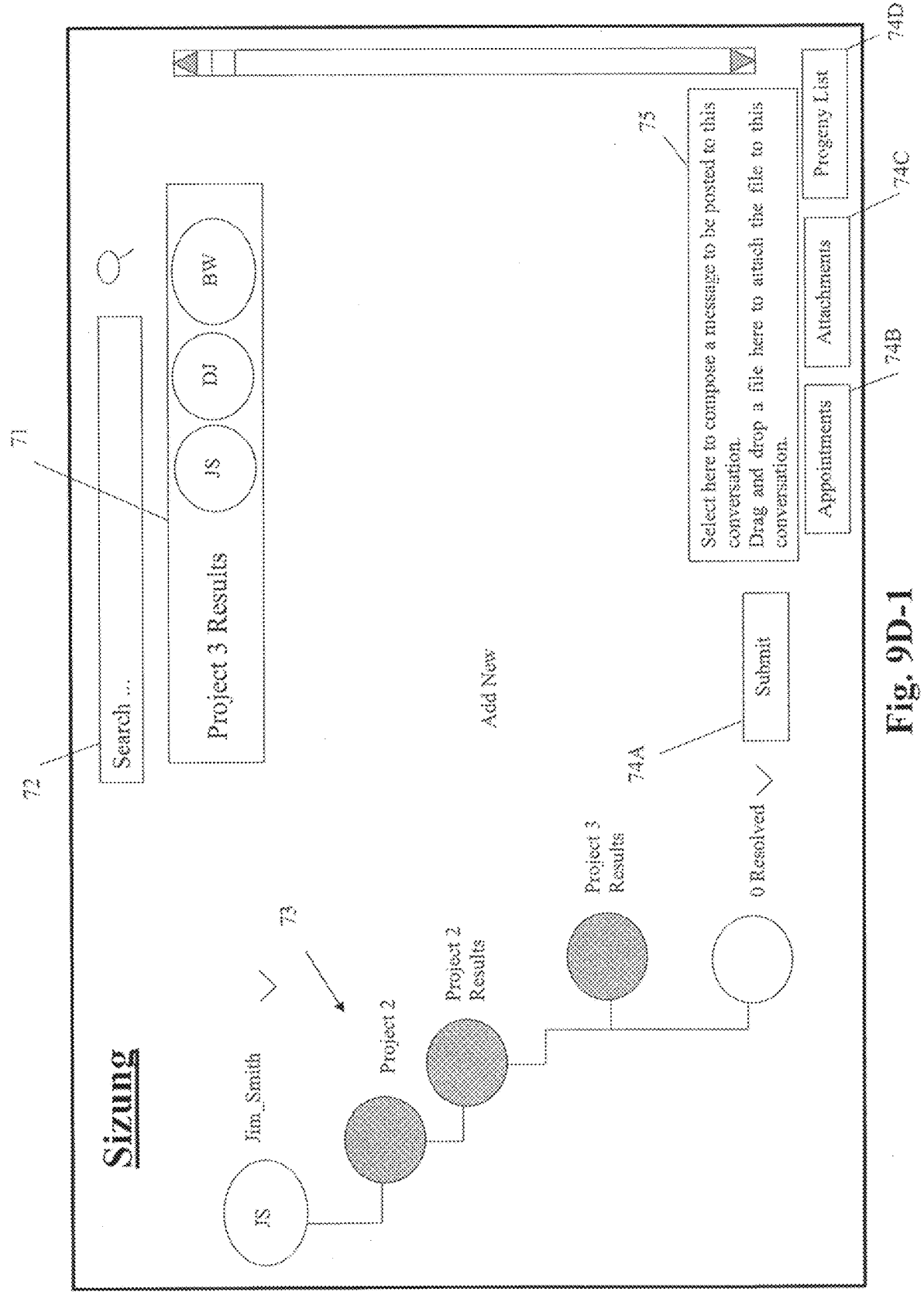
Figures 2, 9D:
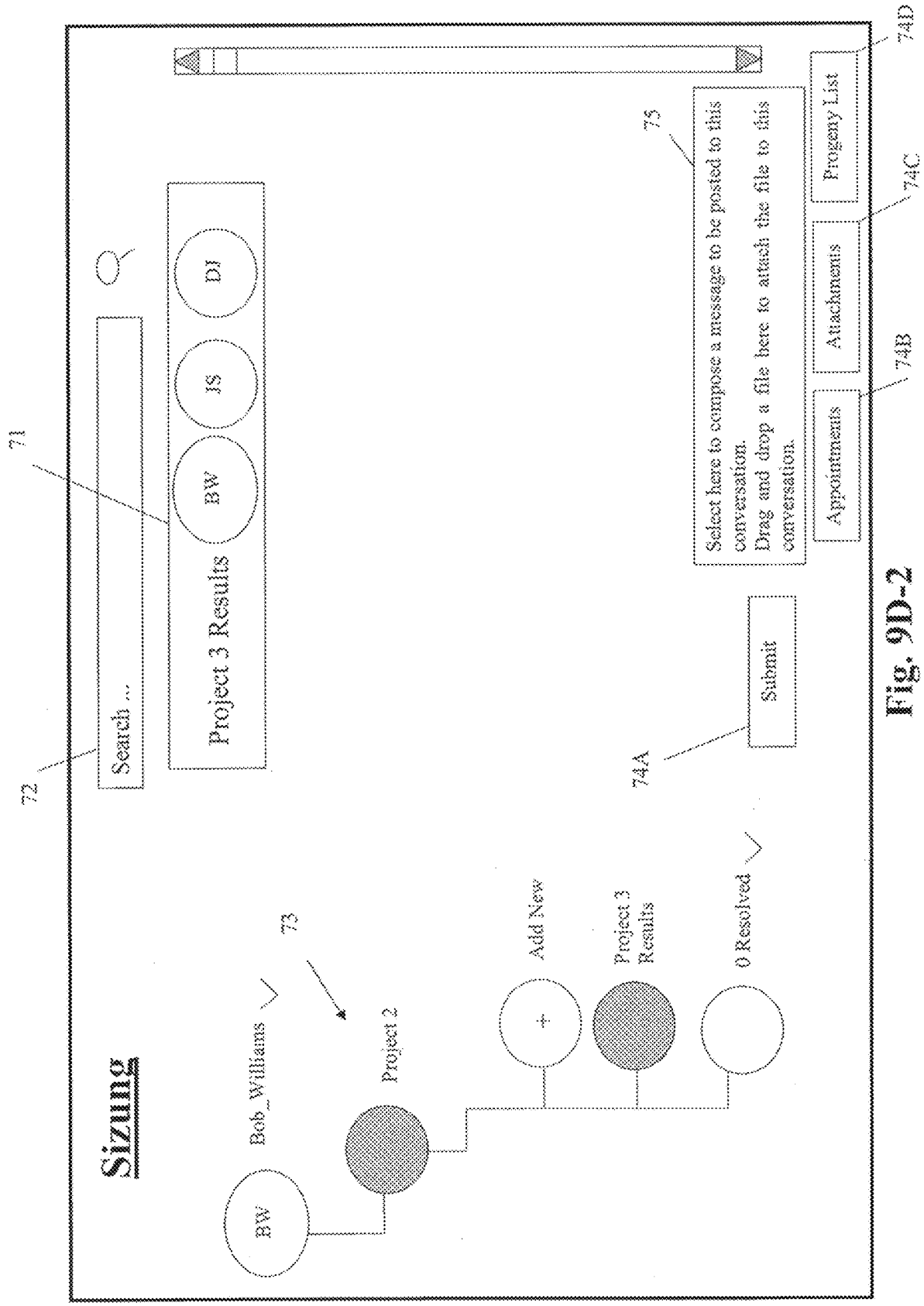
Figure 9E:
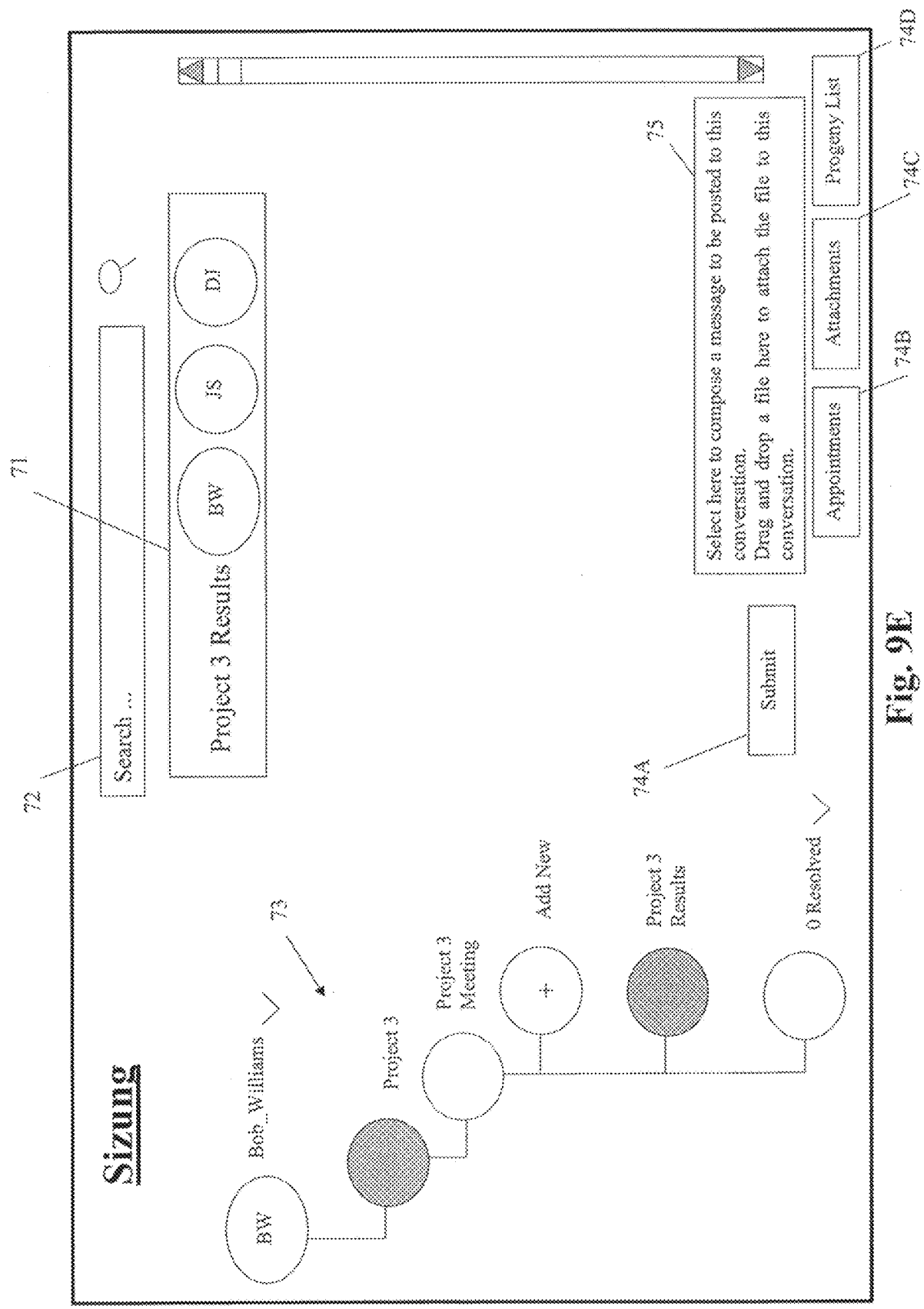
Figure 9F:
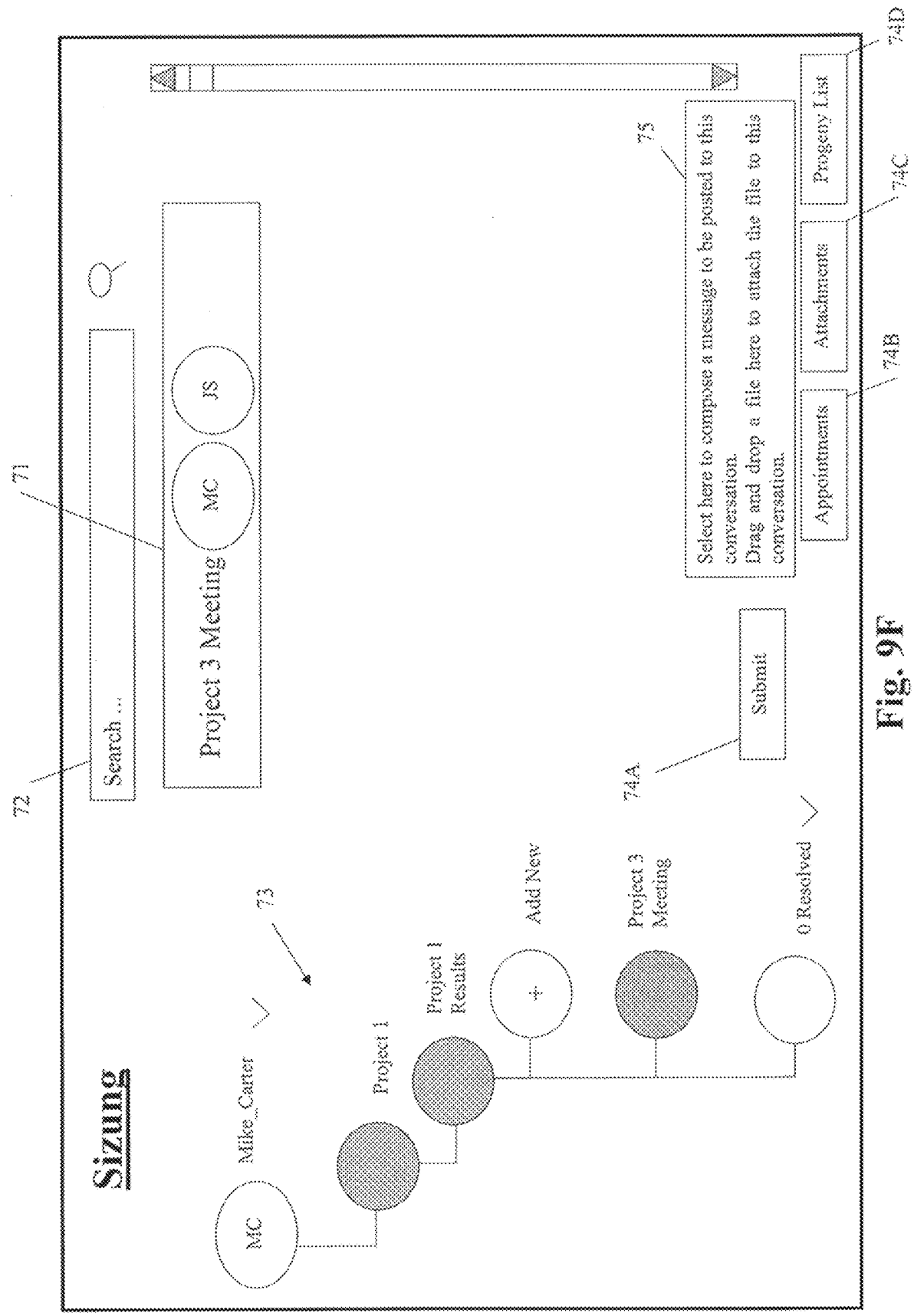
Figure 9G:
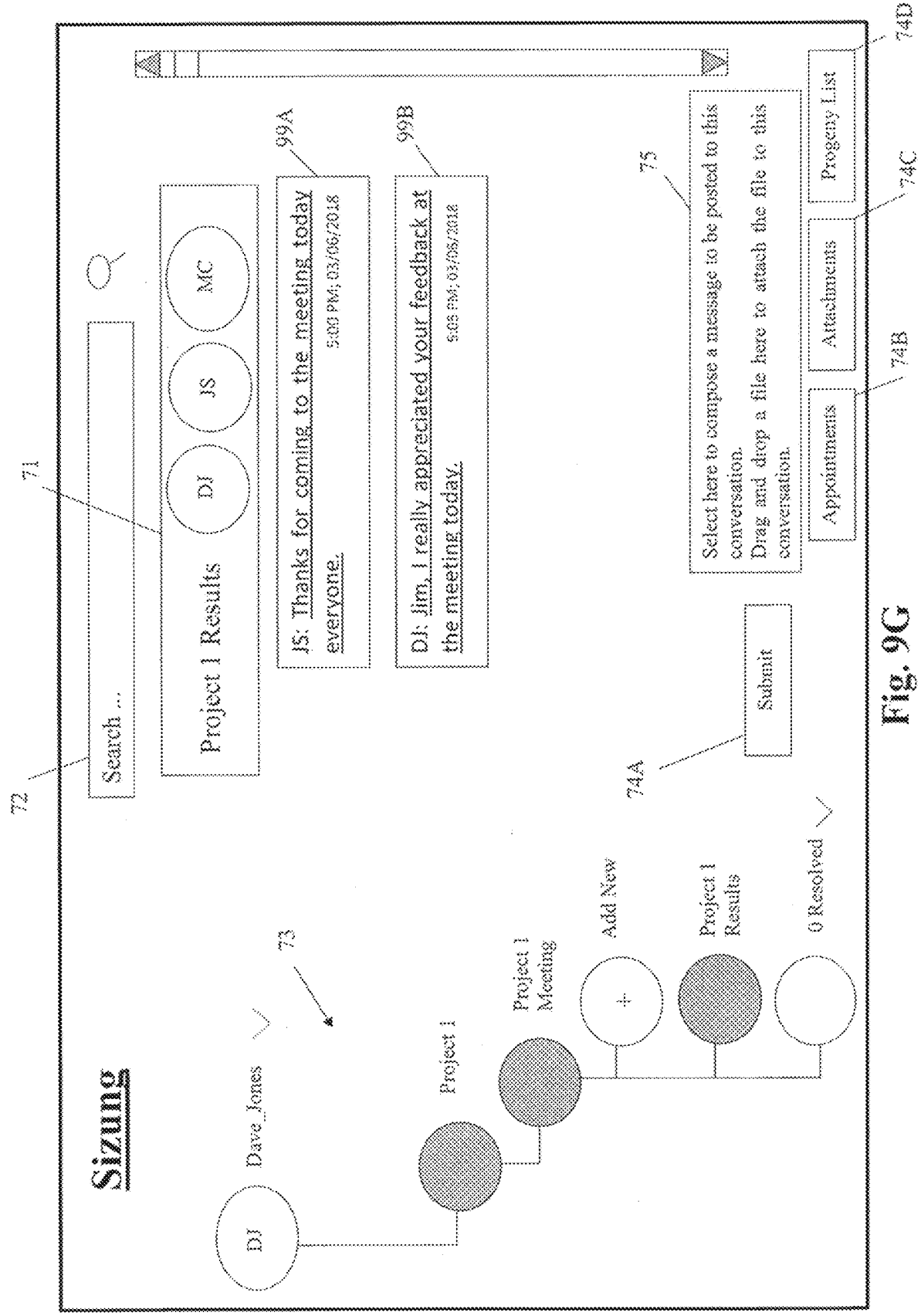
Figure 9H:
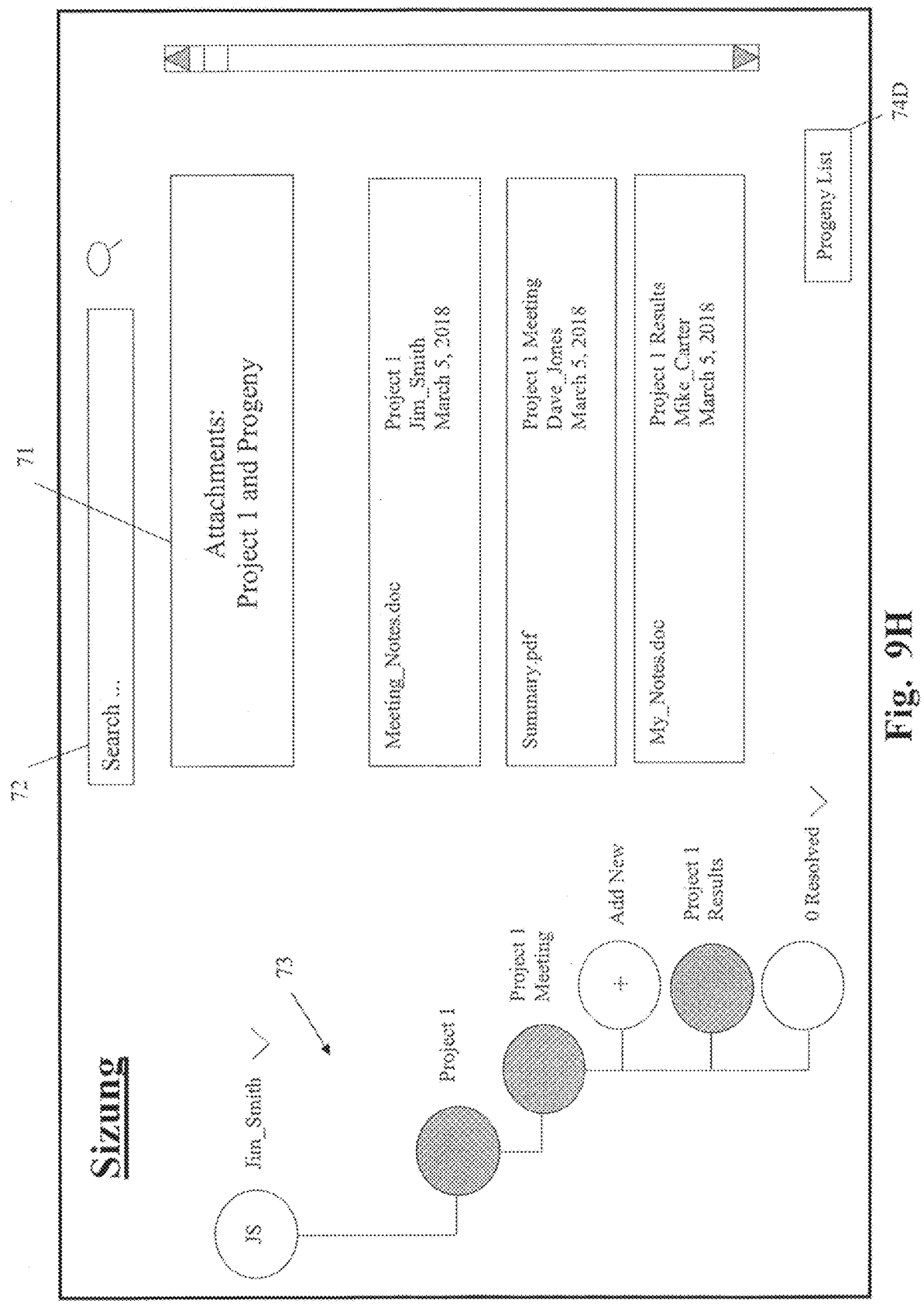

In a case that one or more users attach one or more files to the conversation and progeny conversations, a list of the one or more attached files of the conversation and the progeny conversations may be presented in a sorted priority order, such as shown in FIG. 9H, based on at least one of (i) a most recent date on which file was viewed by the user, (ii) a date on which file was posted to the conversation or the progeny conversation, (iii) a particular user that attached the file to the conversation or the progeny conversation, (iv) the particular conversation or the particular progeny conversation to which the file was attached, (v) type of file, or title of file.

In a case that the user is not yet registered on the workflow organizing application 11a, the user may register for the workflow organizing application 11a. The user may then enter personal information (e.g., first name, last name, etc.), contact information (such as e-mail addresses, telephone numbers, etc.), authentication information (e.g., user name, password, etc.) for accessing the workflow organizing application 11a, and an icon, which may be automatically generated (such as, for example, by uploading a .jpeg or .png file). The personal information and contact information entered by the user may be stored in the server 12 and/or the database 13. After the user is registered, the user may access the workflow organizing application 11a using the authentication information.

Once a managed conversation is selected, the user may also be permitted to edit settings of the selected conversation and invite members to the conversation. After a user submits a new message to a managed conversation, he or she can edit a message, and such editing may be configured so that the user may edit the new message only if no other member has subsequently posted (e.g., the user may not edit the new message once another user has subsequently posted in the managed conversation). In addition, a user may attach a reply to any prior message or send a message from one conversation of which they are a member to another conversation of which they are a member. For example, when a user selects Send/options provided in Send/options field 74A which may be provided by the user interface, the user may be asked to select the conversation to which he or she wishes to send the post, and after selecting the conversation, the user may be taken to a timeline of that conversation with the sent post drafted in a composition message box, followed by a conversation reference to its source conversation. The user may edit such draft of the message, forward the post, copy the post in the destination timeline, and attribute the post to the user that forwarded it.

Any member of a managed conversation may invite other members to the conversation by, for example, entering a user identifier of a user registered with the workflow organizing application 11a, such as a user ID, an e-mail address, name or telephone number, and may also invite a user that is not registered with the workflow organizing application 11a via an e-mail invite to the non-registered user. Any member of the managed conversation may also be permitted to associate all members of another existing conversation with the managed conversation.

Each user may be associated with hashtags of the conversations of which the user is a member, messages posted in conversations of which the user is a member (including those of which the user is the author), messages posted in conversations of which the user is a member and the user's name is mentioned (e.g., via a first word or more of the user's name in a message authored by another user), and users that are members of one or more conversations of which the user is also a member.

Each member of a conversation may be permitted to add subsequent members to a conversation, and after such subsequent member is added to the managed conversation, a hierarchical, tree structure specific to the subsequent member may be generated by the workflow organizing application 11a, and the conversation to which the subsequent member is added may be inserted into the tree structure specific to such subsequent member, based on a parent ID maintained by the workflow organizing system 10A or 10B for the conversation. Additional members may be added to the conversation by existing members of the managed conversation via user identifiers (e.g. user name, e-mail address, telephone number, etc.) specified by the existing members. For example, such additional members may be automatically associated with the managed conversation, when the existing member and the specified additional member are common members of another conversation. On the other hand, when the existing members and the additional member are not common members of any other conversation, a conversation invitation for joining the managed conversation to the specified additional member may be automatically transmitted to the specified additional member.

Figure 3B:
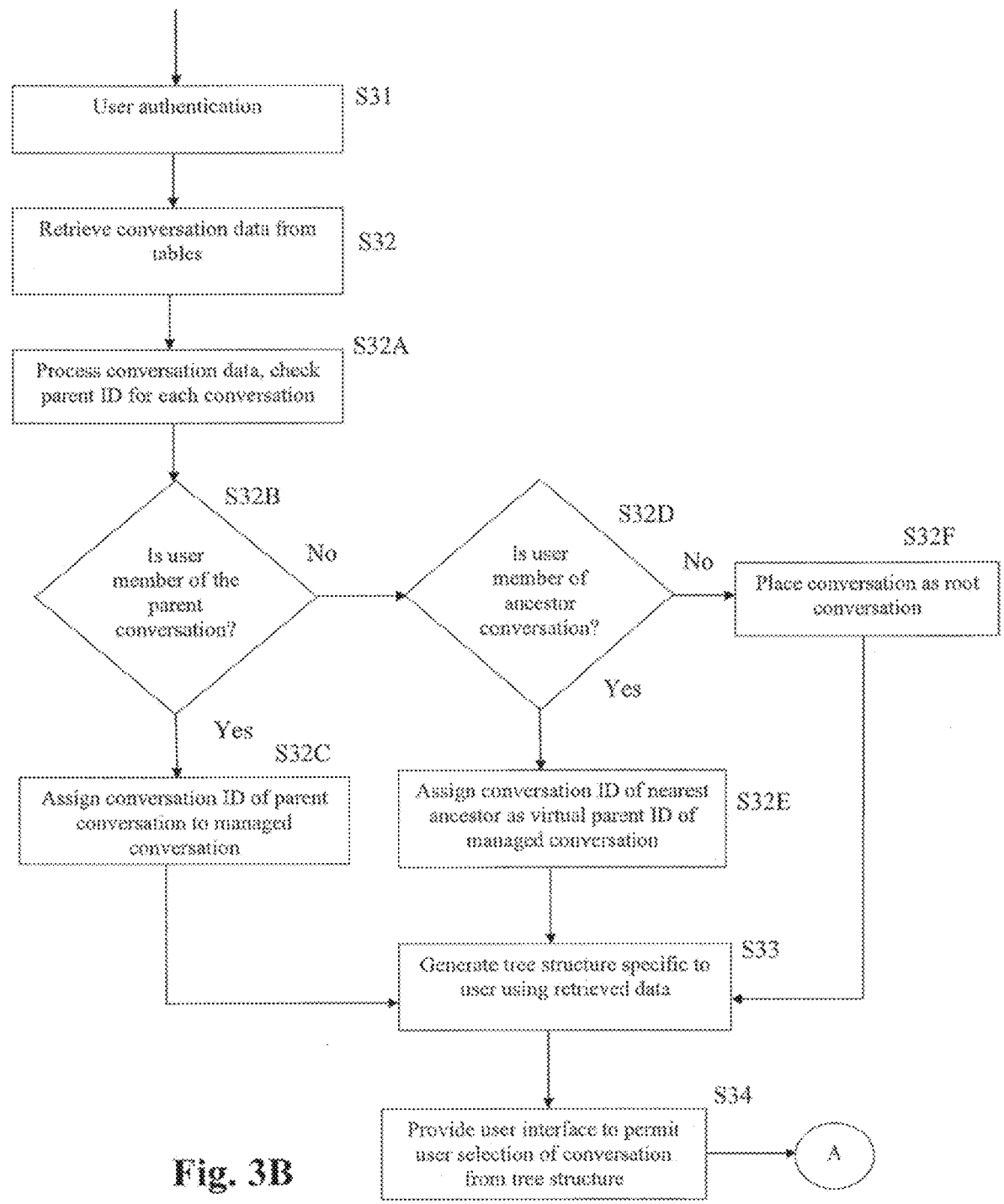

Upon retrieving information in the conversation data table (FIG. 6A) for the user (step S32; FIG. 3B), the conversation data may be processed by checking the parent ID for each conversation in the tree structure specific to the user, identifying parent conversations based on the parent IDs and determining whether the user is a member of the parent conversation (step S32A; FIG. 3B). In a case that the retrieved conversation data includes new data indicating that, for example, a conversation of which the user is a member has a different parent conversation, it can be determined whether the user is a member of such parent conversation (step S32B; FIG. 3B). If the user is a member of such parent conversation (step 32B; Yes; FIG. 3B), the conversation ID of the parent conversation may be assigned to the managed conversation (step S32C; FIG. 3B). For example, as shown in FIG. 9B, since each of the user "Jim_Smith" and "Dave_Jones" is a member of the conversation entitled "Project 1" and progeny (in this case, child) conversation entitled "Project 1 Meeting", the parent ID relative to the user "Jim_Smith" and "Dave_Jones" may be the conversation ID of "Project 1".

On the other hand, if the user is not a member of the parent conversation (step 32B; No; FIG. 3B), it is determined whether the user is a member of any ancestor conversations of the parent conversation (step S32D; FIG. 3B), and if the user is a member of any ancestor conversations of the parent conversation (step S32D; Yes; FIG. 3B), a conversation ID of a nearest ancestor conversation from which the managed conversation branches is assigned as a virtual parent ID of the managed conversation (step S32E; FIG. 3B). For example, as shown in FIG. 9C, the user "Mike_Carter" is added to the conversation "Project 1 Results", but the user "Mike_Carter" is not a member of "Project 1 Meeting", the conversation ID of which is the parent ID of "Project 1 Results" relative to the conversation creator "Jim_Smith". However, since the user "Mike_Carter" is a member of the conversation "Project 1" (an ancestor of "Project 1 Results"), the conversation ID of nearest ancestor "Project 1 Results" is assigned as a virtual parent ID of the managed conversation relative to "Mike_Carter". If the user is not a member of any ancestor conversations of the parent conversation (step S32D; No; FIG. 3B), the conversation may become a root conversation relative to the user (step S32F; FIG. 3B).

The tree structure specific to the user is generated in accordance with the retrieved conversation data and the assignment of an appropriate parent ID as described above (step S33; FIG. 3B), and a user interface to permit user selection of a conversation from the tree structure is provided (step S34; FIG. 3B).

Figure 3C:
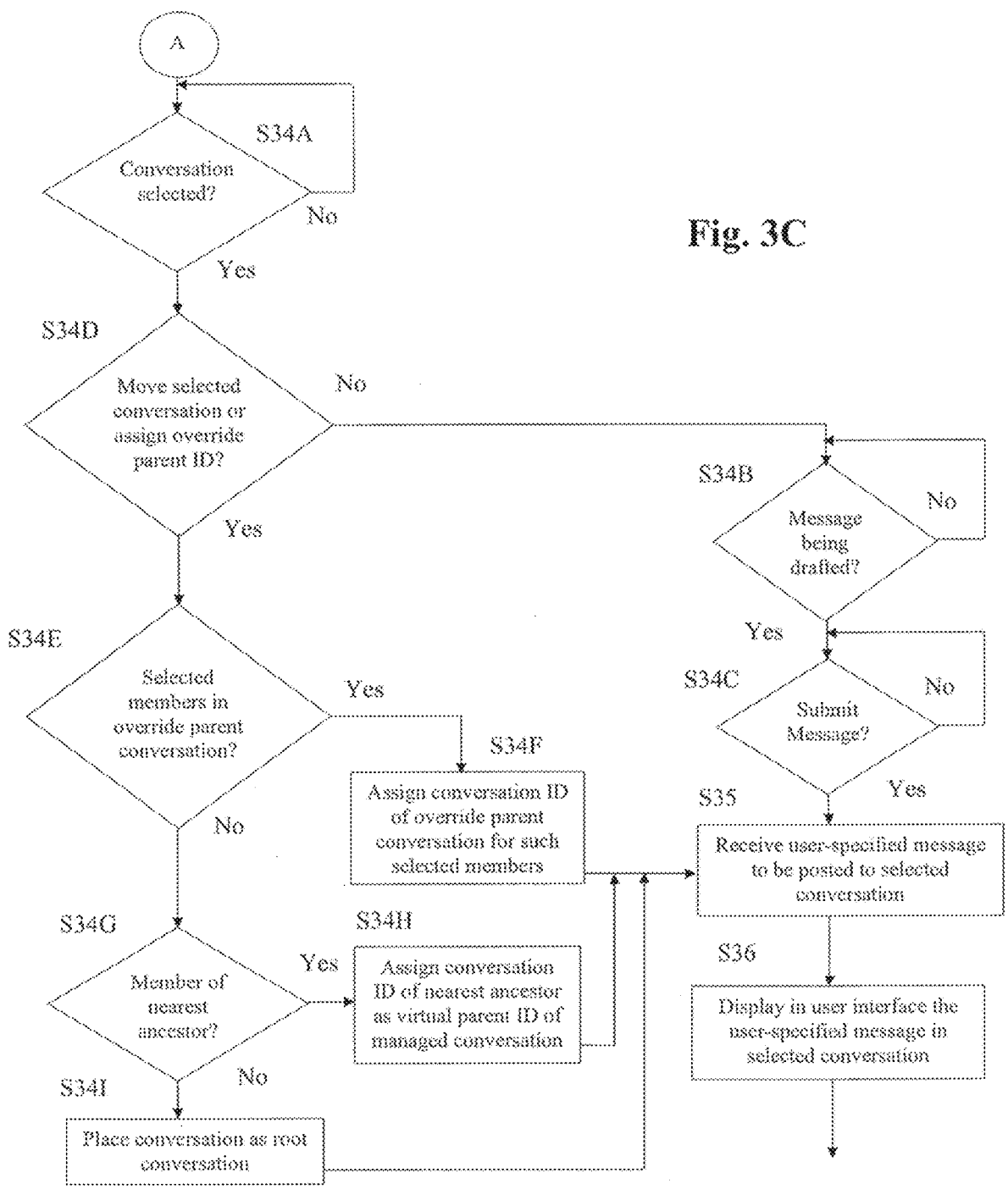

The workflow organizing application 11a may determine whether a conversation in the tress structure is selected, and upon determining that a conversation is selected (step S34A; Yes; FIG. 3C), and it may be determined whether the user moves the selected conversation to a different parent conversation, or optionally assigns an override parent ID to the conversation (step S34D; Yes; FIG. 3C). If the user does not move the selected conversation to a different parent conversation, or optionally assign an override parent ID to the conversation (step S34D; No; FIG. 3C), it may be checked whether a message is being drafted (step S34B; FIG. 3C). If a message is being drafted (step S34B; Yes; FIG. 3C), it is determined whether to submit such message (step S34C; FIG. 3C) and upon determining that such message is to be submitted (step S34C; Yes; FIG. 3C), the user-specified message may be received and be posted to selected conversation (step S35; FIG. 3C). Then, the user-specified message may be displayed in the selected conversation in the user interface (step S36; FIG. 3C).

If the user moves the selected conversation to a different parent conversation, or optionally assigns an override parent ID to the conversation (step S34D; Yes; FIG. 3C), the conversation may be assigned an override parent ID which is associated with another ancestor conversation, and the user may be permitted to select members of the managed conversation to which the override parent ID is to apply. If such selected members are members of the parent conversation identified by the override parent ID (step 34E; Yes; FIG. 3C), the override parent ID may be assigned to each of such selected members (step S34F; FIG. 3C). On the other hand, for a selected member of the managed conversation to which the override parent ID is to apply that is not a member of the parent conversation identified by the override parent ID (step S34E; No; FIG. 3C), it is determined whether such selected member is member of an ancestor conversation of the managed conversation from which the managed conversation branches (step S34G; FIG. 3C). If the selected members are members of an ancestor conversation from which the managed conversation branches (step S34G; Yes; FIG. 3C), a conversation ID of such nearest ancestor conversation is assigned as a virtual parent ID of the managed conversation relative to the selected member (step S34H; FIG. 3C), as shown in FIGS. 9D-1 and 9D-2.

If the selected members are not members of an ancestor conversation of the conversation identified by the override parent ID (step S34G; No; FIG. 3C), the managed conversation is placed as a root conversation (step S34I; FIG. 3C, in the tree structure specific to the user. After any of steps S34F, S34H, S34I, the workflow organizing application 11a may receive a user-specified message to be posted to selected conversation (step S35; FIG. 3C), and display in the user interface the user-specified message in selected conversation (step S36; FIG. 3C). A timeline including each message that has been posted to the selected conversation since the user became associated with the conversation may be presented to the user in chronological order.

Figure 3D:
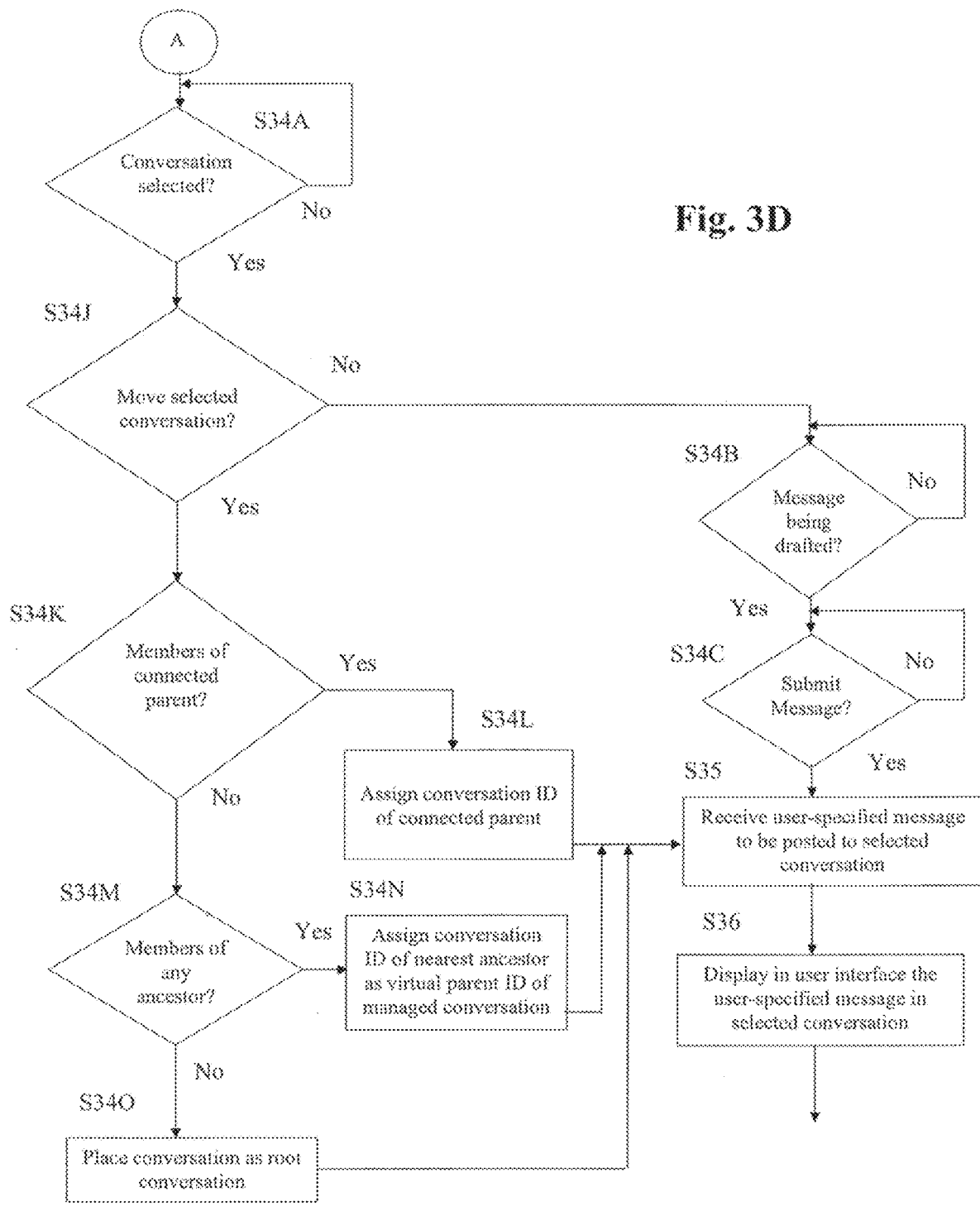

Upon selecting a conversation (step S34A; Yes; FIG. 3D), the user may, rather than assigning an override parent ID, select a conversation in the tree structure specific to the user and place the selected conversation as a progeny to a first ancestor (connected parent) conversation of which the user is not a member (step 34K; No; FIG. 3D), if such first ancestor (connected parent) conversation is a public conversation, for example. as shown in FIG. 9E. If the user is a member of the first ancestor (connected parent) conversation (step S34K; Yes; FIG. 3D), a conversation ID of such first ancestor (connected parent) conversation may be assigned as the parent ID of the managed conversation, when such conversation is moved to be a progeny (in this case, child) of the first ancestor (connected parent) conversation (step S34L; FIG. 3D).

When the selected conversation is placed as a progeny to the first ancestor (connected parent) conversation of which the user is not a member (step 34K; No; FIG. 3D), it is determined whether the user (and each member of the selected conversation) are members of any ancestor conversation of the first ancestor (connected parent) conversation (step S34M; FIG. 3D), and if yes (step 34M; Yes; FIG. 3D), a conversation ID of a nearest ancestor for each of the members is assigned as virtual parent ID of managed conversation (step S34N), as shown in FIG. 9F with respect to user "Mike_Carter". If the user (and other members of the managed conversation) are not members of any ancestor conversation of the first ancestor (connected parent) conversation (step S34M; No; FIG. 3D), the managed conversation may be placed as a root conversation (step S34O; FIG. 3D) for any such members. After any of steps S34K, S34M, S34N, the workflow organizing application 11a may receive a user-specified message to be posted to selected conversation (step S35; FIG. 3D), and display in the user interface the user-specified message in selected conversation (step S36; FIG. 3D). A timeline including each message that has been posted to the selected conversation since the user became associated with the conversation may be presented to the user in chronological order.

Figure 3E:
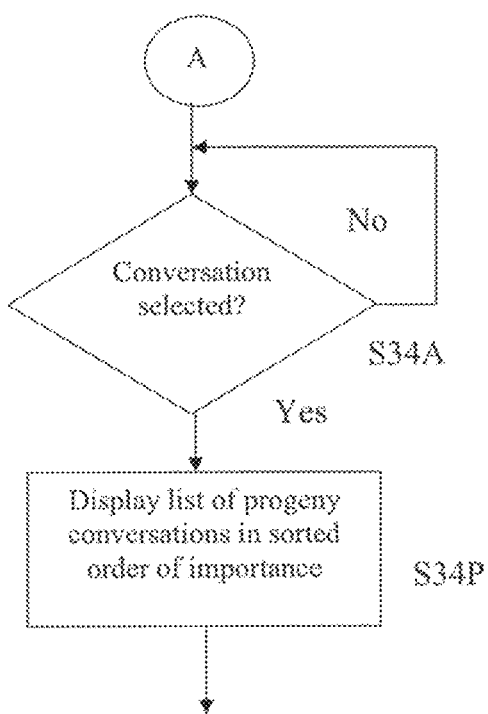
Figure 9I:
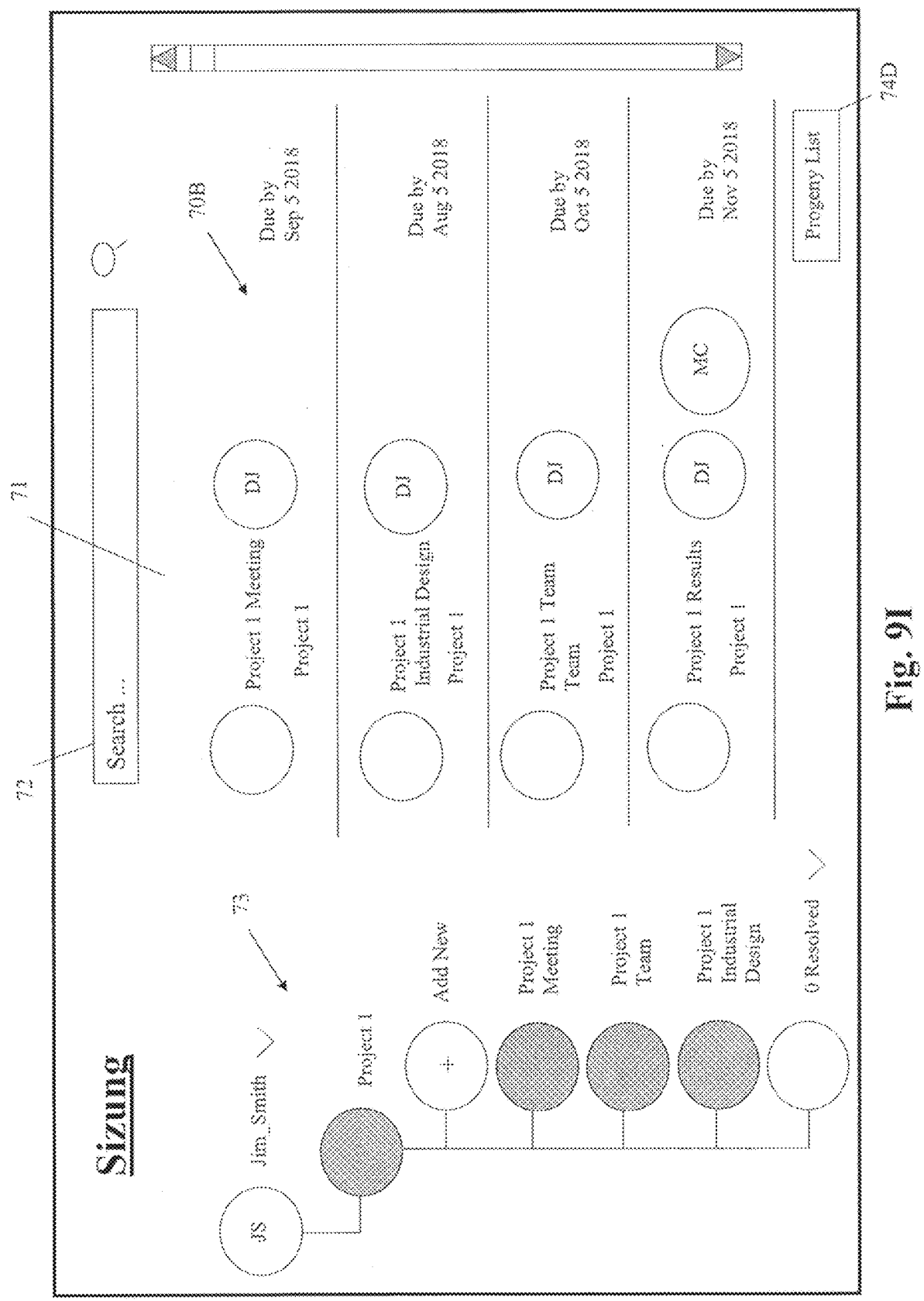

On the home screen, all the conversations in the tree may be available. When a conversation is selected (step S34A; FIG. 3E), upon the user selecting the conversation within the tree structure specific to the user, a list of the progeny conversations branching out of the selected conversation may be displayed in a sorted order of importance based on content, user interaction and nearness of deadlines and appointments (step S34P; FIG. 3E). Such processing may be performed by an adaptive intelligence module which infers the importance of each conversation. For example, as shown in FIG. 9I, in a case that "Project 1" includes progeny conversations "Project 1 Meeting", "Project 1 Team", "Project 1 Industrial Design" and "Project 1 Results", upon the user selecting conversation "Project 1" or field 74D (Progeny list), such progeny conversations may be displayed in a sorted order of importance (as shown in field 70B) based on nearness of deadlines, user interaction and content. For example, although "Project 1 Industrial Design" may have a deadline prior to "Project 1 Meeting", the adaptive intelligence module 130 may determine that, due at least in part to content and user interaction associated with "Project 1 Meeting", "Project 1 Meeting" is to be displayed at the top of the screen.

Figure 3F:
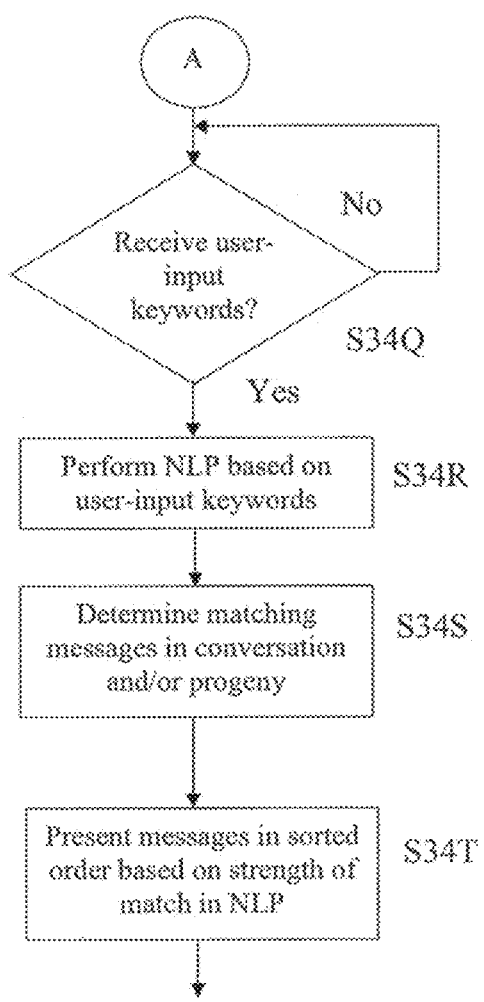
Figure 9J:
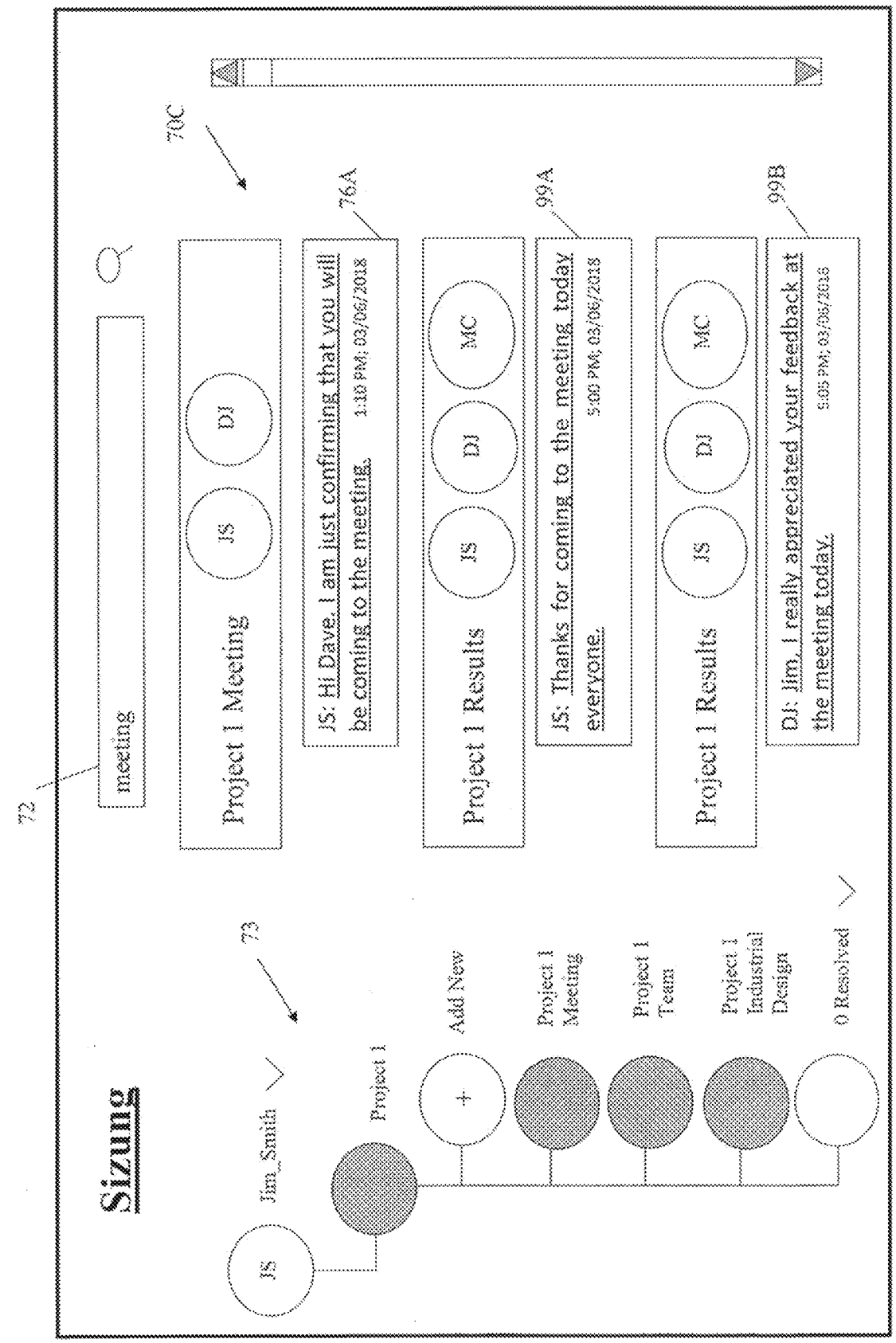

The workflow organizing system 10A and 10B may be configured to include an adaptive intelligence module 130 (FIG. 13) to perform natural language processing or other adaptively intelligent processing, based on one or more user-input keywords to determine one or more matching messages in a content of the managed conversation and/or in a content of one or more progeny conversations, and present the one or more messages in a sorted order based on strength of match in the natural language processing. Upon receiving user-input keywords (step S34Q; Yes; FIG. 3F), natural language processing may be performed based on such keywords (step S34R; FIG. 3F), and matching messages in conversations and/or progeny of such conversations may be determined (step S34S; FIG. 3F). Then, messages may be presented in sorted order based on a strength of match in the natural language processing (step S34T; FIG. 3F). For example, as shown in FIG. 9J, field 70C shows that a user has entered the keyword "meeting" as shown in field 72, and as a result of natural language processing performed based on such keyword, various messages posted in Project 1 and progeny conversations "Project 1 Meeting", "Project 1 Team", "Project 1 Industrial Design" and "Project 1 Results" may be displayed in a sorted order, based on strength of match in the natural language processing.

Figure 3G:
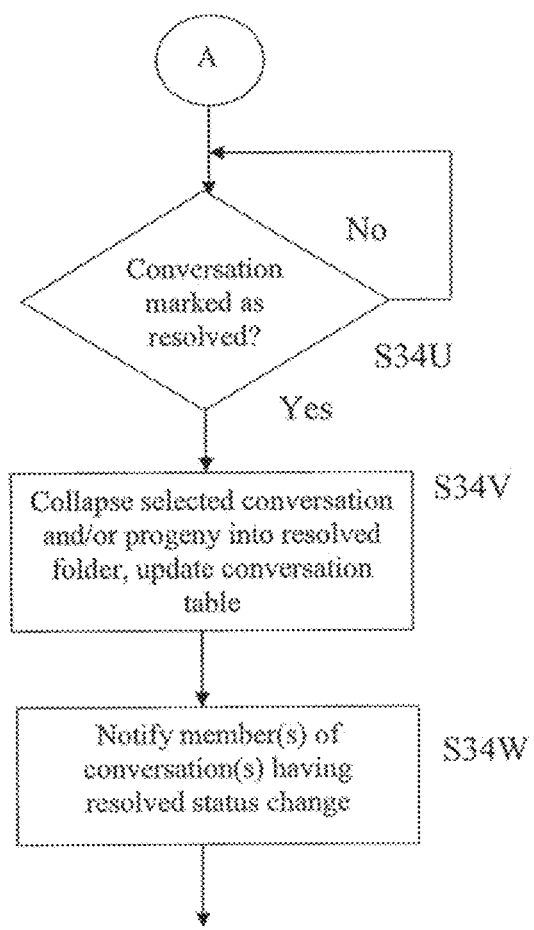
Figure 9K:
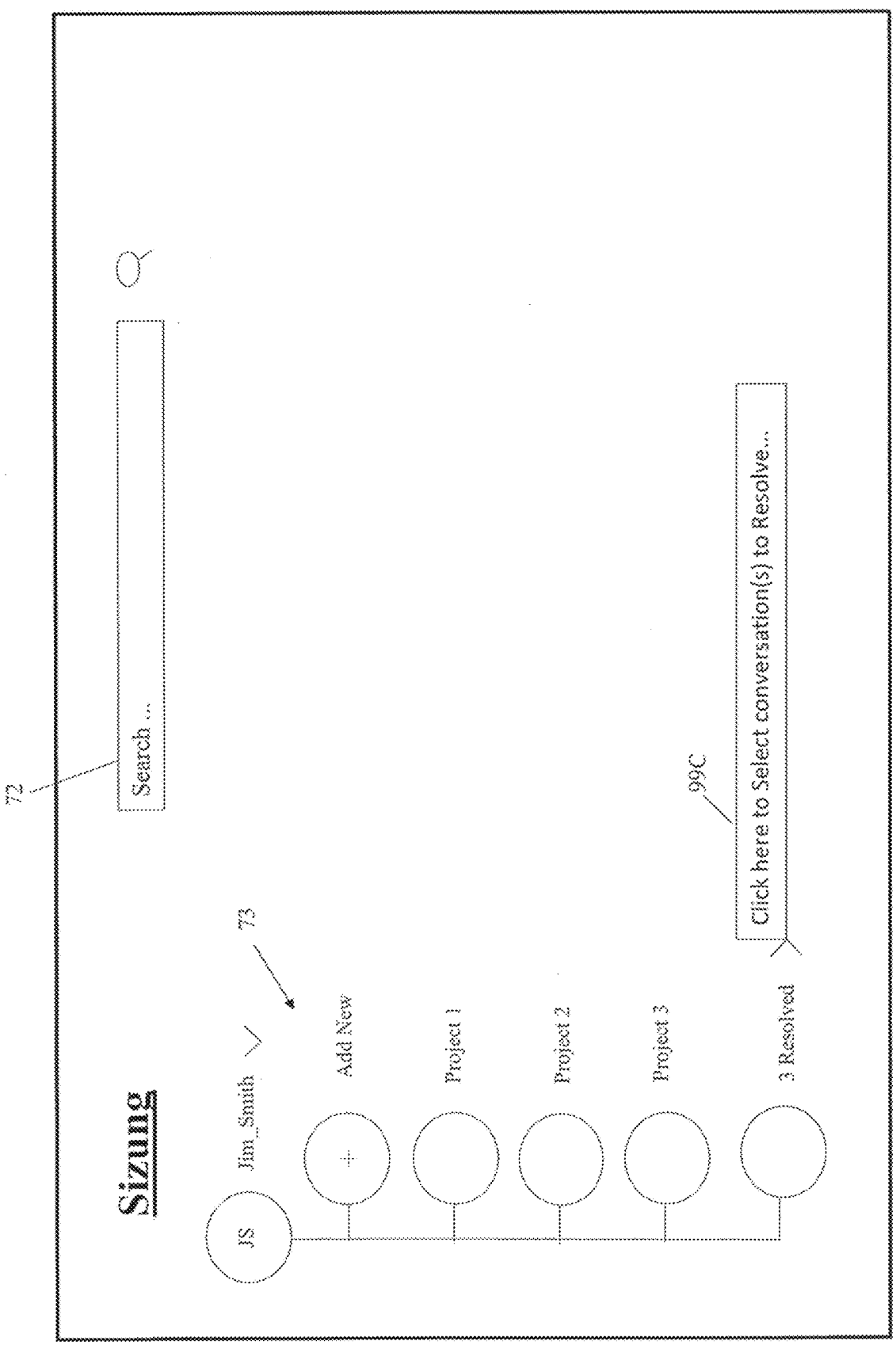
Figure 9L:
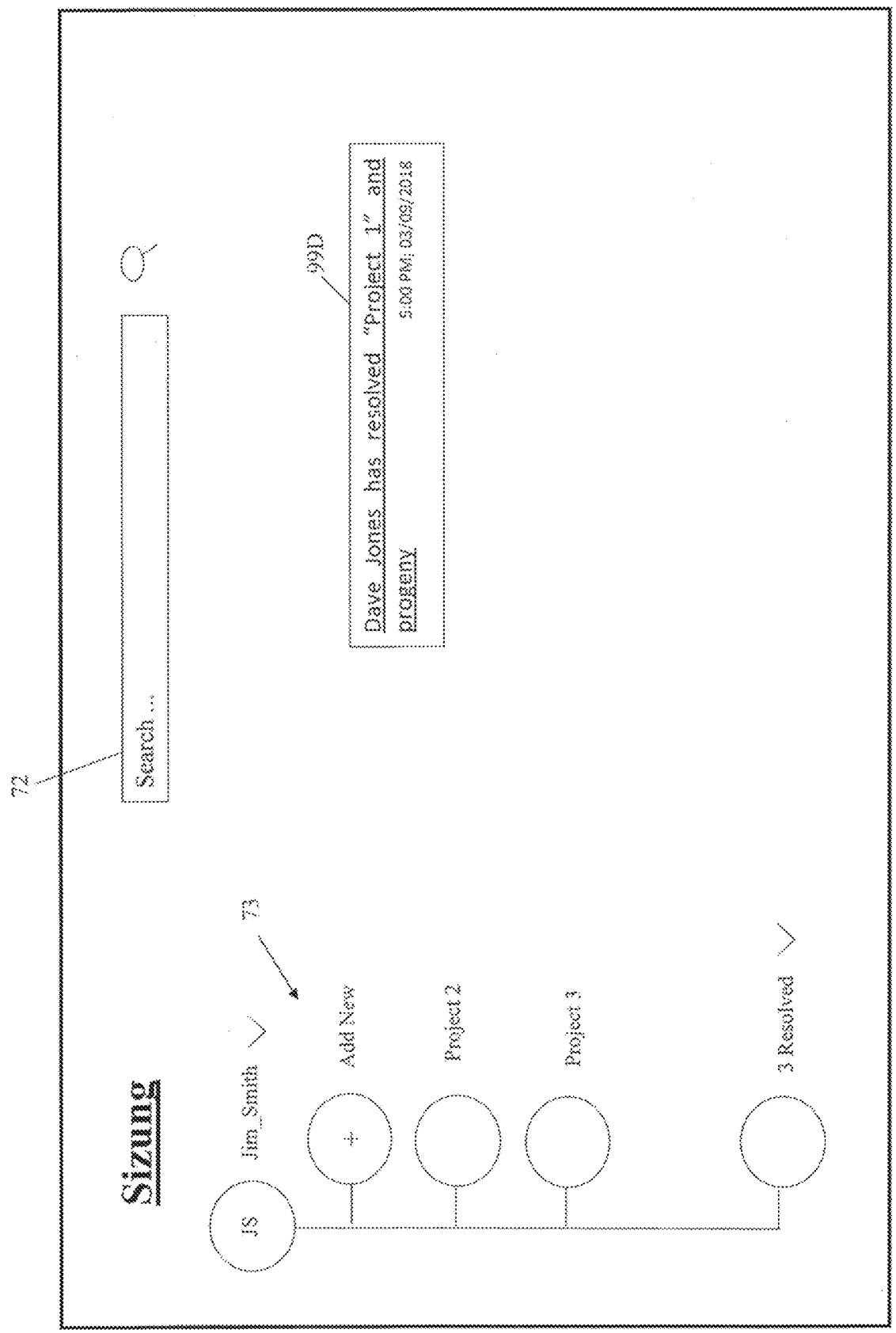

A member of a managed conversation may also be permitted to mark the managed conversation, as well as a progeny branching out from the managed conversation, as a resolved conversation which is collapsed into a resolved folder of an ancestor to the managed conversation, in the tree structure specific to the member (step S34U;Yes; FIG. 3G step S34V; FIG. 3G). The member may resolve the conversation by, for example, selecting field 99C as shown in FIG. 9K, and selecting or entering conversation(s) and/or progeny of the conversation(s) to be resolved. Each of the members of the conversation may specify or edit a date by which the conversation or the progeny conversation is to be resolved by, and each conversation may initially be set to an unresolved conversation (FIG. 9A). Any member of a managed conversation may be permitted to resolve or unresolve a conversation or any of the progeny conversations in the tree structure, and upon changing the conversation or the progeny conversations to resolved or unresolved, the change may apply to all members of the conversation and any progeny conversations, and each member may be notified of the change (step S34W; FIG. 3G), as shown in FIG. 9L, where field 99D indicates that user "Dave_Jones" has resolved "Project 1" and progeny, and the resolved folder of the tree structure as to user "Jim_Smith" is shown having resolved conversations. In addition, if any progeny conversations have been resolved, and a user opens the resolved folder, the user may be presented with the resolved conversation and the direct child conversation of the resolved conversation. If the user selects such direct child conversation, progeny of the direct child conversations, if any, may be presented. The date on which a conversation is resolved may determine the position of the resolved conversations in the resolved conversation folder (e.g., the most recently resolved may be at the top of the list).

Figure 7D:
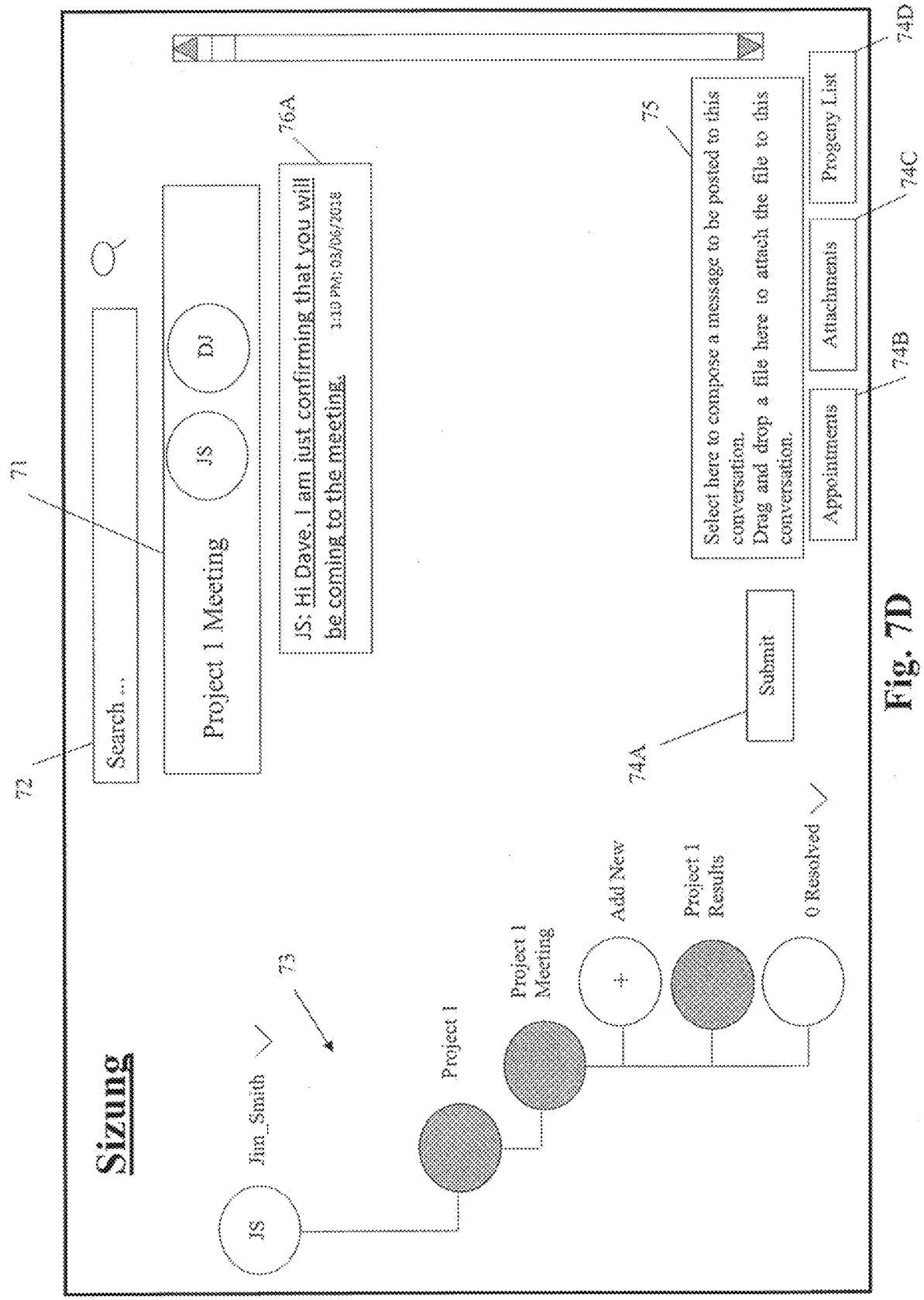
Figure 7E:
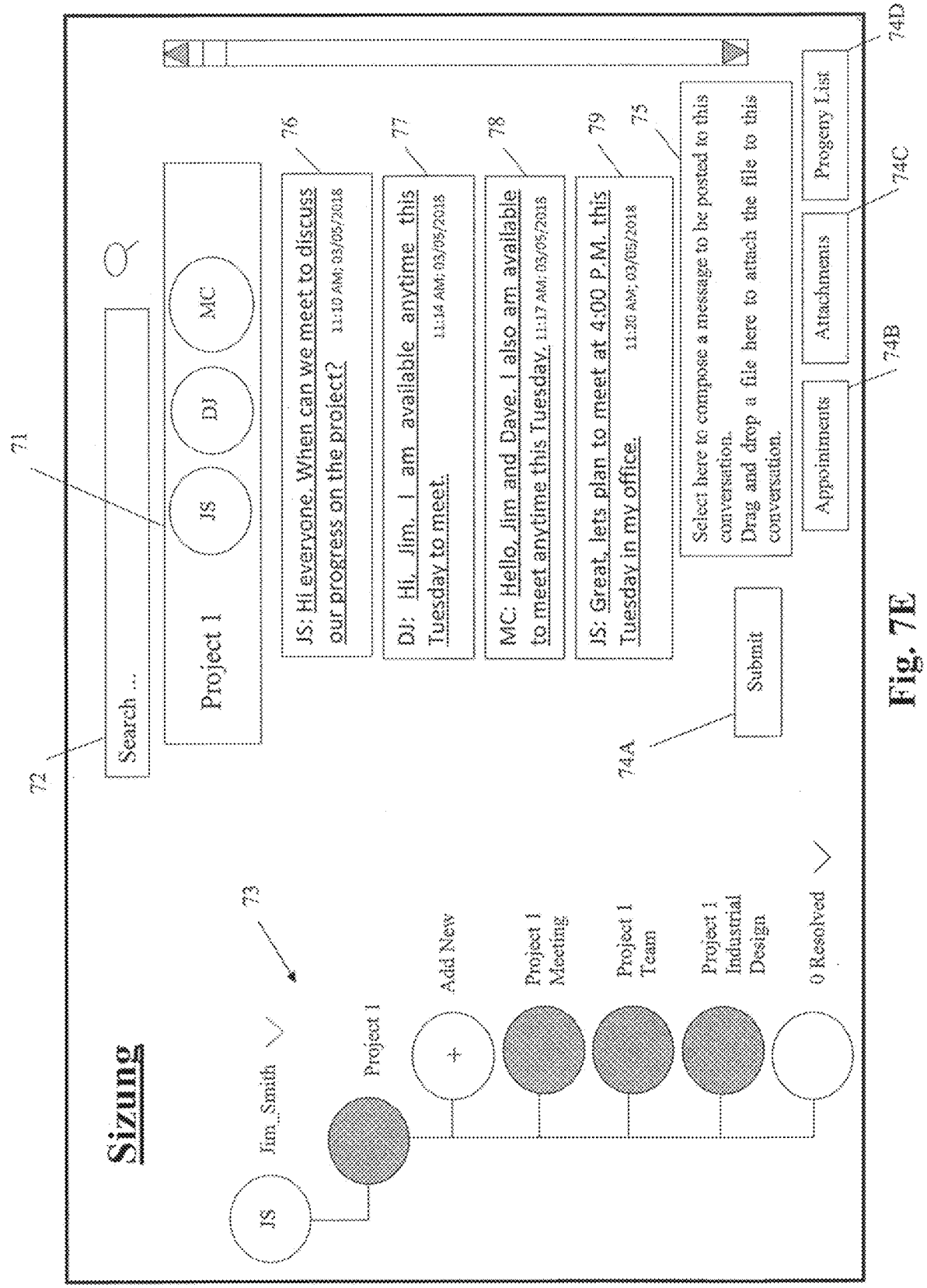
Figure 8:
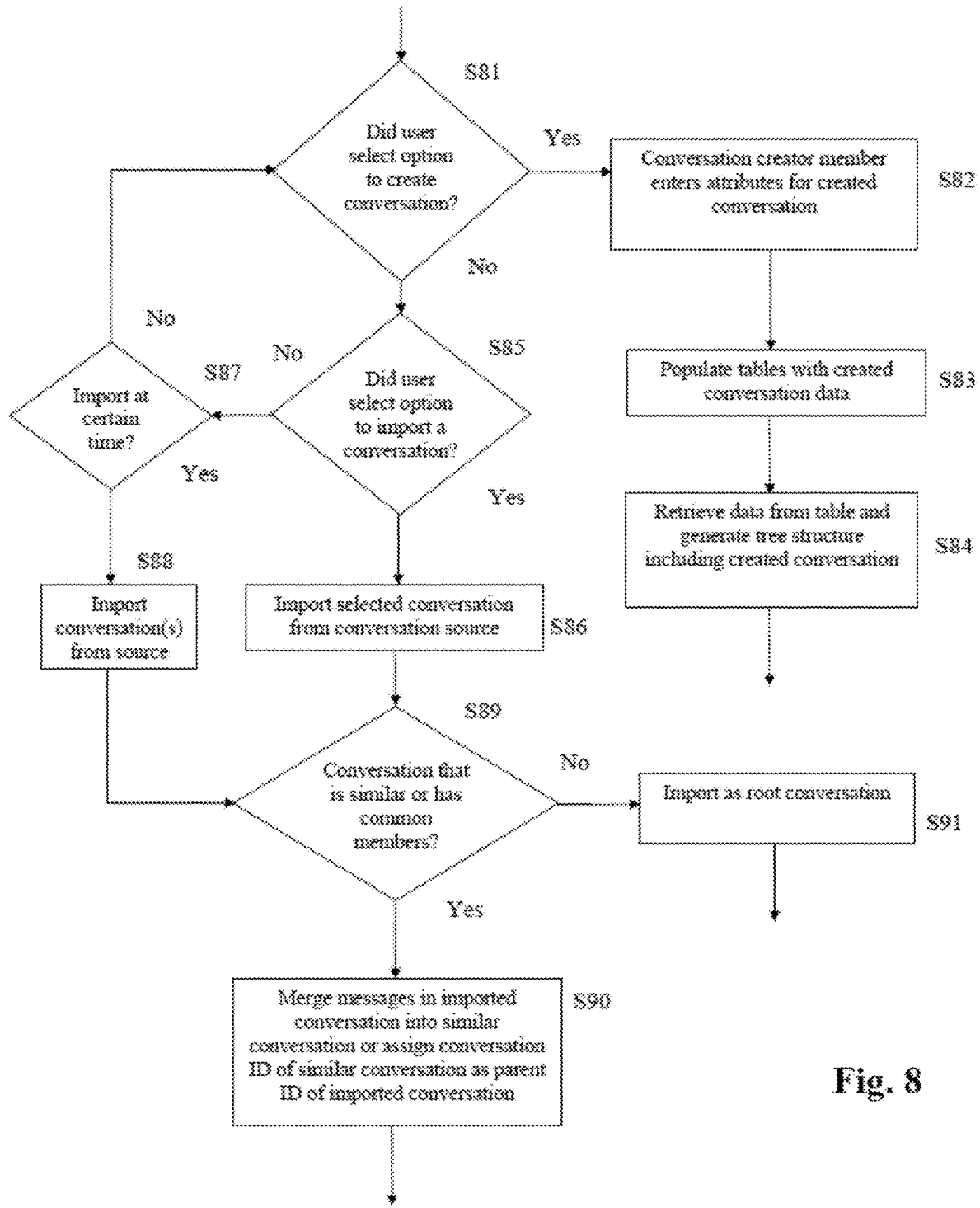
FIG. 8 is a flow chart showing a method that can be performed by workflow organizing application or system, according to the exemplary embodiments shown in FIGS. 2A and 2B (or equivalent)

Once the tree structure specific to the user is generated, the user may decide to create a new conversation or import a conversation by, for example, selecting a link ("Add New") on the graphical user interface of the workflow organizing application 11a (step S81; Yes; FIG. 8). For example, the user having user ID "Jim_Smith" may create a new conversation "Project 1 Meeting. Results" and place such conversation as a progeny (in this case, child) of "Project 1 Meeting", as shown in FIG. 7D, as well as a progeny conversation (in this case, child of "Project 1 Meeting" and grandchild of "Project 1") entitled "Project 1 Meeting Results". As shown in FIG. 7D, conversation "Project 1 Meeting" may be associated with a message in field 76A ("JS: Hi Dave, I am just confirming that you will be coming to the meeting."), and be associated with members "Jim_Smith" and "Dave_Jones". A conversation may be associated with any number of progeny conversations. For example, as shown in FIG. 7E, conversation "Project 1" may include progeny (in this case, child) conversations entitled "Project 1 Meeting", "Project 1 Team", Project 1 Industrial Design", respectively, which in this case may be considered sibling conversations of each other.

Figure 7F:
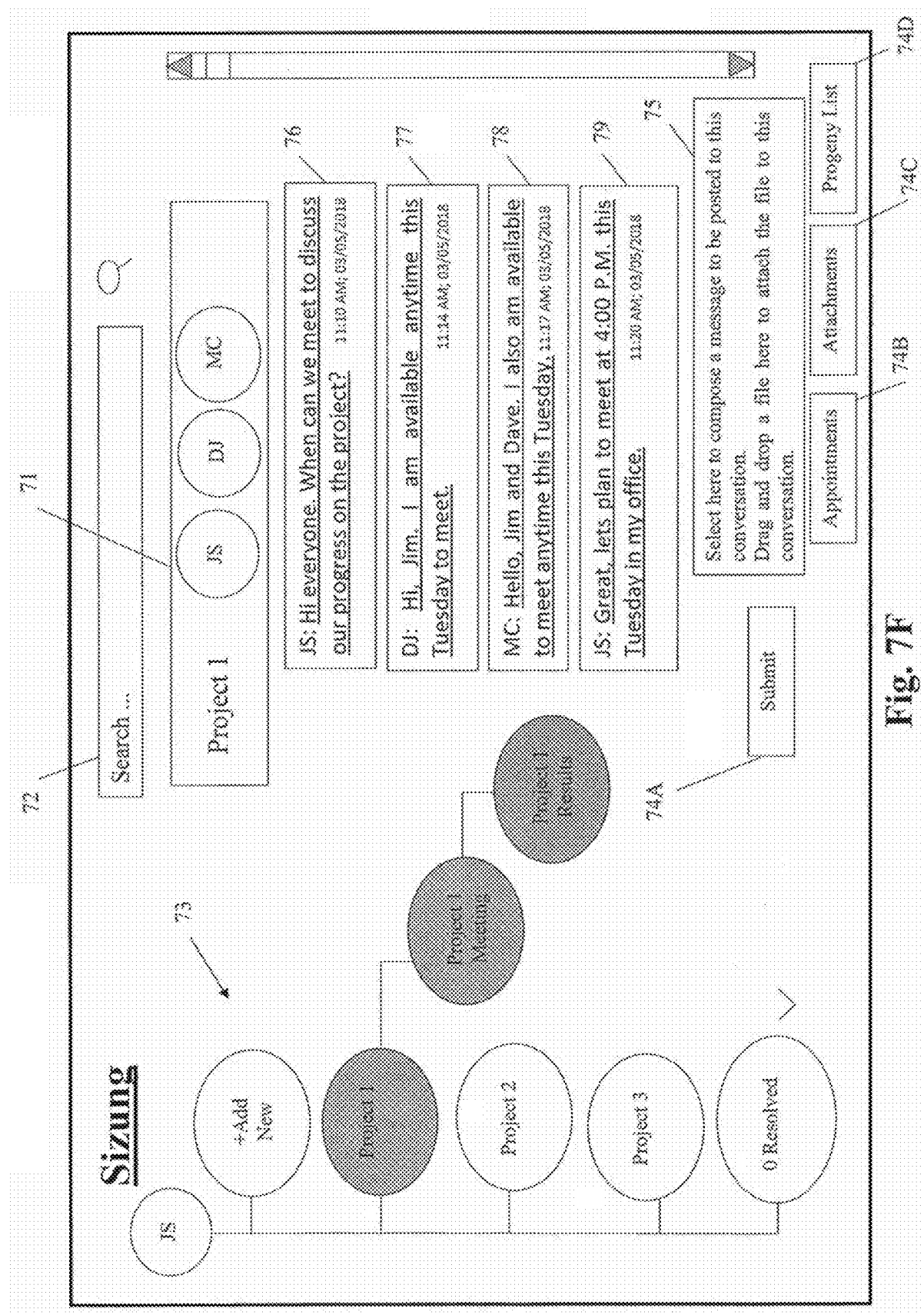

In an another embodiment, upon selecting parent conversations "Project 1" amongst parent conversations "Project 1", "Project 2", and "Project 3", the progeny (in this case child conversation entitled "Project 1 Meeting" and grandchild conversation entitled "Project 1 Results") of selected conversation "Project 1" may be presented, while additionally presenting other unselected root conversations (e.g., "Project 2", "Project 3", etc.), as shown in FIG. 7F.

Provisions to import, create or edit a conversation may be configured to populate the conversation data structure with the following attributes to be maintained for the conversation: a title; member information (e.g., for members such as conversation creator, lead member defaulting to conversation creator but can be assigned to another member, and other members who are registered users, information such as names/emails/phone numbers/or third party user id; or email ids of members who are unregistered users); parent ID; visibility setting (defaulting to private, but can be switched to public); resolve/unresolved status (defaulting to unresolved); resolve by date (defaulting to no date); messages posted by any of its members. Each member may be permitted to edit the attributes of the conversation, in addition to read and post messages to the conversation from the moment the user becomes a member.

A system configured for contextually organizing digital conversations and viewing associated content may process the attributes in any of various different ways, such as the following. For example, the parent ID of the conversation for each user may, by default, be defined by the conversation creator, and inherited by all subsequent members. If a conversation has no parent id relative to a given user (such as if the conversation was created as a "root" conversation relative to its creator, or was created with a parent conversation of which its creator is a member, but the given user is not), then the parent ID is null, or there is no parent ID, for that given user. Any member of a conversation can assign an override parent conversation for themselves, or for any (none, some or all) of the other members of the conversation, and thus the override parent ID can exist or not exist, or can exist and vary for different members. Any member of a conversation can be permitted to resolve or unresolve that conversation along with any (none, some or all) of its progeny conversations in that user's tree, and the effect of resolving or unresolving the selected conversation for all of the other members of the conversation is that the conversation is placed in the same resolved/unresolved state for all of the members and cannot vary per member. When a conversation is resolved, it can be collapsed into the "resolved" folder of its parent conversation, or in case it has an override parent for that user, its override parent conversation.

In a case that a user decides to create a new conversation, the user may then be permitted to enter various attributes of the managed conversation, as shown in FIG. 9A (step S82; FIG. 8). Such attributes may be entered via a title field 90 provided by the user interface to allow entry of a title of the managed conversation, a description field 91 provided to allow entry of a description associated with the managed conversation, a hashtag field 92 provided to allow entry of a hashtag associated with the managed conversation, a field 93 provided to allow entry of a resolve state (e.g., freezing conversation in time) or an unresolved state of the managed conversation and a resolve by date of the conversation (if applicable), a deadline field 96 provided to allow entry of a deadline associated with the conversation, a field 97 to allow selection or entry of whether the conversation is to be created or imported from another application or one or more conversation sources 14, a visibility field 98 to allow selection or entry of a visibility setting of the conversation, and fields 94 and 95 to allow entry of one or more members to be invited to the managed conversation. For example, the user Dave Jones (corresponding to the user ID "Dave_Jones") may be invited to a managed conversation having a title "Project 1 Meeting" (FIG. 9A) via an "Invite Registered Users" option provided in field 94, and non-registered users may be invited via an "Invite Non-registered users" option provided in field 95. The parent ID may be configured so that it cannot be changed after the conversation is created.

The visibility setting associated with the managed conversation may be set to a private setting in which only the members of the conversation may be permitted to view the conversation, or may be set to public to permit other users of the workflow organization application who are not members of the conversation to see the conversation (e.g., via a link), and to permit a non-member amongst the other users to request to join the conversation (e.g., via a link) without being permitted otherwise to join, modify or post to the conversation. The visibility setting of private may be a default setting for a created or managed conversation (and such conversation may be deemed to be a private conversation). If a managed conversation has a visibility of public (and thus such conversation may be deemed to be a public conversation herein), any registered user of the workflow organizing application 11*a*, or optionally users not registered with the workflow organizing application 11*a*, may obtain a URL associated with the public conversation and view the conversation, although it may be that only members of the public conversation are permitted to post messages to the public conversation. A managed conversation which has the visibility setting of public may be saved to the tree structure specific to the non-member. Such privacy state may be configured so that the privacy setting can be changed from the default setting of private to public only at the time of creating a conversation, and thereafter may not be changed.

After the conversation creator member enters the attributes for the created conversation, the workflow organizing application 11*a* communicates with the database 13 and/or server 12 (or the terminal apparatus 11) to populate the relevant tables containing the user data and conversation data with the attributes of the created conversation (step S83; FIG. 8). For example, a conversation having the title "Project 2 Meeting" may be added as an entry to each of the relevant tables (FIGS. 4, 5, 6A). The workflow organizing application 11*a* then may retrieve the conversation data in the user table (FIG. 4), the conversation data table (FIG. 5) and the user conversation table for user ID "Jim_Smith" (FIG. 6A) and generate a tree structure specific to the user (having, for example, user ID: "Jim_Smith"), which includes the conversation data of the created conversation (step S84; FIG. 8). The conversation creator, or any other members of the created conversation may then enter a user-specified message to be posted to the created conversation or any other conversation in the tree structure specific to the user.

When the created conversation is a root conversation (e.g., the parent ID is "Null"), the created conversation may be inserted into the tree structure specific to the user as a parent conversation. In this case, on the other hand, the created conversation "Project 1 Meeting" is inserted in the tree structure specific to the user "Jim Smith" (the conversation creator) as a progeny (in this case, a child) conversation of root conversation "Project 1" (FIG. 9B), since the user has, for example, created the conversation "Project 1 Meeting" after selecting the "+Add New" icon adjacent to conversation "Project 1". Conversation "Project 1 Meeting" may be a derivative conversation of parent conversation "Project 1". In addition, the user may create progeny (e.g., child, grandchild, great-grandchild, etc.) branching out of the conversation "Project 2" or "Project 2 Meeting" in the tree structure provided in field 73. The parent ID of a conversation placed as progeny to a parent application may be assigned in accordance with the process discussed supra in FIGS. 3A-3D.

The application provides adaptive data lenses into the data specific to the user. When the tree is presented to the user, the user can view specific data associated with the conversations.

As discussed, herein, each user has a unique tree of which the user is the root and which contains all the conversations of which he is a member, in addition to the public conversations of which he is not a member but which he has saved to a parent conversation in his tree, or which another user has saved for him to a parent conversation in his tree. The tree is constructed based on the parent id of each conversation (or in case of an override parent, the override parent id) of each of these conversations.

The user can select any conversation in his tree and perform one or more of the following as to the selected conversation:

view timeline of all the posts from the moment the user joined that conversation, with the posts listed in chronological order;

view a list of all "progeny" conversations (that is, children, grandchildren, great-grandchildren, etc.) of the selected conversation, sorted by priority (e.g., in order assigned by an adaptive intelligence module, by date created, by lead member, by deadline, etc.) or as discussed elsewhere herein;

view the attachments associated with that conversation and its progeny conversations which can be sorted by most recently viewed, by date posted, by user who posted, or by conversation to which it was posted;

view the appointments associated with the selected conversation and its progeny conversations, ordered by time, by day, by week, by month, by year, etc.;

retrieve a search result view of all of the posts in the conversation and its progeny conversations (relative to that user) with matching keyword to search query, ordered by date of post.

If the user selects a conversation in the tree structure specific to the member and connects the selected conversation to a parent conversation (of which the user is a member), the selected conversation in the tree structure specific to the member may inherit the ID of the parent conversation as a parent ID associated with the selected conversation in such tree structure. For example, as shown in FIGS. 6A and 9B, since user "Jim Smith" is a member of the conversation titled "Project 1" and the conversation titled "Project 1 Meeting", which in this case is a child conversation of "Project 1", the conversation titled "Project 1 Meeting" as to "Jim_Smith" may inherit the conversation ID 100 of conversation "Project 1" as the parent ID of conversation "Project 1 Meeting" relative to "Jim_Smith".

However, in the tree structure specific to the user, the parent ID of the managed conversation relative to the user may be different than the parent ID of the managed conversation in the tree structure specific to another conversation member of the managed conversation. For example, when the user "Mike_Carter; MC" is added to a conversation titled "Project 1 Results", as shown in the table in FIG. 6B, it is determined that user "Mike_Carter; MC" is not a member of the conversation titled "Project 1 Meeting" (e.g., the original parent ID of conversation "Project 1 Results"), and thus the user "Mike_Carter" would not inherit the conversation ID of the conversation titled "Project 1 Meeting" as a parent ID. When it is determined that the user "Mike_Carter" is not a member of the conversation titled "Project 1 Meeting", a conversation ID of a nearest ancestor of which the user "Mike_Carter" is a member and from which conversation "Project 1" branches, which in this case is conversation "Project 1", may be used as a virtual parent ID (identifying a virtual parent conversation) of the managed conversation relative to the user, as shown in FIG. 9C, and as discussed with reference to FIG. 3. For example, the parent ID 100 (i.e. the conversation ID of nearest ancestor conversation "Project 1" of which user "Mike_Carter" is a member) may be used as a virtual ID for conversation "Project 1 Results" relative to user "Mike_Carter".

A user may be permitted to place a managed conversation, which may be formed by referencing the tables in FIGS. 4, 5 and 6A-6C, as a progeny to another ancestor conversation in the tree structure specific to the user, and the override parent ID (which may be associated with such another ancestor conversation and different than an original parent ID of the managed conversation relative to the managed conversation) may be assigned in the tree structure specific to the user. For example, as shown in FIG. 6A, an override parent ID of 210 may be assigned to managed conversation "Project 3 Results" (having the parent ID 310 as to Jim Smith). Such override parent ID may be assigned to the conversation "Project 3 Results" if the user "Jim Smith" places (by, for example, dragging or selecting an option on the graphical user interface) conversation "Project 3 Results" as a progeny (in this case, a child) of conversation "Project 2 Meeting" (FIG. 9D-1). In addition, a conversation member may assign an override parent conversation to a managed conversation to substitute in the tree structure specific to that conversation member (or in tree structures specific to other members of the conversation) an override parent ID for an existing parent ID associated with a managed conversation. For example, the parent ID of conversation "Project 3 Results" would become 210 instead of 310, for the user "Jim_Smith", and the parent ID of another member of the conversation (specified by the user "Jim_Smith") may become 210 instead of whatever value was previously the parent ID relative to such another member, depending on which conversations such another member is also a member of.

The user may be permitted to assign an override parent ID to the managed conversation to move the conversation to a new parent conversation and additionally select members of the managed conversations to whom the override parent identifier is to apply. For example, the user "Jim Smith" may select an option to apply the override parent ID 210 to user "Bob Williams" in connection with conversation "Project 3 Results", and thus place conversation "Project 3 Results" as a progeny (in this case, a child) of conversation "Project 2 Meeting", as shown in FIG. 9D-1. However, since user "Bob_Williams" is not a member of conversation "Project 2 Meeting", a conversation ID of a nearest ancestor conversation (e.g., "Project 2"; conversation ID: 200) of which user "Bob Williams" is a member may be assigned as a virtual parent ID relative to user "Bob Williams" for the conversation "Project 2 Meeting", as shown in FIG. 9D-2.

In another aspect, if a user places a selected conversation in the tree structure specific to the user as a progeny to a first ancestor (connected parent) conversation that the user is not a member of, a conversation of a nearest ancestor conversation (other than such first ancestor conversation) of which the user is a member of is determined. For example, the user "Bob_Williams" ("BW") as shown in FIG. 9E may place the conversation "Project 3 Results" as a progeny (in this case, as a child) of conversation "Project 3 Meeting" (which may be visible to "Bob_Williams" since "Project 3 Meeting" is a public conversation), but since "Bob_Williams" is not a member of conversation "Project 3 Meeting" (FIG. 6C), the nearest ancestor conversation of which Bob is a member (e.g., conversation "Project 3") may be determined. Thus, since the user "BW" is a member of conversation "Project 3", the conversation ID (300) of conversation "Project 3" may be assigned as the parent ID of conversation "Project 3 Results" relative to user "Bob_Williams". The hierarchical tree structure specific to "Bob_Williams" may be updated in accordance with the created conversation "Project 3 Results."

As shown in FIG. 9F, the user "Jim_Smith" may place conversation "Project 3 Meeting" as a progeny (in this case, as a child of conversation "Project 1 Meeting" and as a grandchild of conversation "Project 1"), and upon determining (for example, by reference to user conversation table in FIG. 6B) that another member (e.g., "Mike_Carter") of conversation "Project 3 Meeting" is not a member of new parent conversation "Project 1 Meeting" (that is, the new parent conversation as to "Project 3 Meeting"), a virtual ID may be assigned to such another member. The virtual ID may be a conversation ID of a nearest ancestor conversation which user "Mike_Carter" is a member, which in this case is conversation "Project 1" (e.g., the original parent conversation of the new parent conversation "Project 1 Meeting"). Thus, the conversation ID 100 of conversation "Project 1" may be assigned as the virtual ID for conversation "Project 3 Meeting" relative to user "Mike_Carter", in a case that the conversation "Project 3 Meeting" is placed with new parent conversation "Project 1 Meeting".

If the user decides to import a conversation (step S85; Yes; FIG. 8) from another application or one or more conversation sources 14, the selected conversation is then imported into the workflow organizing application 11*a* from the conversation source 14 (step S86; FIG. 8). It is determined whether a similar managed conversation having similar subject matter or common members with those of the imported conversation exists in the tree structure specific to the user (step S89; FIG. 8). Upon determining that there is a similar conversation in the tree structure of the user (step S89; Yes; FIG. 8) having similar subject matter or common members with those of the imported conversation, the messages in the imported conversation may be merged into the similar managed conversation (step S90; FIG. 8). For example, as shown in FIG. 9G, the user "Dave Jones" (corresponding to user ID "Dave_Jones" and an icon having initials "DJ"), may have, for example, sent a message using one or more conversation sources 14 (such as, for example, an e-mail message) to the user "Jim_Smith" regarding a meeting that took place that day. Such e-mail message may be imported into the workflow organizing application 11*a* as message provided in field 99B (following a message provided in field 99A in the timeline) and merged into conversation "Project 1 Results", since the e-mail conversation including the e-mail message ("I appreciated your feedback at the meeting today" having a timestamp of 5:05 P.M.; Mar. 6, 2018) constitutes similar subject matter to the conversation "Project 1 Results" (e.g., the meeting that took place) and the e-mail conversation includes member(s) common to conversation "Project 1 Results". For example, a user ID on the workflow organizing system 10A and 10B may be matched with a user ID on such another application or one or more conversation sources 14.

Absent determining such a similar managed conversation, the imported conversation may be placed as a progeny of an ancestor conversation determined based on a comparison of each of the conversations in the tree structure of the user, as to at least one of (i) a title of the imported conversation, (ii) members of the imported conversation, (iii) a time of creation of the imported conversation, and (iv) message content of the imported conversation. A conversation ID of the similar managed conversation may be made as the parent ID of the imported conversation.

If it is determined that there is no similar conversation in the tree structure of the user (step S89; No; FIG. 8), the imported conversation may be placed as a root conversation in the tree structure specific to the user. In addition, the user may be presented with suggestions as to the candidate conversations to which the imported conversation is to be merged or to which the imported conversation is to be assigned a conversation ID as a parent ID.

Even if the user does not decide to import a conversation (step S85; No; FIG. 8) from another application or one or more conversation sources 14, the workflow organizing application 11 may be configured to, on the server-side, periodically (e.g., once a day) retrieve conversations from the conversation sources 14 (step S87; Yes; FIG. 8), and import such conversations from the conversation source 14 (step S88; FIG. 8). If it is determined that such periodically retrieved conversations are similar to or have common members with another conversation in the tree structure specific to the user (step S89; Yes; FIG. 8), the messages in the imported conversation may be merged into the similar managed conversation or assigned conversation ID of a similar conversation as a parent ID of the imported conversations (step S90; FIG. 8).

The generation of the hierarchical, tree structure may be performed on a front end (e.g., on the workflow organizing application 11*a*) according to the following logic:

For each conversation c:
P=parent of c
While P not in user's tree:
    P=parent of P
Add c as direct child of P Automated posts may be generated when a user adds or removes a member of a conversation (e.g., "Jim Smith added/removed Dave Jones to this conversation" or "Jim Smith invited Dave Jones to this conversation"), when a user changes a resolve by date or unresolved/resolved status (e.g., "Jim Smith assigned resolve by date Apr. 5, 2018 to this conversation", "Jim Smith changed resolve by date from Apr. 5, 2018 to May 5, 2018", or "Jim Smith resolved/unresolved this conversation"), when changing a leader of the conversation (e.g., "Jim Smith assigned Dave Jones as Lead of this conversation"), and when a new conversation is created (e.g., "Jim Smith created this conversation").

The conversations and/or messages in selected conversations in the tree structure specific to the user may be sorted in accordance with one or more priority orders. For example, the workflow organizing application 11A may include a path, or prioritized list of all conversations of which the user is a member, which include unseen messages not yet viewed, and an order of such conversations may be determined in accordance with an adaptive intelligence module which infers the importance of each conversation. A user may search the user's path by conversation name (e.g., entering a word in a search box provided in search field 72 provided by the user interface (FIG. 7A) to show conversations having matching keywords), by member (e.g., entering a word into the search box provided in the search field 72 to generate suggestions of those matching members, and selecting one or more of such members which may add them as a filter to the search box provided in the search field 72), and the path may then be filtered to show only those conversations for which the selected user(s) are member(s). Such searching by conversation name and by member in the path may be performed on a front end (e.g., the workflow organizing application 11*a* using local storage cache).

A user may also search the path by hashtags (e.g., #Tags) by, for example, entering a word into the search box provided in the search field 72 and generating suggestions of matching hashtags. By selecting one or more of such hashtags, the hashtags may be added as a filter to the search box provided in the search field 72, and the path may be filtered to show only those conversations for which the selected #Tags are associated. Such searching by hashtag may be performed on a front end (e.g., the workflow organizing application 11*a* using local storage cache). In addition, a user can, for example, select a lead icon (e.g., leader of conversation) as a search filter, which may add that icon to the search box provided in the search field 72 as a filter, and filter the Path list of conversations by only showing conversations which the user is the Lead. Such searching by Lead may be performed on a front end (e.g., the workflow organizing application 11*a* using local storage cache).

A user may also search the path by Resolve Date by, for example, selecting a date icon in the search filters, which may add that icon to the search box provided in the search field 72 as a filter, and filter the Path list of conversations by only showing those for which a Resolve By date has been assigned. Such searching by Resolve Date may be performed on a front end (e.g., the workflow organizing application 11*a* using local storage cache). In addition, a user can, for example, select a My Public icon in the search filter, which may add that icon to the search box provided in the search field 72 as a filter, and filter the user's path only showing those conversations which are Public Conversations (optionally including public conversations of which the user is a member). Such searching by privacy setting may be performed on a front end (e.g., the workflow organizing application 11*a* using local storage cache). In addition, a user can, for example, select a resolved icon in the search filters, which may add that icon to the search box provided in the search field 72 as a filter and make a database query to a back end (e.g., the server 12 and/or the database 13) to pull all the user's resolved conversations (which may not be included in normal path lists). Such filtering by whether a conversation is resolved may employ a database call, unless there is activity in the resolved conversation that the user has not yet seen. A user may also search for, using the path, messages matching any filters entered in the search box provided in the search field 72, and hitting hard return, which may send a call to the database 13 and retrieve the posts with the strongest match to the search query. In a case that different messages have the same degree of match, such posts may be listed in order of how recent the message was posted, and conversations which have been resolved may be included in post results.

In addition, upon the user selecting a conversation within the tree structure specific to the user, a timeline of one or more progeny conversations (e.g., children, grandchildren, great grandchildren, etc.) of the selected conversation branching out of the conversation and may be presented in a sorted priority order based on at least one of (i) a creation date of each of the progeny conversations, (ii) an identity of a leader (i.e. lead member) of each of the progeny conversations, and (iii) a deadline associated with each of the progeny conversations.

Processing to present the timeline of the one or more progeny conversations of the selected conversation may be performed by (i) a front-end portion which may include the workflow organizing application 11*a* (e.g., maintaining a cache in local storage), (ii) the middleware, (iii) a back-end portion which may include the server 12 and the database 13, or (iv) any combination thereof. For example, the front end may be refreshed each time a predetermined time period (e.g., a few seconds) elapses, to call the entire list of conversations in a user's tree structure, and can prioritize progeny conversations while minimizing processing time, since processing may be performed on the front end.

When a user is added by another user to a conversation, the workflow organizing system 10A or 10B may first determine whether each of the users are already common members to another conversation. If each of the users are common members to another conversation, the invitation may be sent to the user (e.g., to a user's "Invitations" folder or tab), to ensure that users do not become part of spam conversations, or have their name unknowingly leveraged in a Public Conversation, etc.). When the user clicks on the Invitation Tab in the tree structure specific to the user, the tree structure may show root conversations, and the path (e.g., prioritized list) may show all the conversations to which the user has been added by users unknown to him on the workflow organizing application 11a.

If the user has been invited to a single conversation by another user, which is not part of a branch, then the Conversation may appear as a single Invitation in Path, and if the user has been invited to multiple conversations by another user, where those Conversations are part of the same branch of the user who invited him, the invitations may be consolidated into a single invitation, designated by the "highest" conversation on the branch and also mentioning the additional number of conversations to which the user has been invited in the branch, (e.g., "+ #Conversations"). When the user selects an invitation, the user may be taken to a tree showing the conversation as a new child conversation of the user (which may also show immediate child conversations branching off it), and the user first may be made to choose to Accept or Decline the invitation before the user can post a message to it. If the user accepts the invitation, the user may be prompted to save the conversation (including an entire branch of child conversations) to a parent conversation in the tree structure specific to the user, and the system be configured that the suggestion is that the user be the parent (e.g., a new Root). If the user declines the invitation, the conversation (including an entire branch of progeny conversations) may be removed from the Invitation Path.

If each of the users (e.g., the user adding another user) are known to each other on the workflow organizing application 11a (e.g., the users are already common members of one or more managed conversations), the new conversation the user is invited to may immediately be added to the new member's tree. In addition, if the new conversation has a child-parent or a sibling relationship with any other conversation in the new members tree structure, then the new conversation may be saved to the nearest parent conversation. For example, if user 1 has a tree structure of: A→B→C→D, user 1 invites user 2 to conversation D, and user 2's tree structure has A→B, but not C, then when conversation D is added to user 2's tree structure, conversation D may be added as child of B. (A→B→D). (e.g., C may be hidden from user 2.). On the other hand, if the new conversation does not have a child-parent or sibling relationship to any conversation in the new member's tree structure, then the new Conversation may be saved as a child of the new member.

In addition, if each of the users (e.g., the user adding another user and such other user) are known to each other on the workflow organizing application 11a (e.g., the users are already common members of one or more managed conversations), the new conversation may immediately be added to the new member's path, and the new member can immediately view and submit messages to the conversation timeline from the time at which the new member, is added. The user may see, at the top of the timeline, a new activity line (which may indicate that the user has not yet seen the posts in this conversation), and the first message the new member sees beneath the new activity line may be an an auto-generated post attributed to the user who added them reading "Jim added Dave Jones to this conversation." In addition, the new member can see all subsequent messages (although all messages submitted to the conversation prior to the time the new member was added may not be visible to the new member).

To follow a public conversation of which the user, the user may click on a "Public Network" meta-filter when searching, and if the path shows no conversations, the user may enter a term in the search box provided in the search field 72 to make a database query to the database 13 to search for a public conversation by name. When a user, for example, selects FOLLOW", which may be at a top of a public conversation timeline, the user is able to save the public Conversation to the tree structure specific to the user. Although the user is not a member of this public conversation, the user may receive updates in the path of the user, and new activity not yet viewed by the user may be associated with the public conversation.

The workflow application 11a may also include an integrated calendar which can automatically tag individual appointments to a conversation from which the appointments were created, and the calendar may be filtered to show only those appointments tagged to the conversation (and thus presented as busy) and progeny of the conversation, while hiding other conversations (not pertinent to this context).

Figure 10A:
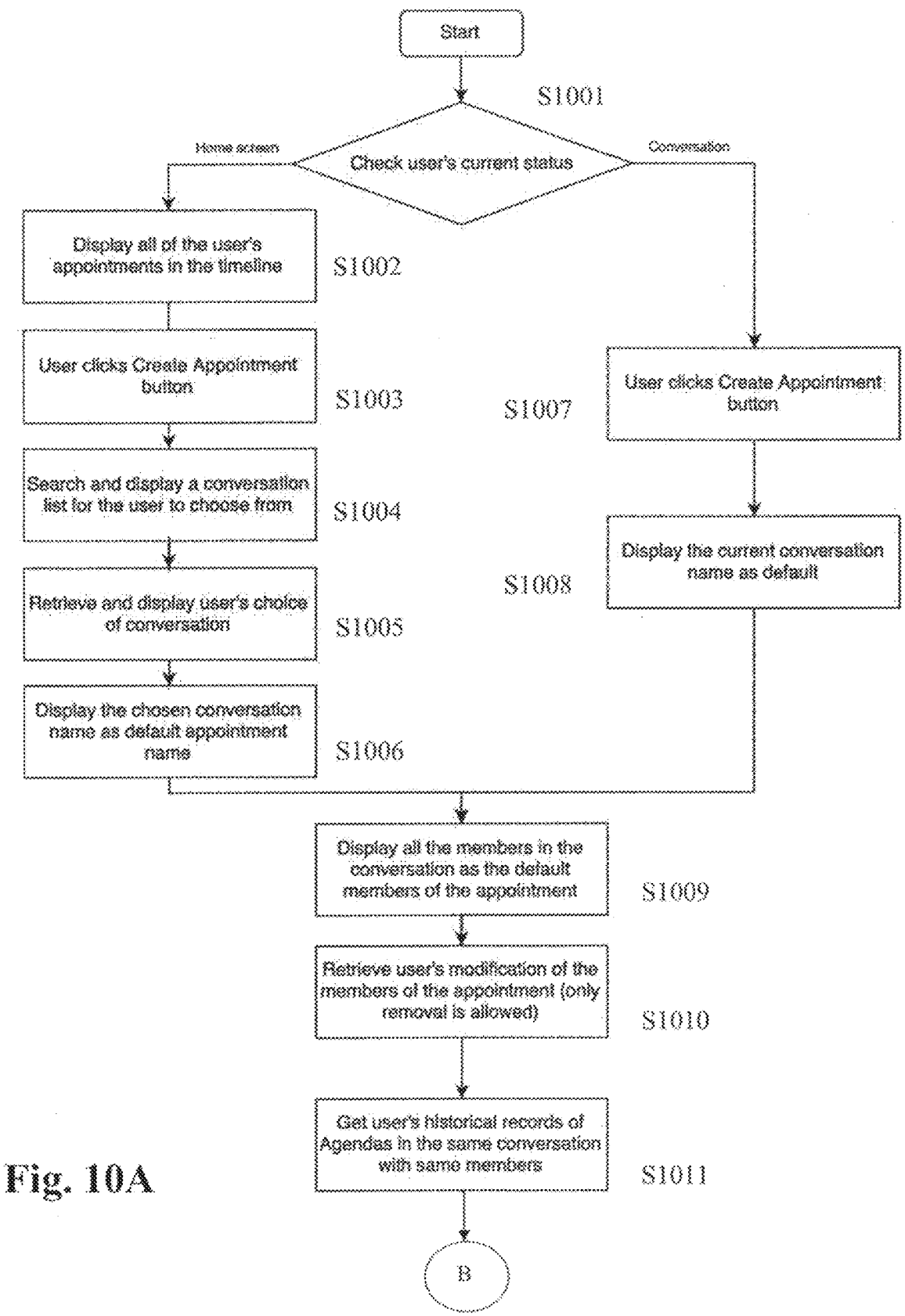
FIGS. 10A-10B show in combination a flow chart showing a method that can be performed by workflow organizing application or system, according to the exemplary embodiments shown in FIGS. 2A and 2B (or equivalent)
Figure 10B:
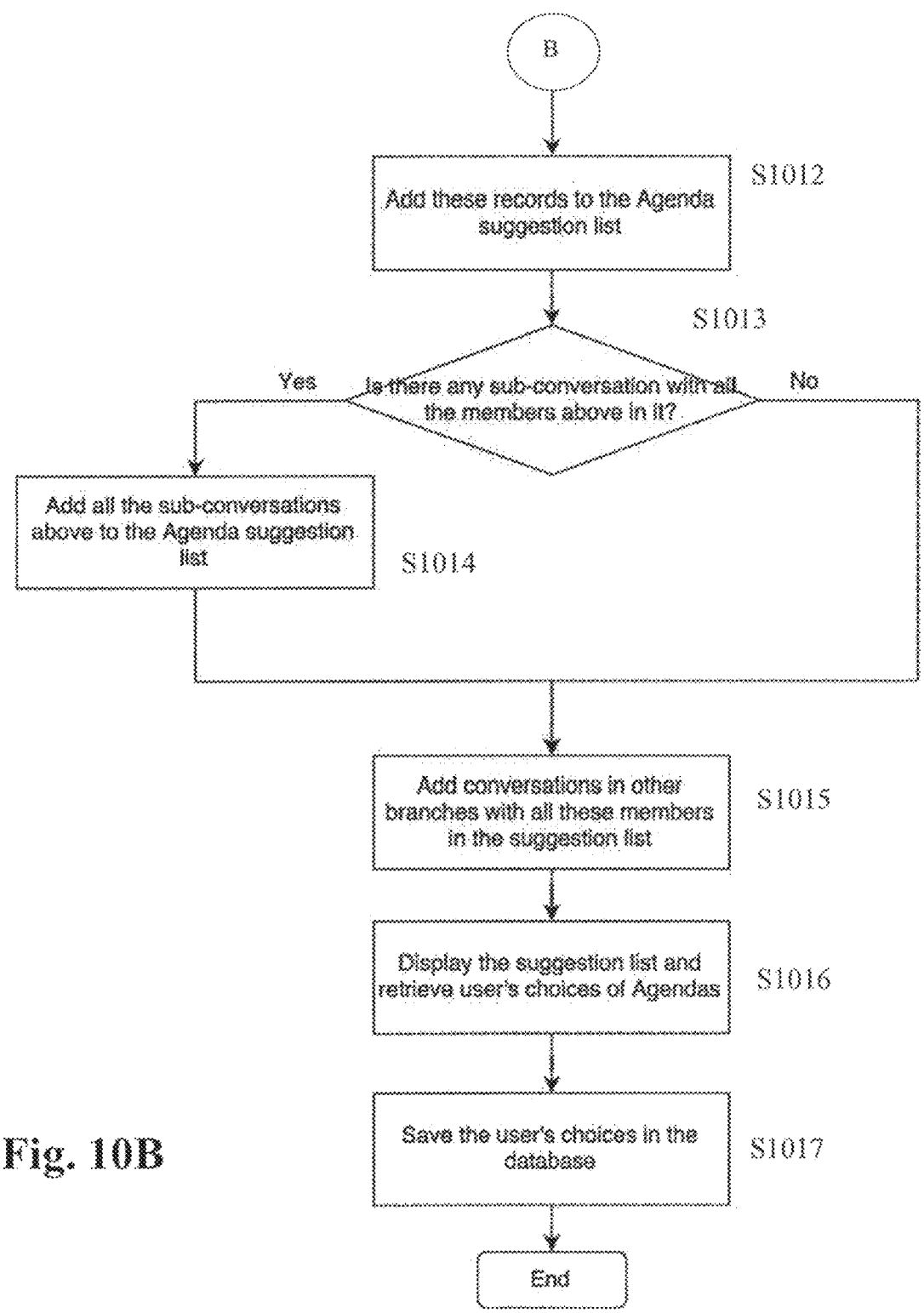

FIGS. 10A-10B show a method or process performed by a workflow organizing system 10A or 10B to integrate a calendar functionality with the managed digital conversations, according to an exemplary embodiment.

First, a user's status in the workflow organizing application 11A may be checked (step S1001), and in a case that the user is at a home screen of the application 11A (e.g., has not selected a conversation), all the user's appointments in the timeline may be displayed (step S1002). When the user selects, for example, a "Create Appointment" button (step S1003), a conversation list for the user to choose from is searched for and displayed (step S1004), and the user's choice of conversation from such list is retrieved (step S1005). The chosen conversation name may be displayed as the default conversation name (step S1006).

On the other hand, if the user's status in the workflow application is checked (step S1001) and it is determined the user has selected a conversation, it is then determined that the user selects, for example, a "Create Appointment Button" (step S1007), and the current conversation name may be used as a default name for the appointment (step S1008).

When the chosen conversation name is displayed as the default conversation name (step S1006) or the current conversation name is displayed as the current conversation name (step S1008), all members in the conversation may be displayed as default members of the appointment (step S1009), and user modification of the members of the appointment may be retrieved (step S1010). Such user modification may be configured so that only removal of members may be permitted. Historical records of agendas in the same conversation with the same members may be obtained (step S1011), and such records may be added to an agenda suggestion list (step S1012). It then may be determined whether all the members are members in any particular sub-conversation, and if yes (step S1013; Yes), all the sub-conversations that satisfy this criteria may be added to the agenda suggestion list (step S1014).

When all the sub-conversations are added to the agenda suggestion list (step S1014) or if it is determined there are no sub-conversations having all the members therein (step S1013; No), conversations in other branches having all the members in the suggestion list may be added (step S1015). The suggestion list may then be displayed, and user choices of Agendas may be received (step S1016) and saved in the database 13 (step S1017). The user may add any conversation in the tree structure specific to the user as additional agendas, including public conversations (e.g., any conversation to which the user has access).

The calendar may be a list of all the appointments in calendar format, with the appointments associated with a conversation and its progeny. The entire calendar may be loaded when a user logs in, and conversations other than the selected conversation and its progeny may be filtered so as not to associate appointments of the filtered conversations. When an appointment is created in a conversation, a field called "Agenda" may be in the appointment, and potential agenda items may be the list of progeny conversations (default suggested agenda items), and any other conversation in the workflow organizing system 11A may be searched for and made an agenda item.

The one or more calendar appointments may be presented in a sorted priority order based on at least one of (i) chronological order, (ii) a timestamp at which appointment was created, (iii) user who created appointment, (iv) members of appointment, and (v) conversation in which appointment was created or associated.

Figure 11:
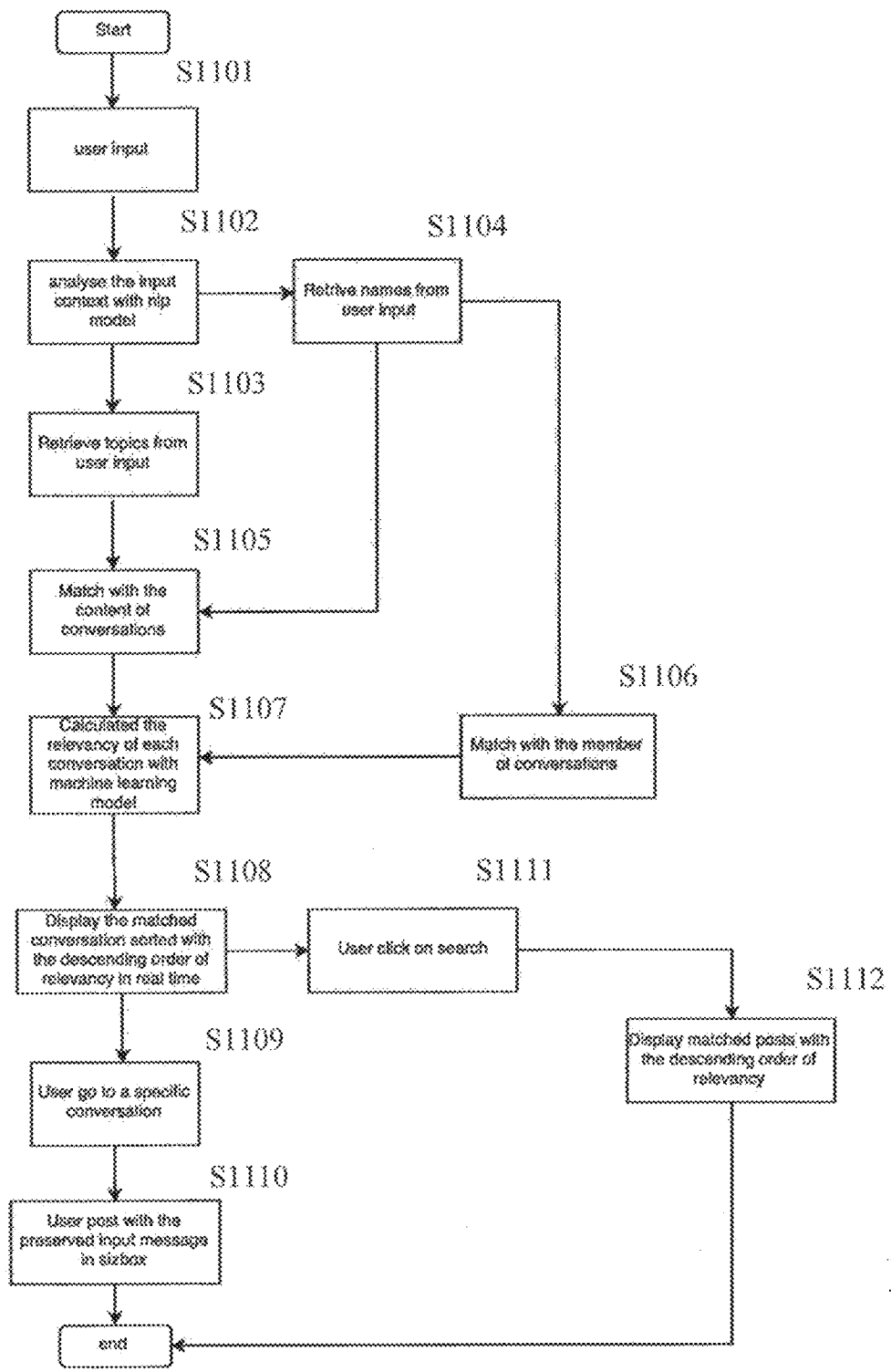
FIG. 11 is a flow chart showing a method that can be performed by the workflow organizing application or service, including match via natural language processing or other adaptively intelligent processing to be posted to relevant conversations, according to the exemplary embodiments shown in FIGS. 2A and 2B (or equivalent)

FIG. 11 shows a method or process performed by the workflow organizing system 10A or 10B to manage digital conversations, including matching, by natural language processing or other adaptively intelligent processing, processing of a message to be posted to one or more conversations (for example, having semantic similarity to the message), according to an exemplary embodiment.

In an example of a process discussed below, upon receiving entry by the user of a message being drafted (step S1101), natural language processing (and/or other semantic match or adaptively intelligent processing) may be applied to the message (step S1102). Results of such intelligent processing of the message being drafted are retrieved (step S1103, step S1104). The processing of the message and the semantic match to relevant conversations may be started during user entry of the message. The natural language processing may also exclude common greetings and expressions, such as "hi", "hey", "what's up", "top", "the", "and", etc., from the processing.

Results of the processing of the message may be matched to names of one or more contacts (step S1105), and such matched contacts may be suggested as candidate addressees for the message. For example, when a search identifies a non-excluded word which matches first or last name of a contact (e.g., another user having a common conversation with the user or in a contact list associated with the user), or two consecutive words matching the first and last name of a contact, the search results may be suggested as potential addresses. Upon selection by the user of one of the matched contacts as an addressee for the message, additional conversations of which the addressee is a member may be determined, and such additional conversations may be inserted in the presentation of managed conversations.

Figure 12:
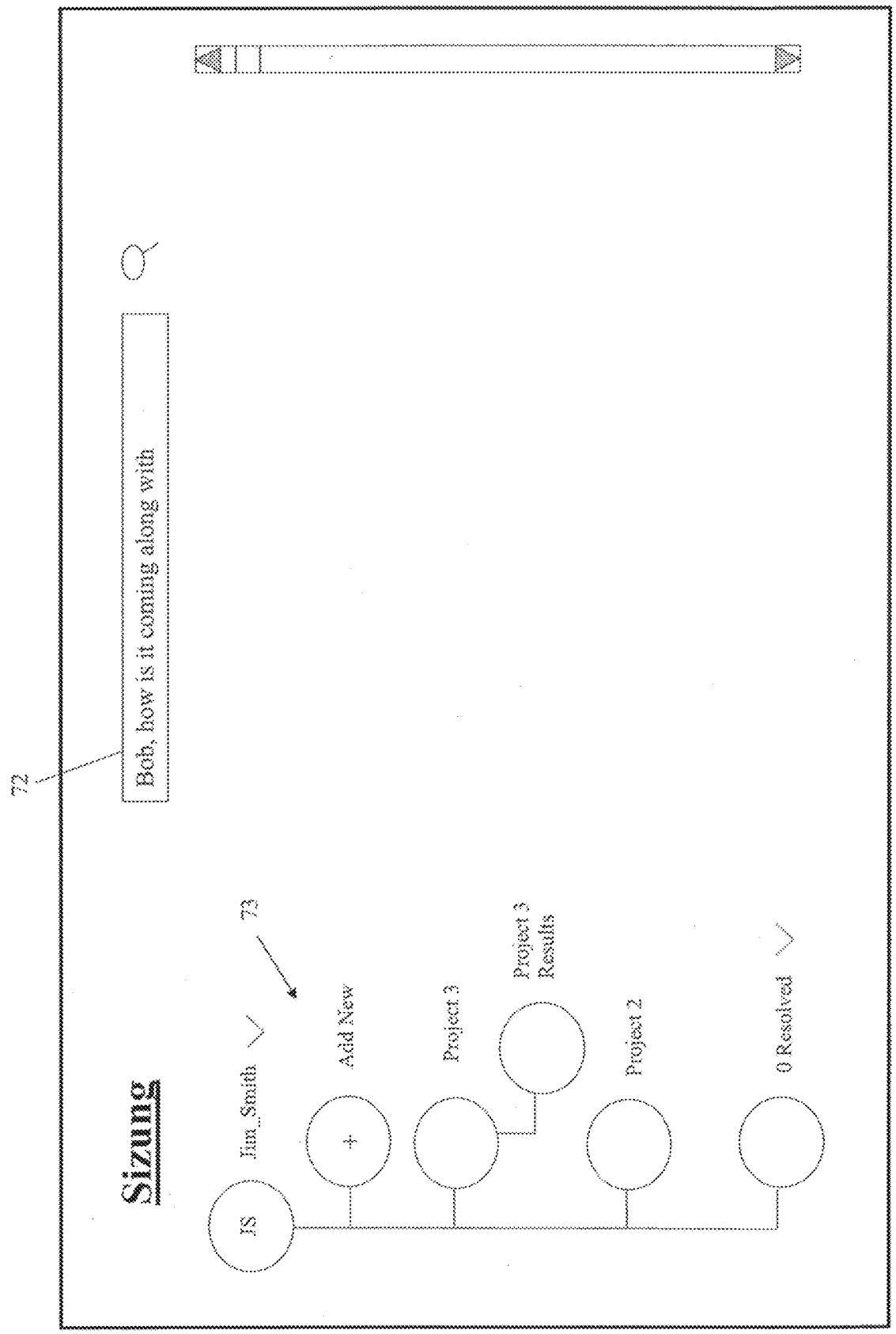
FIG. 12 shows an example of user interface screen that can be provided by the workflow organizing application or system, according to the exemplary embodiments shown in FIGS. 2A and 2B (or equivalent)
Figure 13:
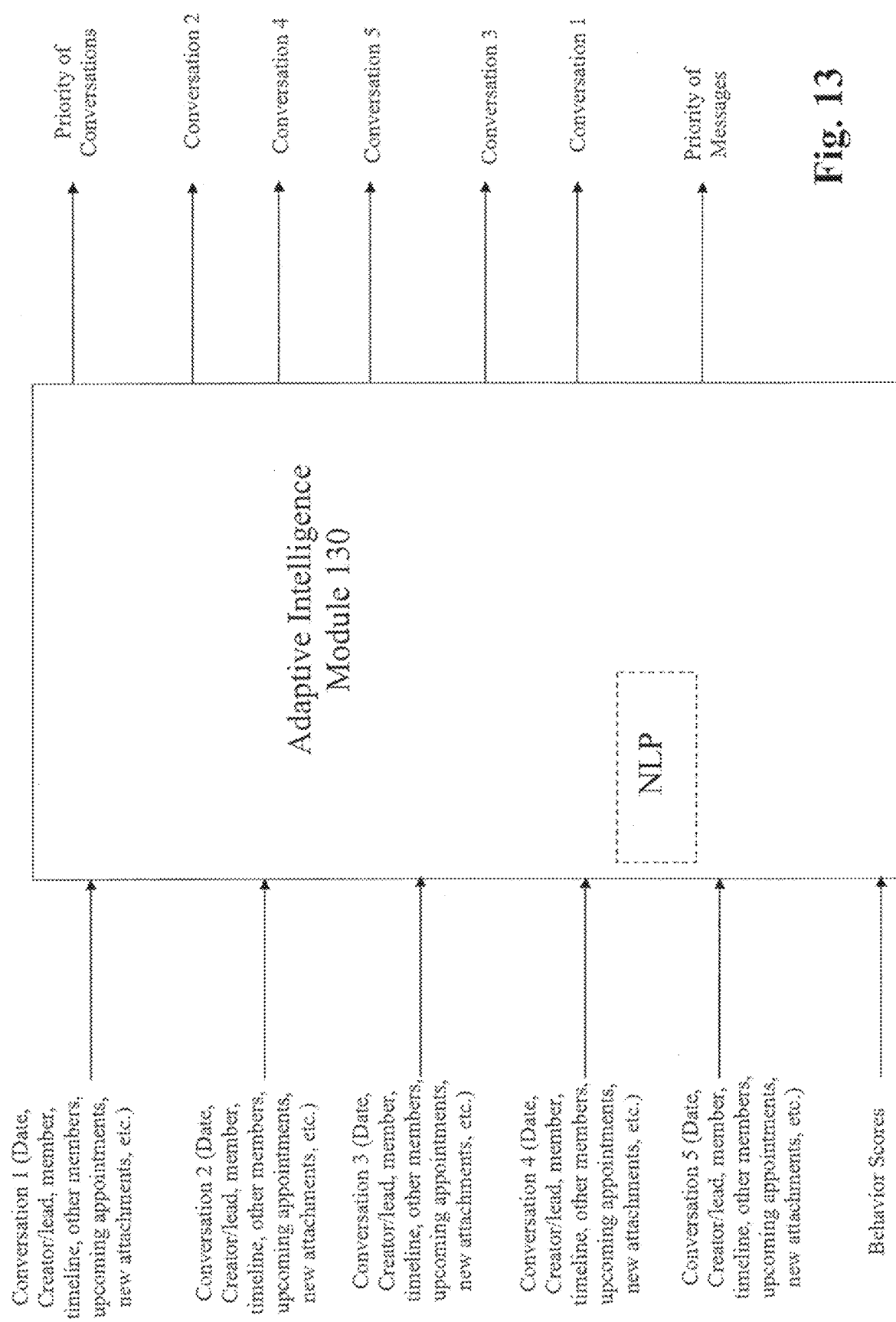
FIG. 13 is a block diagram showing an example of a configuration of an Adaptive Intelligence Module, according to the exemplary embodiments shown in FIGS. 2A and 2B (or an equivalent)

Upon determining the semantic relevance of the matched conversations (step S1107) using, for example, an adaptive intelligence module 130 as shown in FIG. 13, a list of the matched conversations is displayed in descending order of relevancy, (step S1108). For example, as shown in FIG. 12, matched conversations "Project 3", "Project 3 Results", and "Project 2" may be displayed in descending order of relevancy based on semantic relevance, and since the user entered "Bob, how is it coming along with" in field 72, conversations of which user "Bob_Williams" is a member may be displayed ("Project 3", "Project 3 Results", and "Project 2"). As discussed, the workflow organizing application 11a may include an artificial neural network, or another intelligent part, trained by applying machine learning techniques using a machine learning model.

The user then may select a conversation from the list of matched conversations (step S1109), and the user is permitted to post the message (e.g., which began to be input in step S1101) to the selected conversation (step S1110). Such message may be preserved as entered in a box to compose messages. The user may also be permitted to select a conversation amongst the additional conversations of which the addressee is a member, and to post a message to the selected conversation of such additional conversations. The user may also directly search for the name of a specific conversation in which to post the message.

The user may also perform a search of the matched conversations (step S1111), which displays matched messages in a descending order of semantic relevancy (step S1112).

The user may also be permitted to search for a specified name in the list of matched conversations, and conversations to which the specified name is matched may be highlighted. The user then may be permitted to select a matched conversation which is highlighted and to post the message to the selected conversation.

As shown in FIG. 13, the adaptive intelligence module 130, which can determine semantic relevance of matched conversations, may additionally determine a prioritized list of managed conversations based on importance of the managed conversation to the user and process as input data conversations 1, 2, 3, 4 and 5 (e.g., date of the conversation, creator/lead member of the conversation, deadlines, visibility or privacy settings, resolved state, user specific historical behavior scores relative to that conversation, new or unseen messages in a conversation, upcoming calendar appointments associated with the conversation, new or unseen file attachments or hyperlinks associated with the conversation etc.),) and outputs a list of conversations organized based on input conversations 1, 2, 3, 4 and 5 in a descending order of relevancy, such as, for example, Conversation 2, Conversation 4, Conversation 5, Conversation 3 and Conversation 1.

Figure 14:
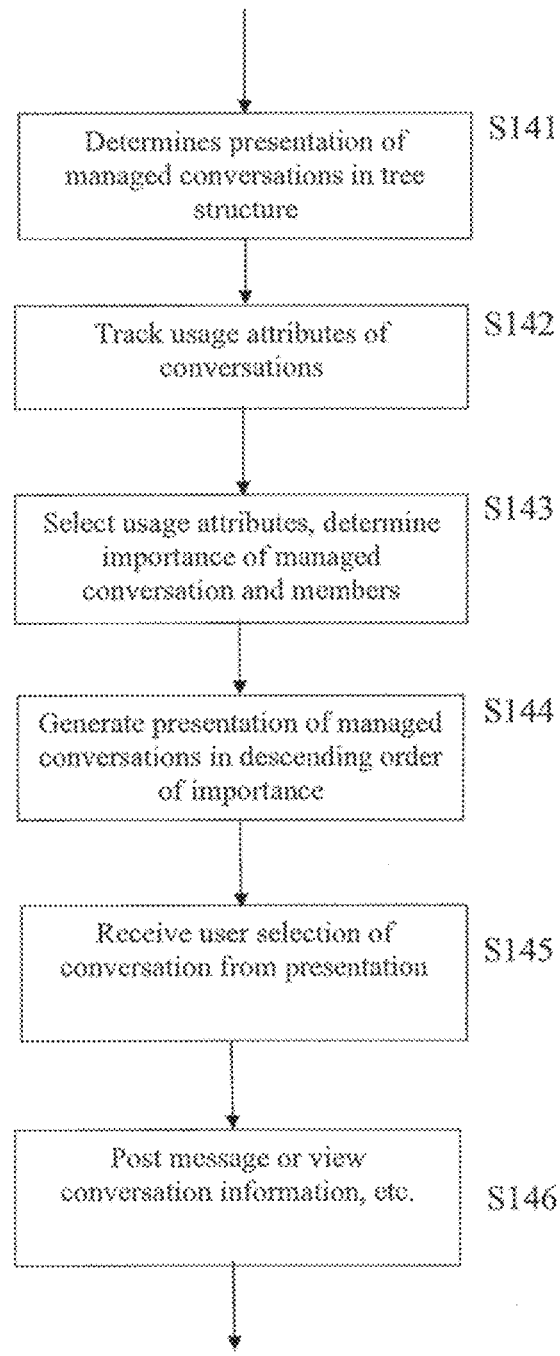
FIG. 14 is a flow chart showing a method that can be performed by the workflow organizing application or service, including selecting usage attributes and determining by adaptively intelligent processing a priority order of conversations, according to the exemplary embodiments shown in FIGS. 2A and 2B (or equivalent)

As shown in FIG. 14, the workflow organization application determines for a user managed conversations of which the user is a member (step S141; FIG. 14). Each managed conversation may include messages constituting content of the conversation, and have one or more other members associated with the conversation. The workflow organization application 11a may track usage attributes (step S142; FIG. 14) of each of the managed conversations (as shown in the table of FIG. 15), and the adaptive intelligence module 130 may utilize such tracked usage attributes to determine a user-specific behavioral score for each conversation.

The user-specific behavioral score for each conversation may constitute a numerical index and may include creating a unique profile for behavior of the user by assigning a weight for each conversation in the tree structure specific to the user, and a weight for each conversation member that is a member of a conversation in the tree structure specific to the user. User behavior, usage attributes and user access patterns can be tracked and input into the adaptive intelligence module 130, including, for example, what kind of information is generated and which member posted the information, tracking how long the user remains in specific conversations and/or how many times a user posts to the conversation, and how responsive a user is to a particular conversation and a particular user. The workflow organizing application 11a may employ a timer, such as using a clock function of a computer, to determine usage attributes such as how long, or a frequency that, a user remains in a conversation, and may compare, for example, a timestamp of a first message posted to a time stamp of a message responsive to such first message to determine other usage attributes.

For example, if a minimal amount of time passes between a user responding to a new message from a particular member of the conversation or to a new message in a particular conversation, such member and/or such conversation may be assigned a greater weight in the behavioral score. On the other hand, if a large amount of time passes between responding to a particular conversation member or responding to a particular conversation, a lower weight may be assigned to such conversation member and/or such conversation. As another example, the user-specific behavioral score may take into account which conversation is selected from a prioritized list of conversations. For example, if a conversation is placed fourth in a prioritized list of conversations and the user selects such conversation, that conversation may be assigned more weight when determining the user-specific behavioral score in the future.

The user-specific behavioral score relative to the user for each conversation may be maintained in a user relationship table, selected by the adaptive intelligence module 130 (step S143; FIG. 14) and compared to the user-specific behavioral score for other conversations to determine an importance of each conversation, and the adaptive intelligence module 130 outputs for display a presentation of the managed conversations in descending order of importance of the conversations (step S144; FIG. 14). In addition, the user-specific behavioral score for each member of the conversations may be employed to determine such prioritized list of conversations. As shown in FIG. 15, the user-specific behavioral score relative to User_1 as to Conversation 2 is the highest score, at least in part due to the lower response time, higher time in conversation, and higher total number of posted messages (relative to the other conversations), and the user-specific behavioral score for User_1 as to member User_3 being the highest at least in part due to the low response time to a message posted by User_3 (relative to the other members). Thus, Conversation 2 may be ordered first in the presentation of the managed conversations displayed in descending order of importance, while Conversation 1 may be ordered last at least in part due to the higher response time, lower time in conversation, and lower total number of posted messages (relative to the other conversations), and the user-specific behavioral score for User_1 as to member User_2 and User_4 being relatively lower than the user-specific behavioral score for User_3, at least in part due to the higher response time to a message posted by User_2 or User_4 (relative to the User_3).

The workflow organizing application 11a may then receive user selection of a conversation in such matched list of conversations (step S145; FIG. 14), such as, for example, to post a message to the selected conversation (step S146; FIG. 14).

In addition, although the user-specific behavioral score may be used by the adaptive intelligence module 130 to display a list in descending order of importance for all conversations, a user may instead be presented with a prioritized display a list in descending order of importance of a particular conversation and progeny, rather than a prioritized list of all conversations.

The adaptive intelligence module 130 may apply one or more AI and other intelligent processing techniques. For example, the adaptive intelligence module 130 may include an artificial neural network, or another intelligent part, trained by applying machine learning techniques. Such techniques are generally understood and therefore a detailed description is omitted in order to obscure inventive aspects of the present disclosure.

The aforementioned specific embodiments are illustrative, and many variations can be introduced on these embodiments without departing from the spirit of the disclosure. For example, elements and/or features of different examples and illustrative embodiments may be combined with each other and/or substituted for each other within the scope of this disclosure.

As mentioned above and as is known in the art, training and machine learning are often conducted to improve performance of AI and other intelligent processing modules so that the module can operate adaptively, as needed, and such training and machine learning can be supervised or automated, offline and/or on-line.

Accordingly, the adaptive intelligence module 130 may have integrated therein a learning module (omitted from FIG. 13) which can adjust inner logic of the host part, when the adaptive intelligence module 130 identifies that input data leads to superior correlation of priority of conversations with the message being drafted when certain input data is relevant. As such, similar adjustment can be made iteratively in order to make the application 11a more accurate in prioritizing semantically relevant conversations.

In one example, adjustment by learning module is performed off-line in a testing environment. Data from previous prioritization of semantically relevant conversations are accumulated (along with desired results) over time and applied in the test environment by the learning module in order to train the subject intelligent part to obtain the desired result. That is, input data may have a corresponding expected or desired output when the input data is input into the subject intelligent part, and the learning module of the adaptive intelligence module 130 can formulate an adjustment based on comparison of the actual output of the learning module to the expected or desired output, to drive the actual output to converge on expected or desired output.

The orders in which the steps are performed in the aforementioned methods are not limited to those shown in the examples of FIGS. 1, 3, 8, 10 11 and 14 and may be switched as long as similar results are achieved. Also, it should be noted that the methods illustrated in the examples of FIGS. 1, 3, 8, 10, 11 and 14 may be implemented using any of the systems described in connection with FIGS. 2A and 2B (or equivalent).

What is claimed is:

1. A method performed by a workflow organization system to manage digital conversations, the method comprising:
   (a) forming one or more managed conversations within a workflow organization application, each managed conversation including messages which constitute a content of the managed conversation, and for each managed conversation, maintaining (i) member information indicating a conversation creator member and one or more other conversation members of the managed conversation, and (ii) additional information for the managed conversation, including a parent identifier (ID) associated with the managed conversation;

(b) generating, for each user of the workflow organization application, a hierarchical, tree structure, specific to the user, of conversations of which the user is a member, the tree structure being generated according to, for each conversation in the tree structure, the parent ID of the managed conversation relative to the user;

(c) displaying the tree structure, and permitting the user to select any conversation within the tree structure specific to the user and permitting the user to post a new message to the selected conversation;

forming one or more progeny conversations branching out of the managed conversation within the tree structure of any members of the managed conversation; and permitting each of the members of the managed conversation to mark the managed conversation, as well as any of the one or more progeny conversations branching out of the managed conversation, as a resolved conversation which is collapsed into a resolved conversation folder, wherein each conversation is initially set to an unresolved conversation, wherein a member is permitted to resolve or unresolve the managed conversation or any of the one or more progeny conversations in the tree structure, and upon changing the managed conversation or any of the one or more progeny conversations to resolved or unresolved, a change applies to all members of the managed conversation and any of the one or more progeny conversations, and each member is notified of the change.

2. The method as claimed in claim 1, wherein the managed conversation is formed in (a) in the workflow organization application when the managed conversation is created by the conversation creator member or when the managed conversation is imported from another application or conversation source.

3. The method as claimed in claim 1, further comprising: importing into the workflow organization application a conversation from another application or conversation source; determining a similar managed conversation having similar subject matter or common members to the imported conversation; and merging messages in the imported conversation into the similar managed conversation.

4. The method as claimed in claim 1, further comprising: importing into the workflow organization application a conversation from another application or conversation source; determining a similar managed conversation having similar subject matter or common members to the imported conversation; and assigning a conversation identifier (ID) of the similar managed conversation as the parent ID of the imported conversation.

5. The method as claimed in claim 1, further comprising: determining that the user is not a conversation member of a conversation identified by an original parent ID of the managed conversation relative to the conversation creator member; and assigning a conversation identifier (ID) of a nearest ancestor conversation, of which the user is a member and from which the managed conversation branches, as a virtual parent identifier (ID) of the managed conversation relative to the user.

6. The method as claimed in claim 1, further comprising: permitting the user to place the managed conversation formed in (a) as a progeny to another ancestor conversation in the tree structure specific to the user, and in the tree structure specific to the user, assigning an override parent identifier (ID) which is associated with said another ancestor conversation and is different than an original parent identifier (ID) of the managed conversation relative to the conversation creator member.

7. The method as claimed in claim 1, further comprising: permitting a conversation member amongst the one or more other conversation members of the managed conversation to assign an override parent conversation to the managed conversation, to substitute, in the tree structure specific to the conversation member or in the tree structure specific to another member of the managed conversation, an override parent identifier (ID) for an existing parent identifier (ID) associated with the managed conversation.

8. The method as claimed in claim 1, further comprising: determining, when the user selects a conversation in the tree structure specific to the user and places the selected conversation as a progeny to a first ancestor conversation of which the user is not a member, a conversation identifier (ID) of a nearest ancestor conversation other than the first ancestor conversation, and assigning the conversation ID of said nearest ancestor conversation as a parent ID to the selected conversation in the tree structure specific to the user, if the user is a member of said nearest ancestor conversation.

9. The method as claimed in claim 1, further comprising: permitting the user to select a conversation in the tree structure specific to the user and to place the selected conversation as a progeny to a new parent conversation; determining that another conversation member of the selected conversation is not a conversation member of the new parent conversation; and assigning a conversation identifier (ID) of a nearest ancestor conversation, of which said another conversation member is a conversation member and from which the managed conversation branches, as a virtual parent identifier (ID) of the managed conversation relative to said another conversation member.

10. The method as claimed in claim 1, further comprising: permitting the user to assign an override parent identifier (ID) to the managed conversation to move the managed conversation to a new parent conversation identified by the override parent ID, and permitting the member user to select members of the managed conversation, to whom the override parent identifier is to apply; and determining, for each selected member who is not a member of a conversation identified by the override parent ID, a nearest ancestor conversation of which the selected member is a conversation member and from which the managed conversation branches, and assigning a conversation identifier (ID) of said nearest ancestor conversation as a virtual parent identifier (ID) of the managed conversation relative to the selected member.

11. The method as claimed in claim 1, wherein in the tree structure specific to the user, the parent ID of the managed conversation relative to the user is different than the parent ID of the managed conversation in the tree structure specific to another conversation member of the managed conversation.

12. The method as claimed in claim 1, further comprising: providing a visibility setting associated with the managed conversation, to permit the visibility setting to be set to private in which only the members of the managed conversation are permitted to view the managed conversation or to be set to public to permit other users of the workflow organization application who are not members of the managed conversation to see a link to the managed conversation to permit a non-member amongst said other users to view the managed conversation, without being permitted to join, modify or post to the managed conversation.

13. The method as claimed in claim 12, wherein the managed conversation having the visibility setting of public is saved to the tree structure specific to the non-member.

14. The method as claimed in claim 1, wherein upon the user selecting any conversation within the tree structure specific to the user, a timeline including each message that has been posted to the selected conversation after the user became associated with the selected conversation is presented to the user in chronological order.

15. The method as claimed in claim 1, further comprising: permitting a member of the managed conversation to mark the managed conversation, as well as a progeny branching out from the managed conversation, as a resolved conversation which is collapsed into a resolved folder of an ancestor to the managed conversation, in the tree structure specific to the member.

16. The method as claimed in claim 1, further comprising:
   permitting each of the members of the managed conversation to specify or edit a date by which the managed conversation or the one or more progeny conversations is to be resolved by.

17. The method as claimed in claim 1, further comprising: displaying, upon the user selecting the conversation within the tree structure specific to the user, a list of the one or more progeny conversations branching out of the selected conversation in a sorted order of importance based on content, user interaction and nearness of deadlines and appointments.

18. The method as claimed in claim 1, further comprising: determining, when a conversation is imported from another application or conversation source into the workflow organization application, that there is, amongst conversations in the tree structure of the user, a similar managed conversation having similar subject matter or common members to the imported conversation and merging messages in the imported conversation into the similar managed conversation, or absent determining said similar managed conversation, placing the imported conversation as a progeny of an ancestor conversation determined based on a comparison of each of the conversations in the tree structure of the user, as to at least one of (i) a title of the imported conversation, (ii) members of the imported conversation, (iii) a time of creation of the imported conversation, and (iv) message content of the imported conversation.

19. The method as claimed in claim 1, further comprising: permitting the user to attach one or more files to the managed conversation and the one or more progeny conversations, wherein a list of the one or more attached files of the managed conversation and the one or more progeny conversations is presented in a sorted priority order based on at least one of (i) a most recent date on which file was viewed by the user, (ii) a date on which the file was posted to the managed conversation and the one or more progeny conversations, (iii) a particular user that attached the file to the managed conversation and the one or more progeny conversations, (iv) a particular conversation or a particular progeny conversation to which the file was attached, (v) type of the file, or title of the file.

20. The method as claimed in claim 1, further comprising: permitting the user to associate one or more calendar appointments with the selected conversation and the one or more progeny conversations, and filtering conversations other than the selected conversation and the one or more progeny conversations so as not to associate appointments of the filtered conversations; and presenting calendar appointments in a sorted priority order based on at least one of (i) chronological order, (ii) a timestamp at which a calendar appointment was created, (iii) user who created the calendar appointment, (iv) members of the calendar appointment, and (v) conversation in which the calendar appointment was created or associated.

21. The method as claimed in claim 1, further comprising: performing natural language processing based on one or more user-input keywords to determine one or more matching messages in a content of the managed conversation and/or in a content of the one or more progeny conversations; and presenting the one or more matching messages in a sorted order based on strength of match in the natural language processing.

22. A workflow organization application comprising a program of executable instructions stored in a non-transitory medium, the executable instructions, when executed by a computer or processor, causing the computer or processor to perform a method to manage digital conversations, the method comprising:
   (a) forming one or more managed conversations within a workflow organization application, each managed conversation including messages which constitute a content of the managed conversation, and for each managed conversation, maintaining (i) member information indicating a conversation creator member and one or more other conversation members of the managed conversation, and (ii) additional information for the managed conversation, including a parent identifier (ID) associated with the managed conversation;
   (b) generating, for each user of the workflow organization application, a hierarchical, tree structure, specific to the user, of conversations of which the user is a member, the tree structure being generated according to, for each conversation in the tree structure, the parent ID of the managed conversation relative to the user;
   (c) displaying the tree structure, and permitting the user to select any conversation within the tree structure specific to the user and permitting the user to post a new message to the selected conversation;
   forming one or more progeny conversations branching out of the managed conversation within the tree structure of any members of the managed conversation; and
   permitting each of the members of the managed conversation to mark the managed conversation, as well as any of the one or more progeny conversations branching out of the managed conversation, as a resolved conversation which is collapsed into a resolved conversation folder, and
   wherein each conversation is initially set to an unresolved conversation,
   wherein a member is permitted to resolve or unresolve the managed conversation or any of the one or more progeny conversations in the tree structure, and
   upon changing the managed conversation or any of the one or more progeny conversations to resolved or unresolved, a change applies to all members of the managed conversation and any of the one or more progeny conversations, and each member is notified of the change.

23. A system comprising one or more processors and respective non-transitory media to store a program of executable instructions, the executable instructions, when executed by the one or more processors, causing the system to perform a method to manage digital conversations, the method comprising:
   (a) forming one or more managed conversations within a workflow organization application, each managed conversation including messages which constitute a content of the managed conversation, and for each managed conversation, maintaining additional information for the conversation, including a parent identifier (ID) associated with the managed conversation, and member information indicating members of the managed conversation;

(b) generating, for each user of the workflow organization application, a presentation of conversations of which the user is a member, the presentation of the conversations being arranged in a hierarchical, tree structure specific to the user;

(c) permitting the user to select any conversation within the tree structure specific to the user and to post a new message to the selected conversation;

forming one or more progeny conversations branching out of the managed conversation within the tree structure of any members of the managed conversation; and permitting each of the members of the managed conversation to mark the managed conversation, as well as any of the one or more progeny conversations branching out of the managed conversation, as a resolved conversation which is collapsed into a resolved conversation folder, wherein each conversation is initially set to an unresolved conversation, wherein a member is permitted to resolve or unresolve the managed conversation or any of the one or more progeny conversations in the tree structure, and upon changing the managed conversation or any of the one or more progeny conversations to resolved or unresolved, a change applies to all members of the managed conversation and any of the one or more progeny conversations, and each member is notified of the change.

* * * * *